US012176167B2

(12) United States Patent
Yoneda

(10) Patent No.: US 12,176,167 B2
(45) Date of Patent: Dec. 24, 2024

(54) PROTECTIVE ELEMENT

(71) Applicant: DEXERIALS CORPORATION, Shimotsuke (JP)

(72) Inventor: Yoshihiro Yoneda, Shimotsuke (JP)

(73) Assignee: Dexerials Corporation, Shimotsuke (JP)

(*) Notice: Subject to any disclaimer, the term of this patent is extended or adjusted under 35 U.S.C. 154(b) by 140 days.

(21) Appl. No.: 18/021,862

(22) PCT Filed: Aug. 20, 2021

(86) PCT No.: PCT/JP2021/030510
§ 371 (c)(1),
(2) Date: Feb. 17, 2023

(87) PCT Pub. No.: WO2022/044982
PCT Pub. Date: Mar. 3, 2022

(65) Prior Publication Data
US 2023/0317393 A1    Oct. 5, 2023

(30) Foreign Application Priority Data

Aug. 27, 2020  (JP) .................................. 2020-143435
Aug. 18, 2021  (JP) .................................. 2021-133455

(51) Int. Cl.
*H01H 39/00* (2006.01)
*H01H 85/00* (2006.01)
(Continued)

(52) U.S. Cl.
CPC ........ *H01H 85/165* (2013.01); *H01H 39/006* (2013.01); *H01H 85/0047* (2013.01); *H01H 85/055* (2013.01)

(58) Field of Classification Search
CPC ..... H01H 39/00–006; H01H 2039/008; H01H 85/165; H01H 85/0047; H01H 85/055
See application file for complete search history.

(56) References Cited

U.S. PATENT DOCUMENTS

2009/0027155 A1   1/2009  Arikawa et al.
2013/0220095 A1*  8/2013  Ukon .................. H01H 39/006
                                                    83/639.1
(Continued)

FOREIGN PATENT DOCUMENTS

JP        2009032489 A       2/2009

OTHER PUBLICATIONS

Written Opinion issued Oct. 5, 2021 in PCT/JP2021/030510 (with English translation), 10 pages.
(Continued)

*Primary Examiner* — Jacob R Crum
(74) *Attorney, Agent, or Firm* — Element IP, PLC

(57) ABSTRACT

A protective element includes: a fuse element cuttable by energization in a first direction; a slider made of an insulating material, including: a plate-shaped portion extending in the first direction; a shielding portion erected in a second direction on the plate-shaped portion, having a shielding-portion through hole penetrating the shielding portion; and a case made of an insulating material, including a housing portion which houses a slider and a portion of the fuse element. The housing portion includes: a shielding-portion housing space which houses the shielding portion such that the shielding portion is movable in the second direction; and a plate-shaped-portion moving space which houses the plate-shaped portion such that the plate-shaped portion is movable in the second direction Prior to the fuse element being cut, the slider and the fuse element are housed such that the fuse element is inserted into the shielding-portion through hole.

51 Claims, 31 Drawing Sheets

(51) Int. Cl.
*H01H 85/055* (2006.01)
*H01H 85/165* (2006.01)

(56) References Cited

U.S. PATENT DOCUMENTS

| | | |
|---|---|---|
| 2019/0206645 A1* | 7/2019 | Sakai ..................... H01H 33/04 |
| 2019/0287751 A1* | 9/2019 | Gonthier ............ H01H 85/0241 |
| 2020/0035437 A1* | 1/2020 | Gaudinat ................ H01H 39/00 |
| 2021/0233728 A1* | 7/2021 | Nakatani .................. H01H 9/30 |

OTHER PUBLICATIONS

International Search Report issued Oct. 5, 2021 in PCT/JP2021/030510 (with English translation), 5 pages.
Office Action issued Aug. 20, 2024, in corresponding Korean Patent Application No. 10-2023-7005835 (with English translation), 6 pages.
Office Action issued Sep. 3, 2024, in corresponding Japanese Patent Application No. 2021-133455 (with machine English translation), 8 pages.

* cited by examiner

FIG. 3
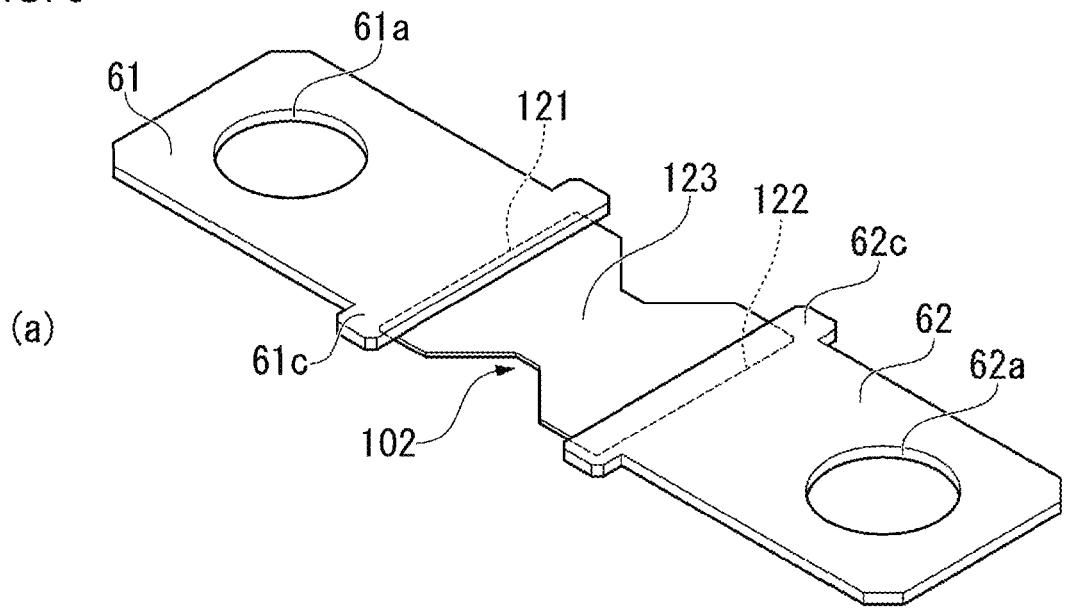
(a)
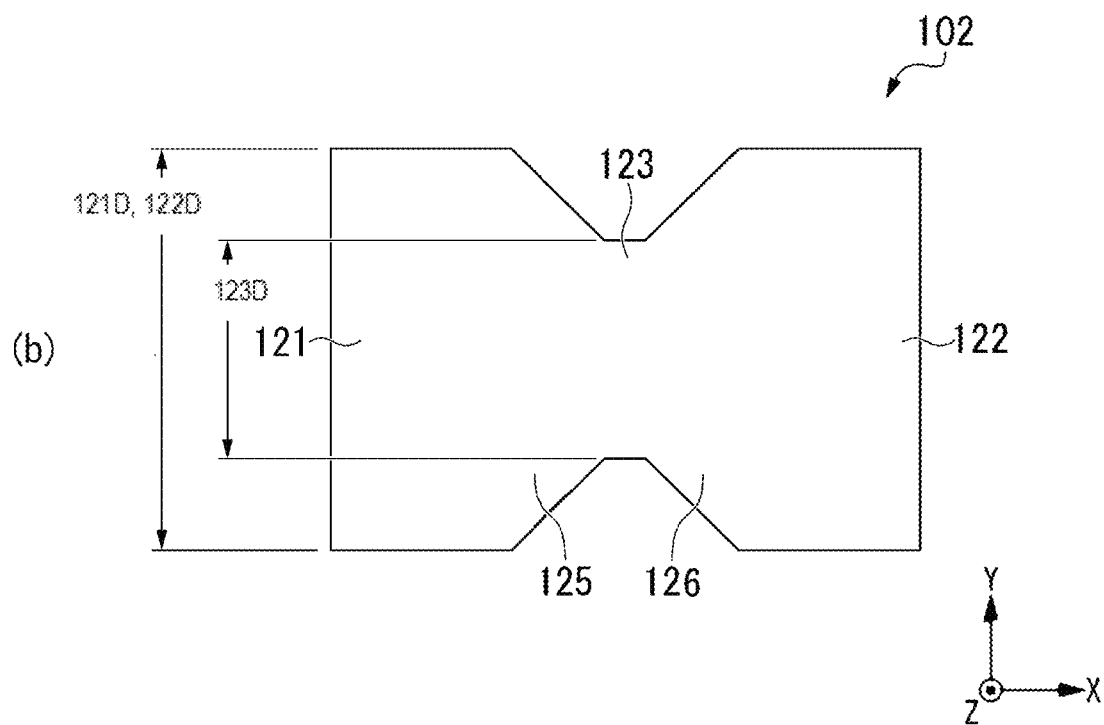
(b)

FIG. 4
(a)
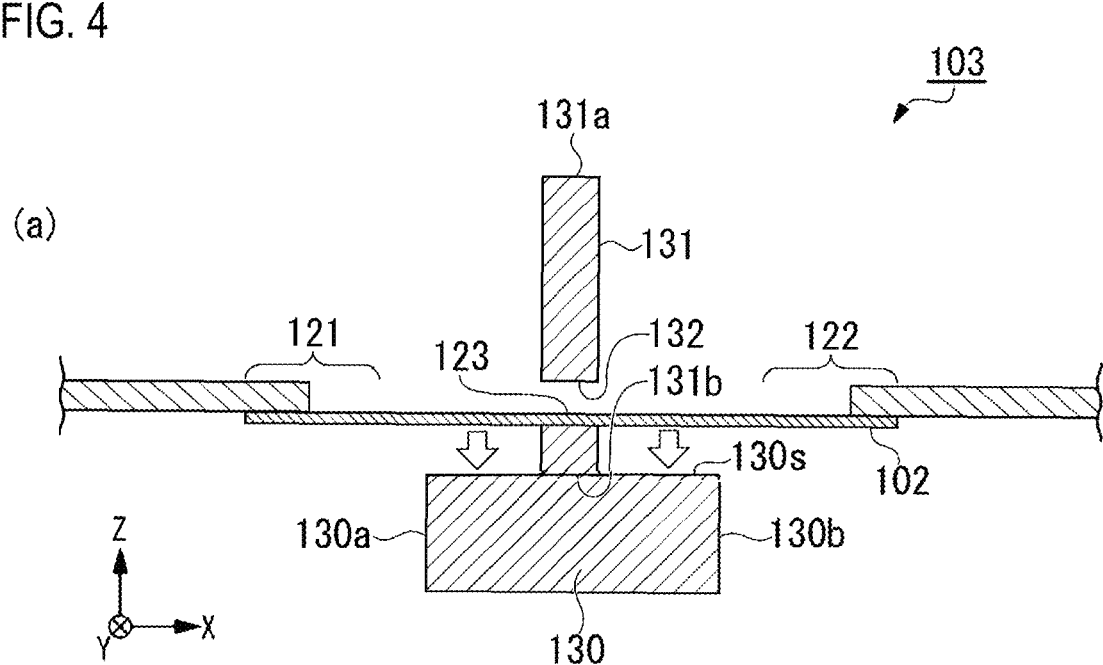
(b)
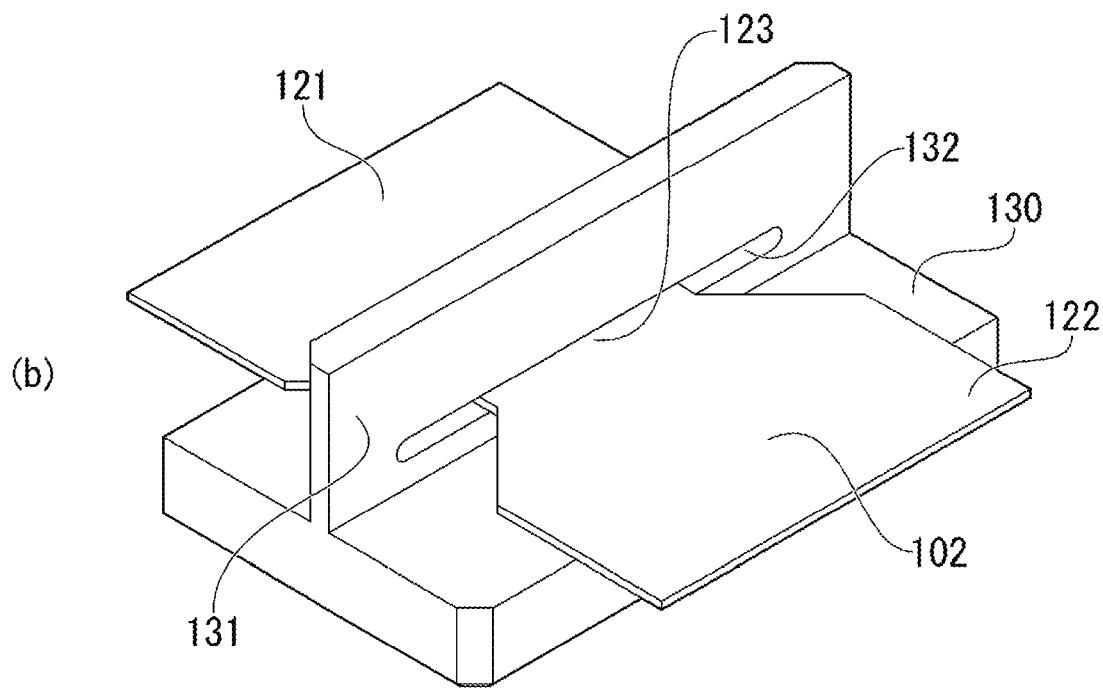

FIG. 5
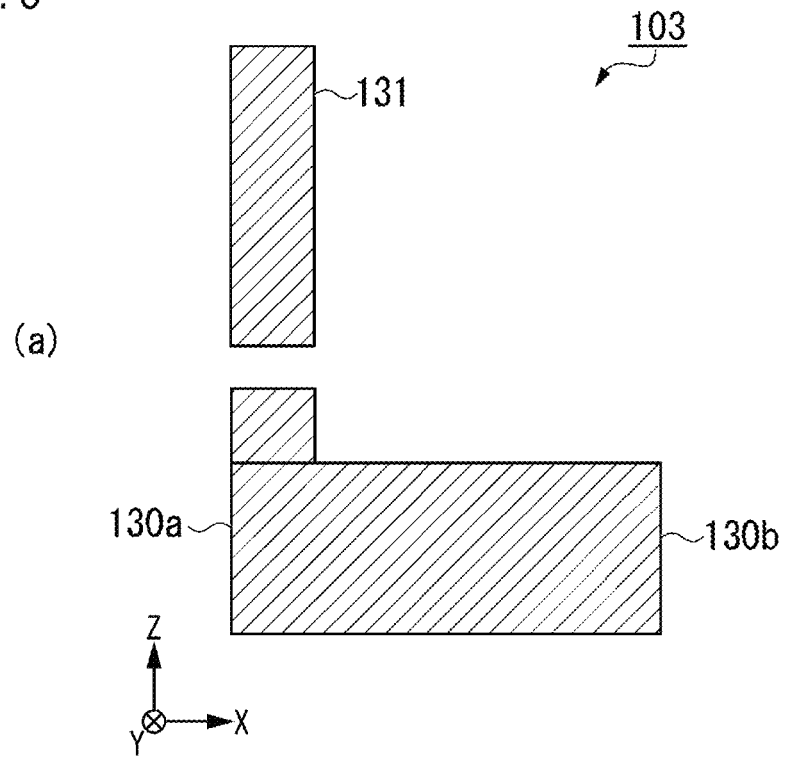
(a)
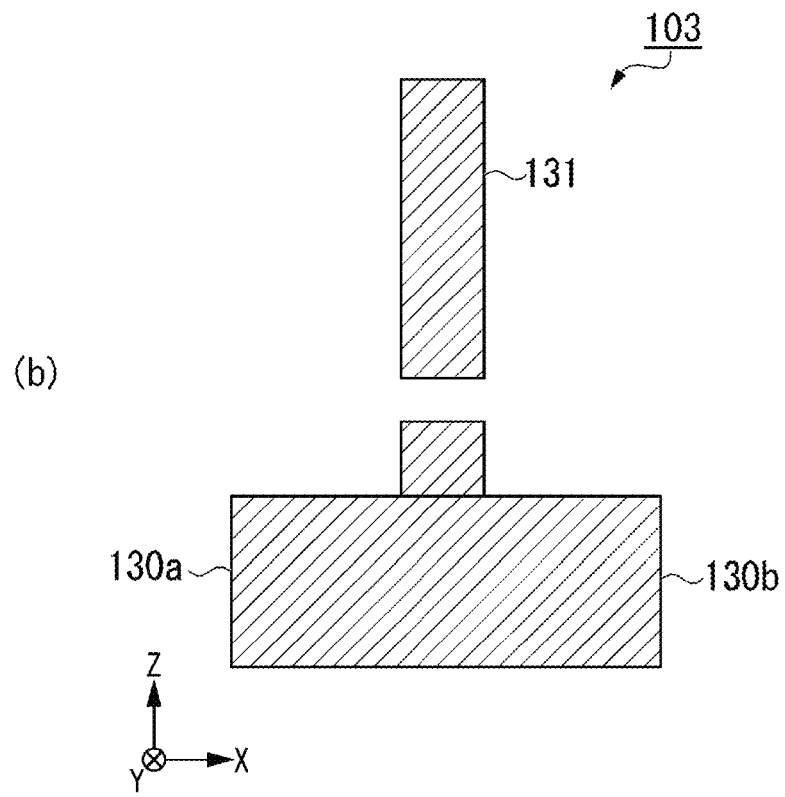
(b)

FIG. 6
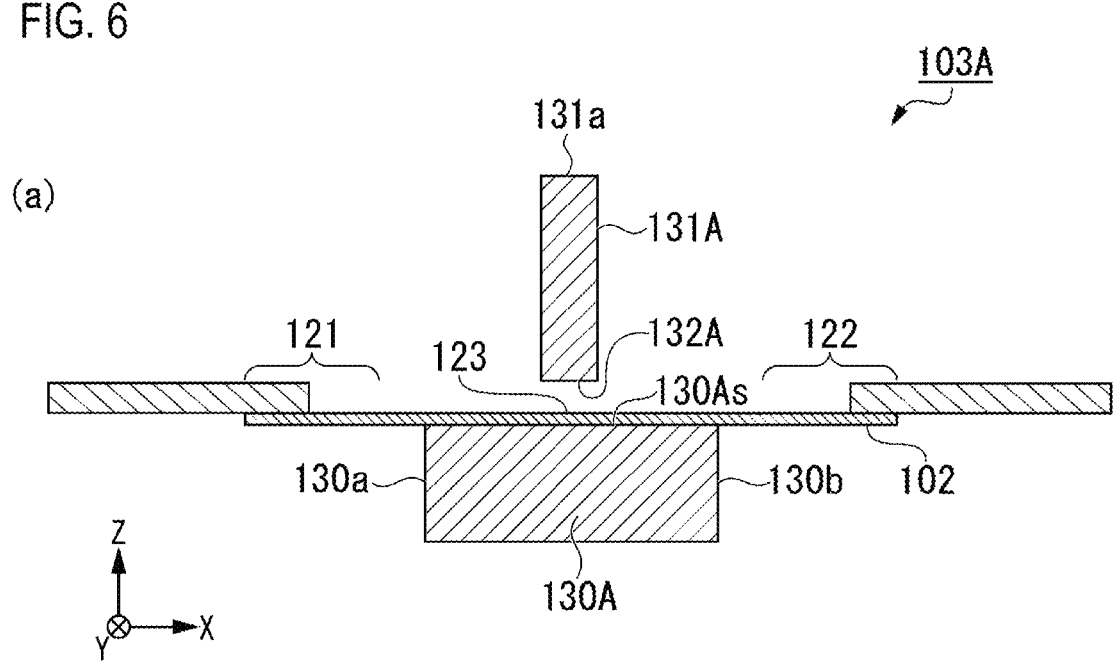
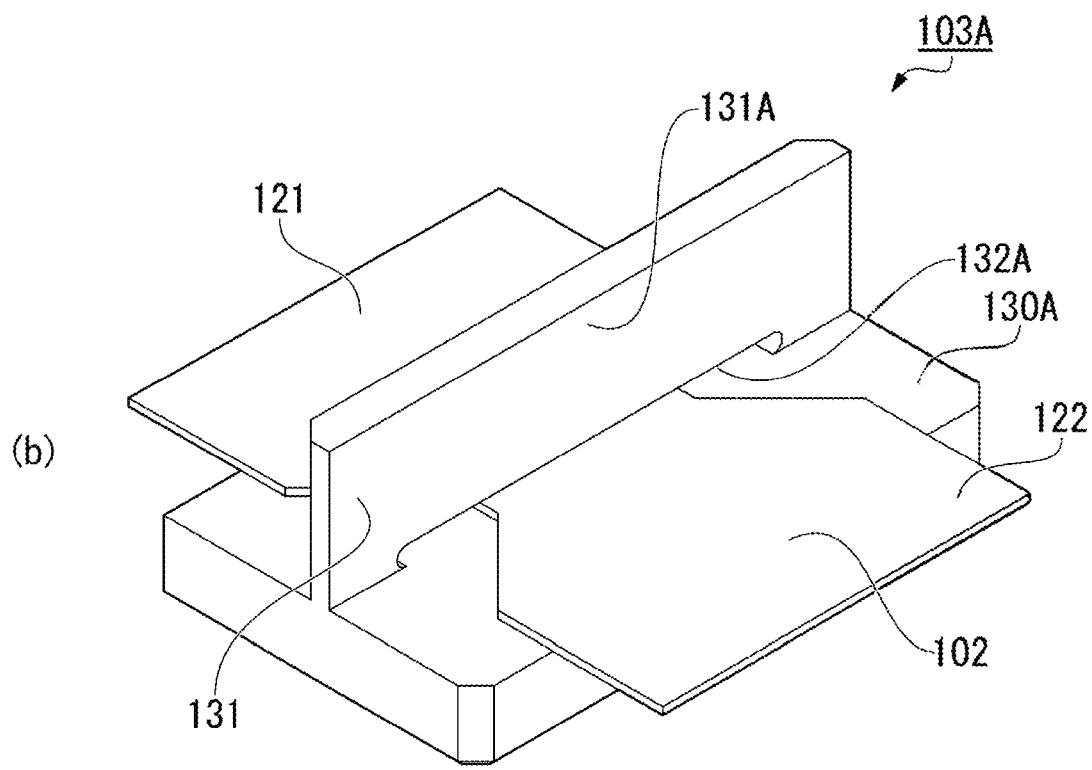

FIG. 12
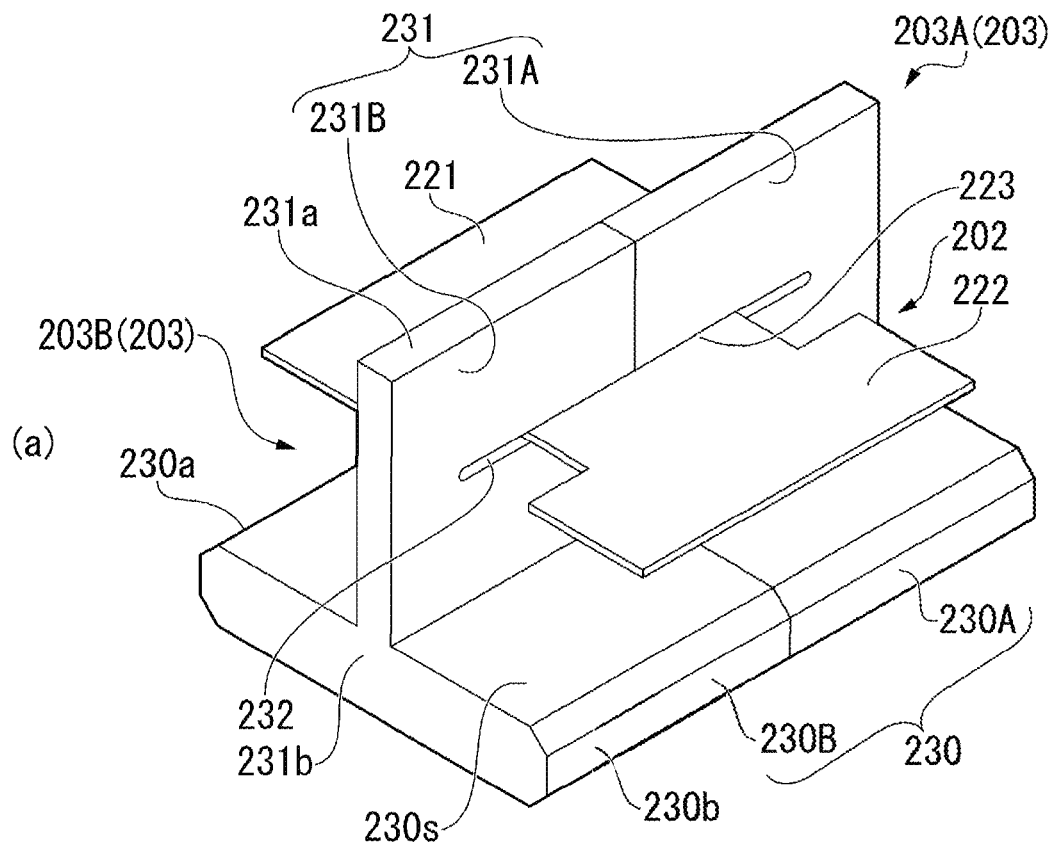
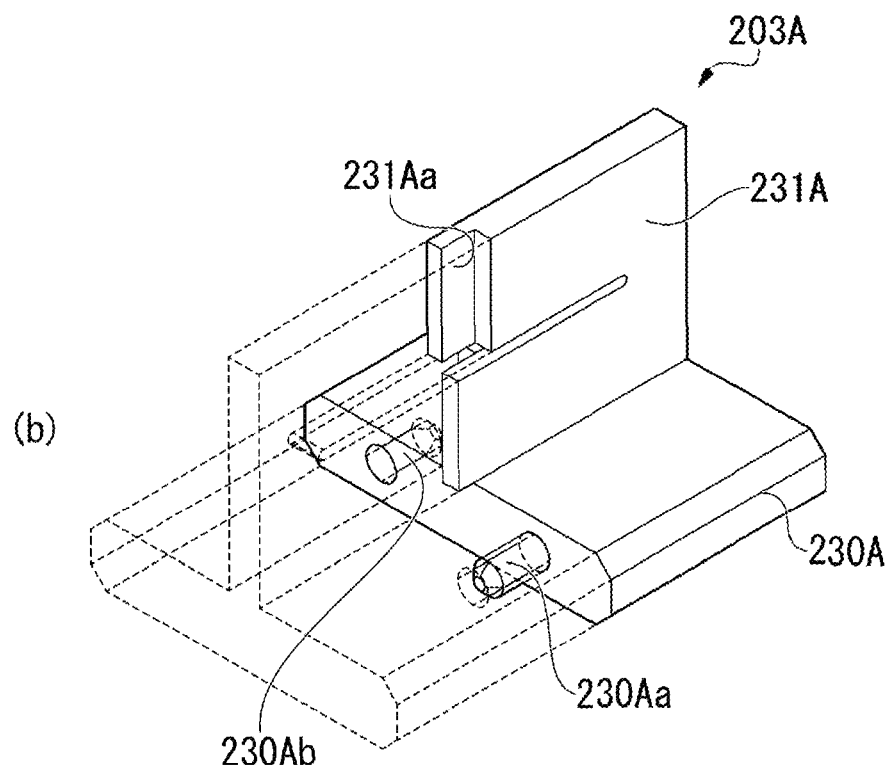

FIG. 20
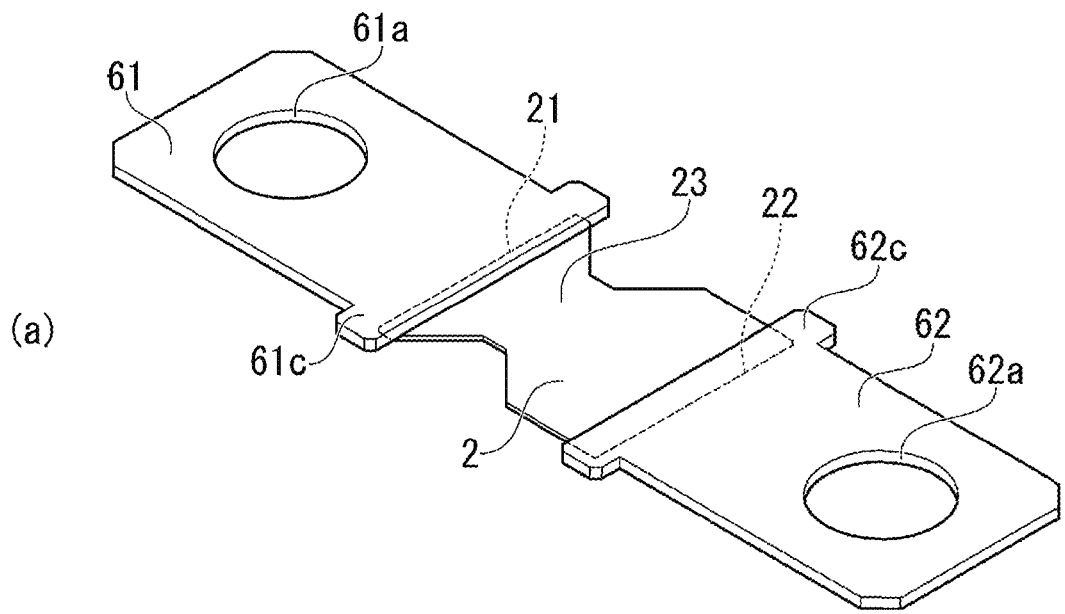
(a)
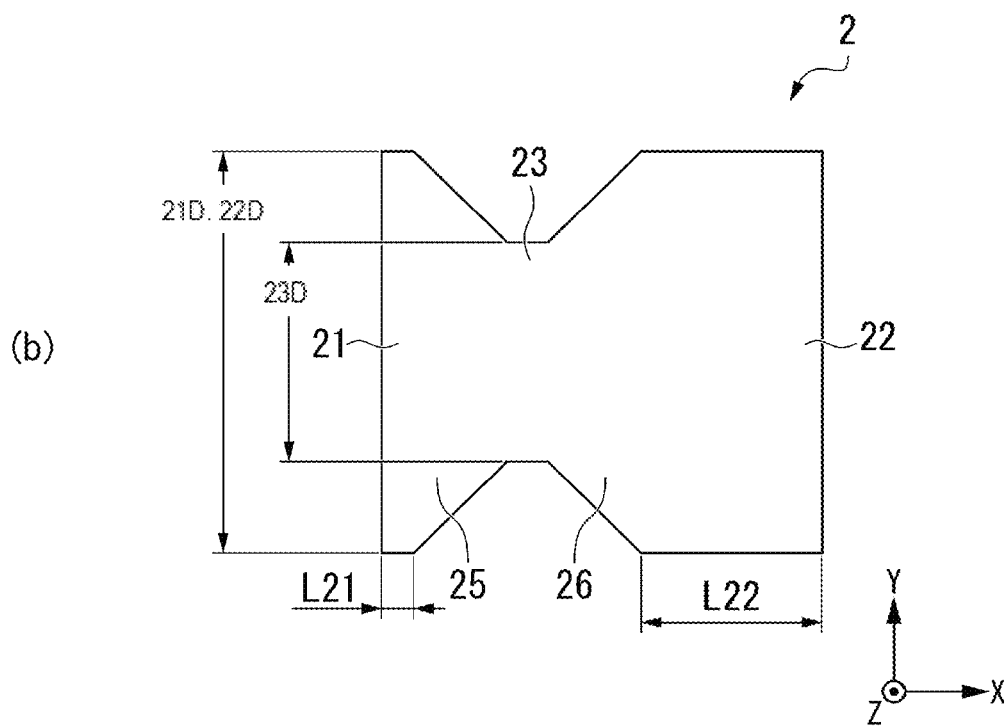
(b)

FIG. 24
(a)
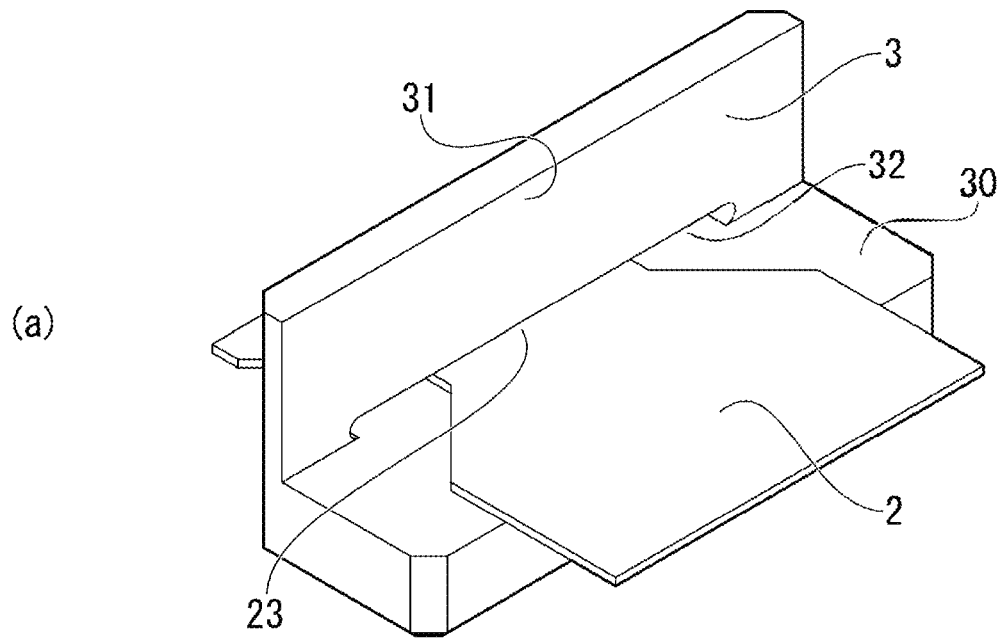
(b)
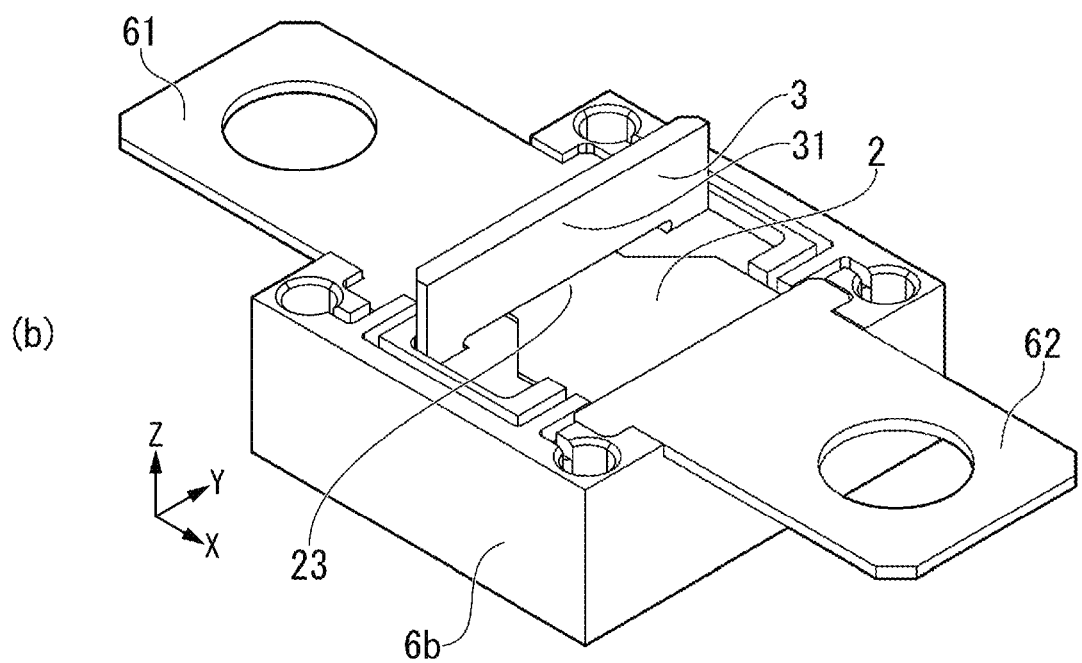

PROTECTIVE ELEMENT

TECHNICAL FIELD

The present invention relates to a protective element.

Priority of the present application is claimed based on Japanese Patent Application No. 2020-143435 filed in Japan on Aug. 27, 2020, and Japanese Patent Application No. 2021-133455 filed in Japan on Aug. 18, 2021, the content thereof being incorporated herein.

BACKGROUND TECHNOLOGY

Conventionally, there is a fuse element that is heated, is cut, and breaks a current path when a current exceeding a rating flows therethrough. A protective element (fuse device) provided with the fuse element is used in, for example, a battery pack using a lithium-ion secondary battery.

In recent years, lithium-ion secondary batteries are used not only in mobile devices but also in a wide variety of fields such as electric vehicles and storage batteries. As such, capacities of lithium-ion secondary batteries are being increased. In conjunction therewith, a protective element disposed in a battery pack that has a high-capacity lithium-ion battery and has a high-voltage and large-current current path is in demand.

For example, Patent Document 1 teaches a fuse in which a large overcurrent flowing in the fuse subjects a fuse body to metal vaporization, a breaking member is moved in a direction heading from a large space to a small space by using a pressure increase in the large space from when an arc is discharged, and the breaking member plugs a connection hole.

CITATION LIST

Patent Documents

Patent Document 1: Japanese Unexamined Patent Application Publication No. 2009-032489

SUMMARY OF INVENTION

Problem to be Solved by Invention

The configuration of the fuse disclosed in Patent Document 1 disposes the breaking member at both end portions of the bridging fuse body (fuse element). In a linear and uniform fuse body such as that disclosed in Patent Document 1, when the fuse body is cut, a portion that is cut is a center portion thereof. As such, for the breaking member to plug the connection hole via the internal pressure increase due to the metal vaporization of the fuse body in conjunction with the arc discharge, the breaking member must physically sever the fuse body. As such, the fuse disclosed in Patent Document 1 has a problem in which a sectional area of the fuse body cannot be increased and increasing a rated current is difficult.

In a protective element for high voltages, when a fuse element is cut, an arc can be discharged. When an arc is discharged, the fuse element melts over a wide area, and vaporized metal may be scattered. In this situation, there is a risk of the scattered metal forming a new energization path or the scattered metal adhering to a surrounding electrical component such as a terminal.

The present invention is made in view of these matters and has as an object to provide a protective element in which an arc discharge at a time of cutting a fuse element is rapidly quenched (extinguished).

Means to Solve the Problem

This invention proposes the following means to achieve this object.

A protective element of a first aspect of the present invention is provided with: a fuse element energized in a first direction; a slider that is made of an insulating material and has a plate-shaped portion extending in the first direction, a shielding portion erected in a second direction intersecting the first direction on the plate-shaped portion, and a shielding-portion through hole penetrating the shielding portion; and a case that is made of an insulating material and has therein a housing portion that houses a portion of the fuse element and houses the slider; wherein the housing portion has a shielding-portion housing space that houses the shielding portion and enables movement thereof in the second direction and a plate-shaped-portion moving space that houses the plate-shaped portion and enables movement thereof in the second direction, and prior to the fuse element being cut, the slider and the fuse element are housed in the case in a state where the fuse element is inserted into the shielding-portion through hole.

The protective element of the above aspect may be configured so that the fuse element has a first end portion, a second end portion, and a breaking portion provided between the first end portion and the second end portion; the fuse element is energized in the first direction heading from the first end portion to the second end portion; and prior to the fuse element being cut, the breaking portion of the fuse element is disposed in the shielding-portion through hole of the slider.

The protective element of the above aspect may be configured so that the slider moves in the housing portion by receiving increased pressure due to a discharge generated in conjunction with the fuse element being cut, and the shielding portion provides breakage between cut faces of the fuse element.

The protective element of the above aspect may be further provided with: a heating element that heats the fuse element.

The protective element of the above aspect may be configured so that the heating element is a resistor, provided with a feeder line that is electrically connected to both ends of the heating element, the heating element is electrically independent of the fuse element, and the feeder line is pulled out to the outside via a feeder-line hole provided in the case.

The protective element of the above aspect may be configured so that the case has an external leak hole communicating the plate-shaped-portion moving space to outside the case.

The protective element of the above aspect may be configured so that the case is a plurality of case members integrated.

The protective element of the above aspect may be configured so that an adhesion area and an adhesive penetration prevention groove are provided in at least one among opposing joining faces of the plurality of case members, and the adhesive penetration prevention groove is disposed between the adhesion area and the housing portion and prevents the adhesive from penetrating a housing-portion space.

The protective element of the above aspect may be configured so that the slider is a plurality of slider members integrated.

The protective element of the above aspect may be configured so that a material of at least one among the case and the slider has a tracking resistance index CTI of 500 V or higher.

The protective element of the above aspect may be configured so that a material of at least one among the case and the slider is a resin material selected from a group consisting of a nylon resin, a polyphthalamide resin, and a Teflon (registered trademark) resin.

The protective element of the above aspect may be configured so that the fuse element is made of a layered body wherein an inner layer made of a metal of a low melting point and an outer layer made of a metal of a high melting point are layered in a thickness direction.

The protective element of the above aspect may be configured so that the metal of a low melting point is made of Sn or a metal whose main component is Sn, and the metal of a high melting point is made of Ag, Cu, or a metal whose main component is Ag or Cu.

The protective element of the above aspect may be configured so that the fuse element has a bent portion that mitigates stress from thermal expansion and thermal contraction in the first direction.

The protective element of the above aspect may be configured so that a first terminal is connected to the first end portion of the fuse element, a second terminal is connected to the second end portion, and the first terminal and the second terminal are fixed to the case.

A protective element of a second aspect of the present invention is provided with: a fuse element energized in a first direction; a slider that is made of an insulating material and has a plate-shaped portion extending in the first direction, a shielding portion erected in a second direction intersecting the first direction from a position between a first edge portion in the first direction of the plate-shaped portion and a second edge portion that is an edge portion on an opposite side of the first edge portion, and a shielding-portion through hole penetrating the shielding portion; and a case that is made of an insulating material and has therein a housing portion that houses a portion of the fuse element and houses the slider; wherein the housing portion has a fuse-element housing space housing the fuse element, a shielding-portion housing space that houses the shielding portion and enables movement thereof in the second direction, and a plate-shaped-portion moving space that houses the plate-shaped portion and enables movement thereof in the second direction; the fuse-element housing space and the shielding-portion housing space intersect; and prior to the fuse element being cut, the slider and the fuse element are housed in the case in a state where the fuse element is inserted into the shielding-portion through hole.

The protective element of the above aspect may be configured so that the fuse element has a first end portion, a second end portion, and a breaking portion provided between the first end portion and the second end portion; the fuse element is energized in the first direction heading from the first end portion to the second end portion; and prior to the fuse element being cut, the breaking portion of the fuse element is disposed in the shielding-portion through hole of the slider.

The protective element of the above aspect may be configured so that a sectional area of a face orthogonal to the first direction of the breaking portion is smaller than a sectional area of a face orthogonal to the first direction of a region other than the breaking portion.

The protective element of the above aspect may be configured so that the slider moves in the housing portion by receiving increased pressure due to a discharge generated in conjunction with the fuse element being cut, and the shielding portion shields the fuse-element housing space.

The protective element of the above aspect may be configured so that the case has an internal leak hole communicating the fuse-element housing space and the plate-shaped-portion moving space.

The protective element of the above aspect may be configured so that increased pressure in the fuse-element housing space due to a discharge generated when the fuse element is cut slides the slider via the internal leak hole, and the shielding portion shields an intersecting portion between the fuse-element housing space and the shielding-portion housing space.

The protective element of the above aspect may be configured so that the case has an external leak hole communicating the plate-shaped-portion moving space to outside the case.

The protective element of the above aspect may be further provided with: a heating element that heats the fuse element.

The protective element of the above aspect may be configured so that the heating element is disposed in two locations interposing the shielding-portion housing space of the fuse-element housing space, the two heating elements are connected in parallel by a heating-element fuse element, provided with a feeder line that is electrically connected to both ends of the heating element, the heating element is electrically independent of the fuse element, and the feeder line is pulled out to the outside via a feeder-line hole provided in the case.

The protective element of the above aspect may be configured so that a height in the second direction of the fuse-element housing space is no greater than five times a thickness in the second direction of the fuse element.

The protective element of the above aspect may be configured so that the heating element that heats the fuse element is provided on the fuse element, and a height in the second direction of the fuse-element housing space is no greater than five times a total of a thickness in the second direction of the fuse element and a thickness in the second direction of the heating element.

The protective element of the above aspect may be configured so that the shielding portion and an inner wall of the shielding-portion housing space are near each other at an interval of 0.03 to 0.2 mm in the first direction of the fuse element, and a lateral face of the plate-shaped portion and a face opposing the lateral face of the plate-shaped portion of the plate-shaped-portion moving space are near each other at an interval of 0.03 to 0.2 mm in the first direction.

The protective element of the above aspect may further have: a fixing portion, in a portion of the plate-shaped-portion moving space, that touches the lateral face of the plate-shaped portion and suppresses rebounding of the slider.

The protective element of the above aspect may be configured so that the case is a plurality of case members integrated.

The protective element of the above aspect may be configured so that the plurality of case members is integrated by being joined in a third direction intersecting the first direction and the second direction by a boss and a fixing hole being fitted together and by an adhesive.

The protective element of the above aspect may be configured so that the slider is a plurality of slider members integrated.

The protective element of the above aspect may be configured so that the plurality of slider members is integrated by being joined in the third direction intersecting the first direction and the second direction.

The protective element of the above aspect may be configured so that a joining face of the shielding portion of the plurality of slider members has a convex portion plugging a gap in the first direction or has an inclined face plugging the gap in the first direction.

The protective element of the above aspect may be configured so that a plurality of wall-face adhesion prevention grooves extending in a direction intersecting the first direction is disposed in parallel in a wall face of the fuse-element housing space.

A protective element of a third aspect of the present invention is provided with: a fuse element that has a breaking portion between a first end portion and a second end portion and is energized in a first direction heading from the first end portion to the second end portion; a slider having a plate-shaped portion made of an insulating material, a shielding portion made of an insulating material erected on a first edge portion of the plate-shaped portion, and a shielding-portion through hole penetrating the shielding portion; and a case that is made of an insulating material, has provided therein a housing portion that houses a portion of the fuse element and houses the slider, and has a first insertion hole that opens to a first wall face in the housing portion; wherein the plate-shaped portion divides an interior of the housing portion into a first space and a second space, the shielding portion is disposed along the first wall face, the breaking portion is disposed in the shielding-portion through hole, the first end portion is housed in the first insertion hole, a pressure increase in the first space due to an arc discharge at a time of the breaking portion being cut moves the slider so that a ratio of the first space in the housing portion increases, and an opening of the first insertion hole is plugged by the shielding portion.

The protective element of the above aspect may be configured so that the fuse element is placed on the plate-shaped portion on a first-space side.

The protective element of the above aspect may be configured so that a sectional area in a direction orthogonal to the first direction of the breaking portion is smaller than a sectional area of a face orthogonal to the first direction of a region other than the breaking portion.

The protective element of the above aspect may be configured so that the case is a plurality members integrated.

The protective element of the above aspect may further have: a second insertion hole that opens to a second wall face disposed opposing the first wall face in the first direction; wherein the second end portion is housed in the second insertion hole.

The protective element of the above aspect may be further provided with: a heating element that cuts the breaking portion.

The protective element of the above aspect may be configured so that prior to the fuse element being cut, a volume of the first space is less than a volume of the second space.

The protective element of the above aspect may further have: a concave portion that opens to a third wall face disposed opposing the fuse element in the first space; wherein the shielding portion is housed in the concave portion.

The protective element of the above aspect may be configured so that a first terminal is electrically connected to the first end portion, and a second terminal is electrically connected to the second end portion.

The protective element of the above aspect may be configured so that a convex portion is provided on a face on an opposite side of the shielding portion of the plate-shaped portion, provided is a fourth insertion hole that opens to a fourth wall face disposed opposing the slider in the second space, and the convex portion is housed in the fourth insertion hole by the slider moving so that a ratio of the first space in the housing portion increases.

The protective element of the above aspect may be further provided with: a leak hole that opens to the fourth wall face disposed opposing the slider in the second space and penetrates the case.

The protective element of the above aspect may be configured so that the leak hole is plugged by the slider by the slider moving so that a ratio of the first space in the housing portion increases.

The protective element of the above aspect may be configured so that a plurality of wall-face adhesion prevention grooves extending in a direction intersecting the first direction is disposed in parallel in the third wall face.

The protective element of the above aspect may be configured so that a plurality of slider adhesion prevention grooves extending in a direction intersecting the first direction is disposed in parallel on the plate-shaped portion on a first-space side.

The protective element of the above aspect may be configured so that the fuse element is made of a layered body wherein an inner layer made of a metal of a low melting point and an outer layer made of a metal of a high melting point are layered in a thickness direction.

The protective element of the above aspect may be configured so that the metal of a low melting point is made of Sn or a metal whose main component is Sn, and the metal of a high melting point is made of Ag, Cu, or a metal whose main component is Ag or Cu.

The protective element of the above aspect may be configured so that the case has the housing portion formed by a first case and a second case disposed opposing the first case being adhered together, a first adhesion part adhered to the second case is provided in a portion of a first joining face contacting the second case of the first case, a second adhesion part adhered to the first case is provided in a portion of a second joining face contacting the first case of the second case, and an adhesive penetration prevention groove is provided in one or both among an area of the first joining face between the housing portion and the first adhesion part and an area of the second joining face between the housing portion and the second adhesion part.

Effect of the Invention

The present invention can provide a protective element in which an arc discharge at a time of cutting a fuse element is rapidly quenched (extinguished).

BRIEF DESCRIPTION OF THE DRAWINGS

FIG. 3 An enlarged view for describing a portion of the protective element 1000 of the first embodiment. (a) is a perspective view illustrating a fuse element, a first terminal, and a second terminal. (b) is a plan view illustrating the fuse element.

FIG. 4 An enlarged view for describing a portion of the protective element 1000 of the first embodiment. (a) is a sectional view illustrating a slider, the fuse element, a portion of the first terminal, and a portion of the second terminal. (b) is a perspective view of (a).

FIG. 5 A sectional view illustrating another configuration example of the slider. (a) is a configuration example in which a shielding portion is disposed in a position more toward one end of a plate-shaped portion. (b) is a configuration example in which the shielding portion is disposed in a position more toward one end relative to an intermediate position between one end of the plate-shaped portion and an end on an opposite side thereof.

FIG. 6 A situation of a configuration in which the fuse element is supported on the plate-shaped portion of the slider. (a) is a sectional view illustrating the slider, the fuse element, a portion of the first terminal, and a portion of the second terminal. (b) is a perspective view of (a).

FIG. 12 A drawing for describing a structure of a slider provided by the protective element 2000 of the second embodiment. (a) is a perspective view illustrating the slider in a state where the fuse element is inserted. (b) is a perspective view illustrating the slider, a second slider member being depicted in a transparent manner to show a hidden structure of a first slider member.

FIG. 20 An enlarged view for describing a portion of the protective element 100 of the fourth embodiment. (a) is a perspective view illustrating a fuse element, the first terminal, and the second terminal. (b) is a plan view illustrating the fuse element.

FIG. 24 (a) and (b) are process diagrams for describing a production method of the protective element 100 of the fourth embodiment.

DESCRIPTION OF THE EMBODIMENTS

The present embodiments are described in detail below with reference to the diagrams as appropriate. The drawings used in the following description may provide enlarged illustrations of characteristic portions for convenience in facilitating understanding of characteristic features. Dimensional ratios and the like of each component may differ from actual ratios and the like. Materials, dimensions, and the like illustrated in the following description are examples. The present invention is not limited thereto and can be implemented with appropriate modifications in a scope in which the effects of the present invention are exhibited.

First Embodiment (Protective Element)

Figure 1:
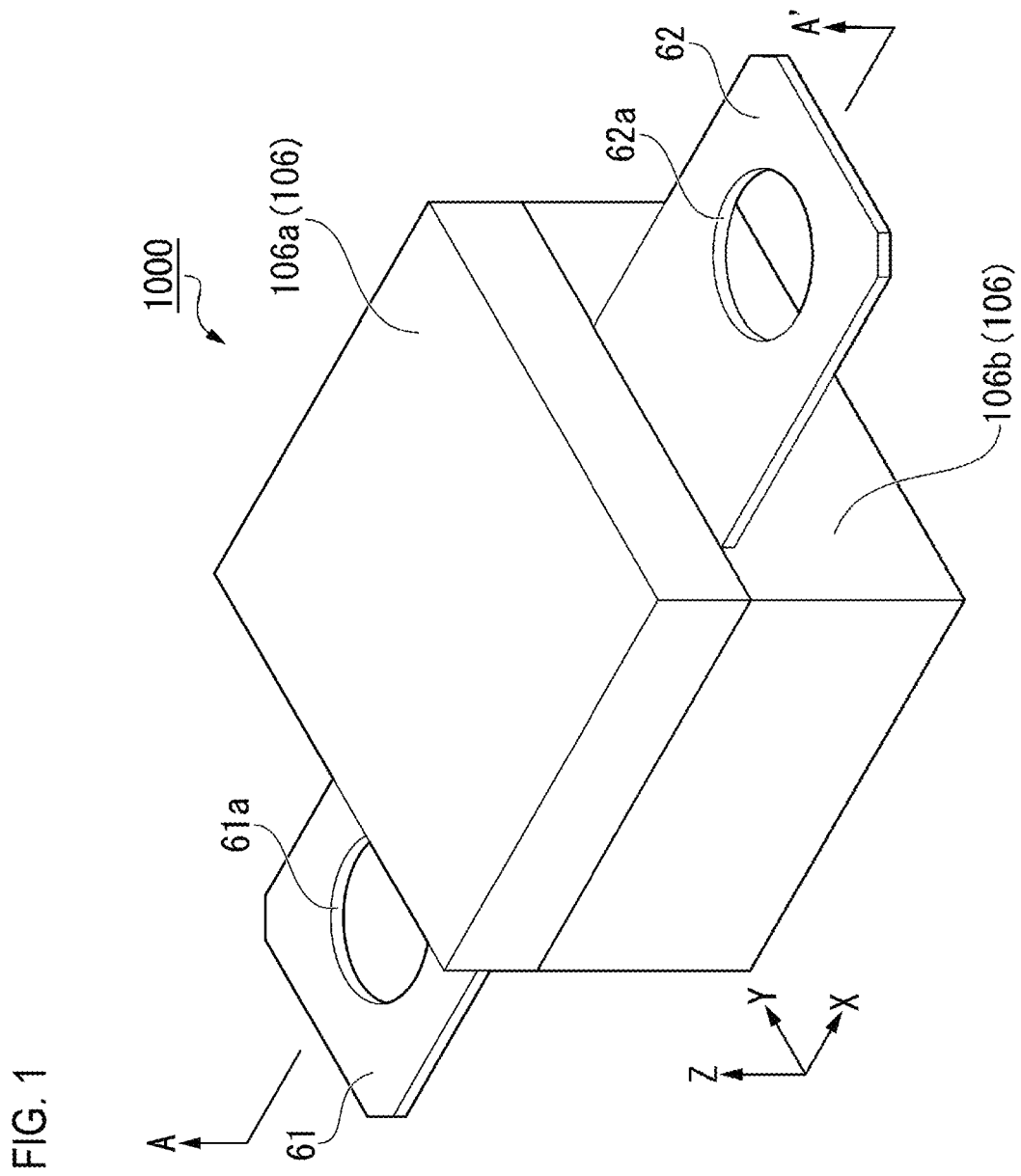
FIG. 1 A perspective view illustrating an overall structure of a protective element 1000 of a first embodiment.
Figure 2:
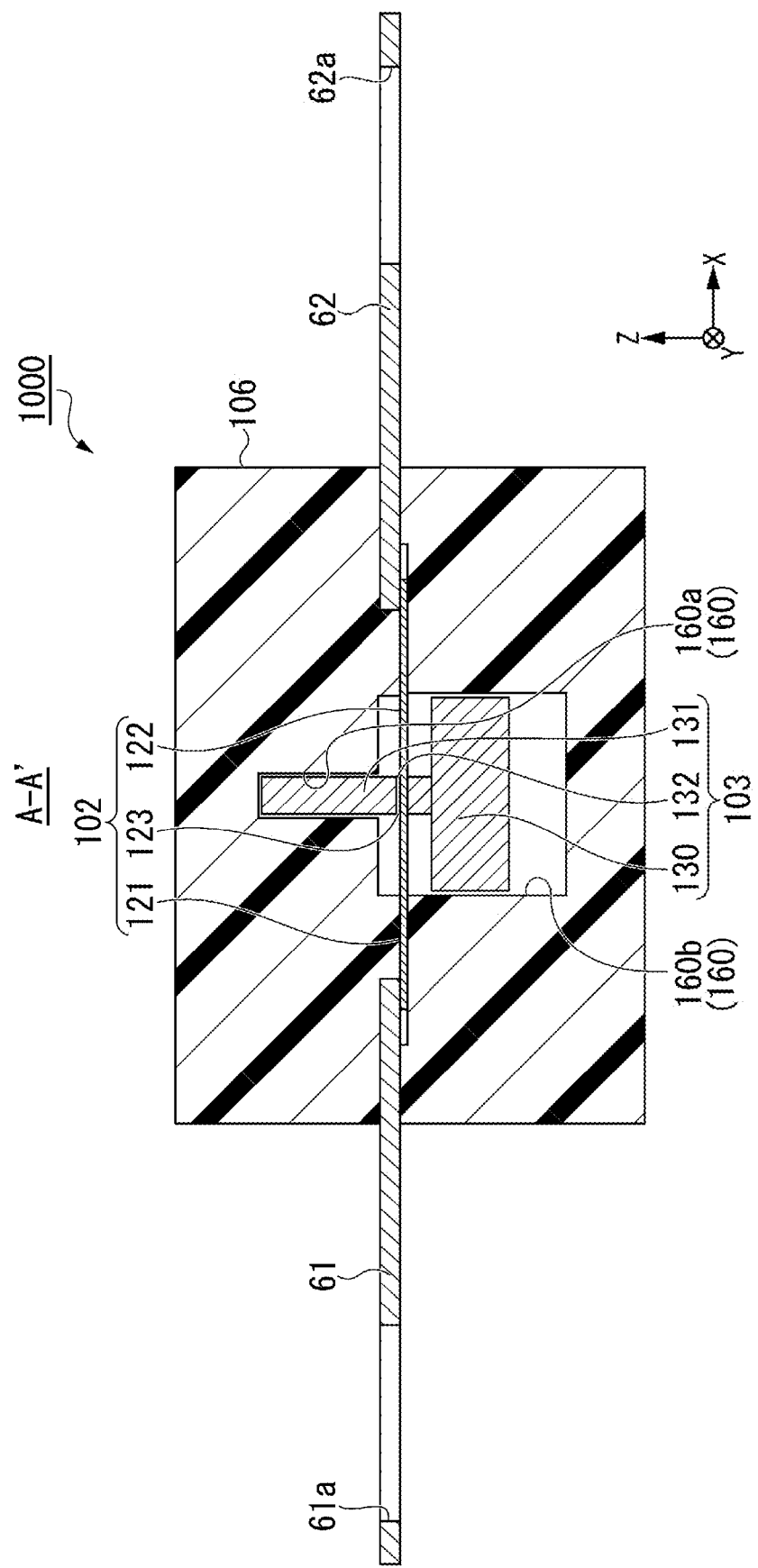
FIG. 2 A sectional view in which the protective element 1000 of the first embodiment is cut along line A-A' illustrated in FIG. 1.

FIG. 1 is a perspective view illustrating an overall structure of a protective element 1000 of a first embodiment. FIG. 2 is a sectional view in which the protective element 1000 of the first embodiment is cut along line A-A' illustrated in FIG. 1.

Hereinbelow, in the drawings, the direction indicated by X is an energization direction (first direction) of a fuse element. The direction indicated by Y is a direction orthogonal to the X direction (first direction), and the direction indicated by Z is a direction orthogonal to the X direction and the Y direction.

As illustrated in FIG. 1 and FIG. 2, the protective element 1000 of the present embodiment is provided with a fuse element 102 energized in the X direction (first direction); a slider 103 that is made of an insulating material and has a plate-shaped portion 130 extending in the X direction, a shielding portion 131 erected in the Z direction (second direction) orthogonal to the X direction on the plate-shaped portion 130, and a shielding-portion through hole 132 that penetrates the shielding portion 131 in the X direction; and a case 106 that is made of an insulating material and has therein a housing portion 160 that houses a portion of the fuse element 102 and houses the slider 103. The housing potion 160 has a shielding-portion housing space 160a that houses the shielding portion 131 and enables movement thereof in the Z direction and a plate-shaped-portion moving space 160b that houses the plate-shaped portion 130 and enables movement thereof in the Z direction. Prior to the fuse element 102 being cut, the slider 103 and the fuse element 102 are housed in the case 106 in a state where the fuse element 102 is inserted into the shielding-portion through hole 132.

(Fuse Element)

FIG. 3 is an enlarged view for describing a portion of the protective element 1000 of the first embodiment. (a) in FIG. 3 is a perspective view illustrating the fuse element, a first terminal 61, and a second terminal 62. (b) in FIG. 3 is a plan view illustrating the fuse element. As illustrated in (a) and (b) in FIG. 3, the fuse element 102 has a first end portion 121, a second end portion 122, and a breaking portion 123 provided between the first end portion 121 and the second end portion 122. The fuse element 102 is energized in the X direction (first direction), which is a direction heading from the first end portion 121 to the second end portion 122.

As illustrated in FIG. 2 and (a) in FIG. 3, the first end portion 121 is electrically connected to the first terminal 61. The second end portion 122 is electrically connected to the second terminal 62. The first terminal 61 is provided with an external terminal hole 61a. Moreover, the second terminal 62 is provided with an external terminal hole 62a. Among the external terminal hole 61a and the external terminal hole 62a, one is used to connect to a power-source side, and the other is used to connected to a load side. Moreover, the external terminal hole 61a and the external terminal hole 62a may be connected to an energization path inside a load circuit. As illustrated in (a) in FIG. 3, flange portions (indicated by reference signs 61c, 62c in (a) in FIG. 3) widened to both sides toward the fuse element 102 may be provided at end portions on sides connected to the fuse element 102; this is not particularly limited. Details of the first terminal 61 and the second terminal 62 are described below.

A disposition relationship between the fuse element 102 and the shielding-portion through hole 132 is preferably a configuration in which among the first end portion 121, second end portion 122, and breaking portion 123 constituting the fuse element 102, the breaking portion 123 is disposed in the shielding-portion through hole 132 provided by the shielding portion 131 of the slider 103, as in the protective element 1000 illustrated in FIG. 2.

In this configuration, unlike the fuse (protective element) disclosed in Patent Document 1, in the fuse element 102, the breaking portion 123 becomes a heat spot when an overcurrent flows through the fuse element; the breaking portion 123 is heated and softened with priority and is reliably cut. As such, when the slider moves due to a pressure increase due to gas released in conjunction with an arc discharge at the time when the fuse element 102 is cut, because the fuse element 102 is already cut, the slider 103 does not need to physically sever the fuse element 102. This enables rapid movement. Broken faces of the broken breaking portion 123 are shielded and insulated by the shielding portion 131 of the slider 103, and an energization path via the fuse element 102 is reliably physically broken. This rapidly quenches (extinguishes) the arc discharge.

A thickness of the fuse element 102 may be uniform as illustrated in FIG. 2 and FIG. 3 or may differ in portions. As a fuse element whose thickness differs in portions, for example, one whose thickness gradually increases in heading from the breaking portion 123 to the first end portion 121 and the second end portion 122 and one in which a metal plate is layered on the first end portion 121 and the second end portion 122 can be mentioned. In such a fuse element 102, the breaking portion 123 becomes a heat spot when an overcurrent flows through the fuse element; the breaking portion 123 is heated with priority and is more reliably cut.

As illustrated in (b) in FIG. 3, the breaking portion 123, the first end portion 121, and the second end portion 122 of the fuse element 102 have a substantially rectangular shape in a plan view. As illustrated in (b) in FIG. 4, a width 121D in the Y direction of the first end portion 121 and a width 122D in the Y direction of the second end portion 122 are substantially the same. A width 123D in the Y direction of the breaking portion 123 is narrower than the width 121D in the Y direction of the first end portion 121 and the width 122D in the Y direction of the second end portion 122. Thus, the width 123D of the breaking portion 123 is narrower than widths of regions other than the breaking portion 123. That is, a sectional area in the Y direction of the breaking portion 123 is smaller than sectional areas of regions other than the breaking portion 123.

As illustrated in FIG. 2 and (a) in FIG. 3, the first end portion 121 of the fuse element 102 is disposed overlapping the first terminal 61 in a plan view, and the second end portion 122 is disposed overlapping the second terminal 62 in a plan view.

As illustrated in (b) in FIG. 3, a first connecting portion 125 that is substantially trapezoidal in a plan view is disposed between the breaking portion 123 and the first end portion 121. Among the parallel sides of the first connecting portion 125 that is substantially trapezoidal in a plan view, the longer side is joined to the first end portion 121. Moreover, a second connecting portion 126 that is substantially trapezoidal in a plan view is disposed between the breaking portion 123 and the second end portion 122. Among the parallel sides of the second connecting portion 126 that is substantially trapezoidal in a plan view, the longer side is joined to the second end portion 122. The first connecting portion 125 and the second connecting portion 126 are symmetrical via the breaking portion 123. Thus, a width in the Y direction of the fuse element 102 gradually increases in heading from the breaking portion 123 to the first end portion 121 and the second end portion 122. As a result, when an overcurrent flows through the fuse element 102, the breaking portion 123 becomes a heat spot; the breaking portion 123 is heated with priority and is easily cut.

As illustrated in (b) in FIG. 3, the breaking portion 123 of the fuse element 102 has a narrower width in the Y direction (indicated by reference sign 123D in (b) in FIG. 3) than the first end portion 121 and the second end portion 122. Thus, the breaking portion 123 is cut more easily than a region between the breaking portion 123 and the first end portion 121 and a region between the breaking portion 123 and the second end portion 122.

In the present embodiment, as illustrated in (b) in FIG. 3, a fuse element in which the breaking portion 123 has a narrower width in the Y direction than the first end portion 121 and the second end portion 122 is described as an example of the fuse element 102. However, the fuse element is not limited to one in which the width in the Y direction of the breaking portion is narrower than the first end portion and the second end portion.

As illustrated in (b) in FIG. 3, a planar shape of the fuse element 102 overall is substantially rectangular. Compared to a general fuse element, its width in the Y direction is relatively wide, and its length in the X direction is relatively short. In the protective element 1000 of the present embodiment, the broken faces of the broken fuse element 102 are insulated by the shielding portion 131 of the slider 103. As a result, the arc discharge at the time when the fuse element 102 is cut is rapidly quenched (extinguished). As such, there is no need to decrease the width in the Y direction of the fuse element 102 to suppress the arc discharge; the width in the Y direction of the fuse element 102 can be made wide, and the length in the X direction can be made short. The protective element 1000 having such a fuse element 102 can suppress a resistance increase in a current path whereon the protective element 1000 is disposed and can thus also be preferably disposed on a current path of a large current.

The fuse element 102 illustrated in FIG. 3 is one example, and one of another configuration can be used. For example, instead of the fuse element 102, the fuse element 202 illustrated in FIG. 10 or the fuse element 202A illustrated in FIG. 11 may be used.

As a material of the fuse element 102, the same material as the fuse element 2 described below can be used.
(Slider)
FIG. 4 is a drawing for describing a structure of the slider 103 provided in the protective element 1000 of the first embodiment. (a) in FIG. 4 is a sectional view cut along line A-A' illustrated in FIG. 1, and (b) in FIG. 4 is a perspective view.

As illustrated in FIG. 4, the slider 103 has a sectional shape along the X direction that is substantially an inverted T shape.

As illustrated in FIG. 4, the slider 103 is provided with the plate-shaped portion 130 extending in the X direction and the shielding portion 131 erected in the Z direction on the plate-shaped portion 130. The shielding-portion through hole 132 that penetrates the shielding portion 131 in the X direction is formed in the shielding portion 131. The fuse element 102 is disposed in the shielding-portion through hole 132. In the protective element 1000, the breaking portion 123 of the fuse element 102 is disposed in the shielding-portion through hole 132.

As indicated by the arrows in (a) in FIG. 4, at the time of cutting the fuse element 102, when the plate-shaped portion 130 constituting the slider 103 receives pressure due to the gas released in conjunction with the arc discharge, the slider 103 moves in the Z direction. The plate-shaped portion 130 is a part that can also be termed a pressure receiving portion in the sense that it provides an action of moving the slider 103 by receiving pressure.

The slider 103 is configured so that the shielding portion 131 is disposed in a central portion of the plate-shaped portion 130 in the X direction. That is, it is configured so that the shielding portion 131 is disposed in an intermediate position between a first edge portion 130a, which is one end of the plate-shaped portion 130 in the X direction, and a second edge portion 130b, which is an end on an opposite side. The slider 103 may be configured so that as illustrated in (a) in FIG. 5, the shielding portion 131 is disposed in a position more toward one end of the plate-shaped portion 130 or, as illustrated in (b) in FIG. 5, the shielding portion 131 is more on one end side relative to the intermediate position between the first edge portion 130a that is one end of the plate-shaped portion 130 and the second edge portion 130b that is the end on an opposite side. Moreover, the configuration may be such that the shielding portion 131 is provided at both ends of the plate-shaped portion 130 (first edge portion 130a and second edge portion 130b).

In the protective element 1000, the shielding-portion through hole 132 is disposed in a position away from a lower end 131b of the shielding portion 131, toward an upper-end 131a side. As such, the fuse element 102 is not supported on an upper face 130s of the plate-shaped portion 130.

In contrast, a configuration may be such that as in the slider 103A illustrated in FIG. 6, a shielding-portion through hole 132A is disposed at a lower end of a shielding portion 131A and the fuse element 102 is supported on an upper face 130As of a plate-shaped portion 130A.

A width (length in Y direction) of the shielding-portion through hole 132 is preferably a dimension 0.5 to 2 mm longer and more preferably a dimension 0.5 to 1 mm longer than a maximum length in the Y direction of the fuse element 102 (in (b) in FIG. 3, the length indicated by reference signs 121D, 122D). The width of the shielding-portion through hole 132 being longer than the maximum length in the Y direction of the fuse element 102 by 0.5 mm or more enables the fuse element 102 to easily penetrate the shielding-portion through hole 132 when assembling the protective element 1000. This provides favorable productivity. The width of the shielding-portion through hole 132 being a dimension no greater than 2 mm longer than the maximum length in the Y direction of the fuse element 102 is preferable in that this does not negatively impact size reduction of the protective element 1000.

A height from a lower face to an upper face (length in Z direction) of the shielding-portion through hole 132 is preferably a dimension 0.03 to 0.2 mm longer and more preferably a dimension 0.05 to 0.1 mm longer than a maximum thickness of the fuse element 102. The height of the shielding-portion through hole 132 being a dimension longer than the maximum thickness of the fuse element 102 by 0.03 mm or more enables the fuse element 102 to easily penetrate the shielding-portion through hole 132 when assembling the protective element 1000. This provides favorable productivity.

The slider 103 may be configured to be made by integrating a plurality of slider members. For example, two slider members may be joined and integrated. Alternatively, a plate-shaped portion and a shielding portion that are separate bodies may be joined and integrated.

Thicknesses in the Z direction of the plate-shaped portion 130 and the shielding portion 131 can be made identical to those of a plate-shaped portion 30 and shielding portion 31 of a fourth embodiment.

As a material of the slider 103, the same material as a material of a slider 3 described below can be used.

As the material of the slider 103, it is preferable to use one whose tracking resistance index CTI is 500 V or higher.

As the material of the slider 103, it is preferable to use any resin material selected from a group consisting of a nylon resin, a polyphthalamide (PPA) resin, and a Teflon (registered trademark) resin.

(Case)

As illustrated in FIG. 1 and FIG. 2, the case 106 is substantially a rectangular parallelepiped and is two members integrated: a first case 106*a* and a second case 106*b*, which is disposed opposite the first case 106*a*. The case 106 is configured to interpose the fuse element and the slider from above and below by using the first case 106*a* and the second case 106*b* but is not limited to this configuration. For example, a configuration may be such that these are interposed from left and right as in the second embodiment described below.

As illustrated in FIG. 2, the case 106 in the protective element 1000 of the present embodiment has in the housing portion 160 therein the shielding-portion housing space 160*a* that houses the shielding portion 131 and enables movement thereof in the Z direction and the plate-shaped-portion moving space 160*b* that houses the slider 103 and enables movement thereof in the Z direction.

The shielding-portion housing space 160*a* and the plate-shaped-portion moving space 160*b* may be formed by the first case 106*a* and the second case 106*b* being adhered together.

A planar shape (shape in a Z-direction plan view) of the shielding-portion housing space 160*a* is a shape corresponding to a planar shape of the shielding portion 131 of the slider 103. Specifically, as illustrated in FIG. 2, the shielding-portion housing space 160*a* is preferably shaped so that the shielding portion 131 of the slider 103 fits into the shielding-portion housing space 160*a* while being near or touching an inner wall face of the shielding-portion housing space 160*a*. A difference between a distance between inner wall faces in the X direction of the shielding-portion housing space 160*a* and an X-direction thickness of the shielding portion 131 of the slider 103 can be made to be, for example, 0.03 to 0.2 mm, and 0.05 to 0.1 mm is preferable.

When the difference between the distance between inner wall faces in the X direction of the shielding-portion housing space 160*a* and the X-direction thickness of the shielding portion 131 of the slider 103 is 0.03 mm or greater, movement of the shielding portion 131 of the slider 103 in the shielding-portion housing space 160*a* is smooth, and the arc discharge is more rapidly and reliably quenched. This is because the shielding portion 131 of the slider 103 is less likely to get caught in the shielding-portion housing space 160*a* when this difference is 0.03 mm or greater. Therefore, when this separation distance is 0.03 mm or greater, the shielding portion 131 does not separate from the slider 103 before the slider 103 moves, and the shielding-portion housing space 160*a* is not destroyed before the slider moves.

Furthermore, when this separation distance is 0.2 mm or less, the shielding-portion housing space 160*a* functions as a guide for moving the slider 103 to a predetermined position at the time of cutting the fuse element 102. Therefore, position shifting of the slider 103 that moves at the time of cutting the fuse element 102 is prevented, and the arc discharge is more rapidly and reliably quenched.

A planar shape (shape in a Z-direction plan view) of the plate-shaped-portion moving space 160*b* is a shape corresponding to a shape of the plate-shaped portion 130 of the slider 103. Specifically, the planar shape of the plate-shaped-portion moving space 160*b* is shaped so that the plate-shaped portion 130 of the slider 103 fits into the plate-shaped-portion moving space 160*b* while being near or touching an inner wall face of the plate-shaped-portion moving space 160*b*.

Differences in each direction between inner-wall-face intervals in the X direction and the Y direction of the plate-shaped-portion moving space 160*b* and lengths in the X direction and the Y direction of the plate-shaped portion 130 of the slider 103 can be made to be, for example, 0.03 to 0.2 mm, and 0.05 to 0.1 mm is preferable. When the differences in each direction between the inner-wall-face intervals in the X direction and the Y direction of the plate-shaped-portion moving space 160*b* and the lengths in the X direction and the Y direction of the plate-shaped portion 130 of the slider 103 are 0.03 to 0.2 mm, a pressure increase in a space on a shielding-portion 131 side of the plate-shaped portion 130 in the housing portion 160 due to the arc discharge at the time of the cutting of the breaking portion 123 of the fuse element 102 causes the slider 103 to move smoothly, and the arc discharge is more rapidly and reliably quenched.

Figure 8:
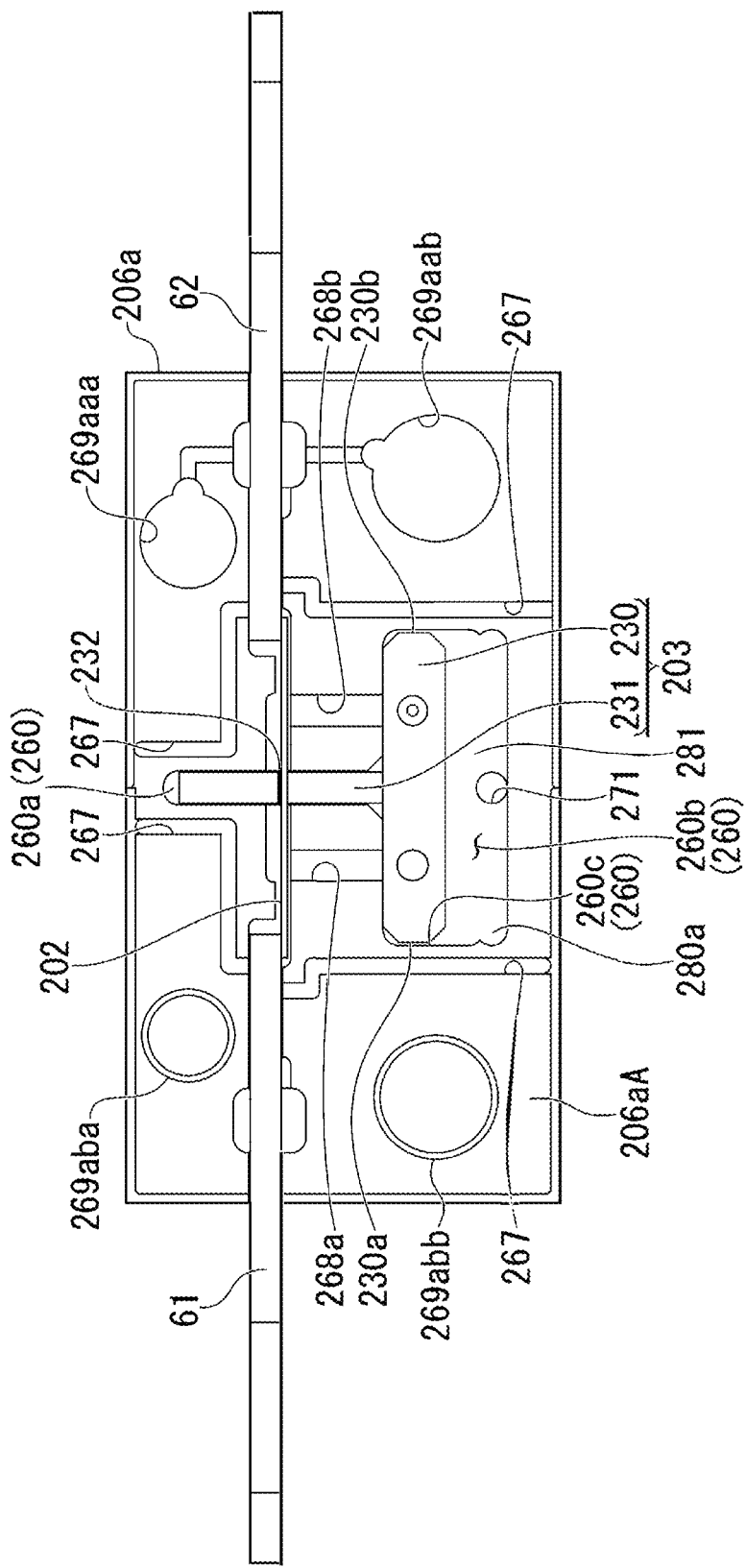
FIG. 8 A side view illustrating the protective element 2000 of the second embodiment with the second case removed.
Figure 22:
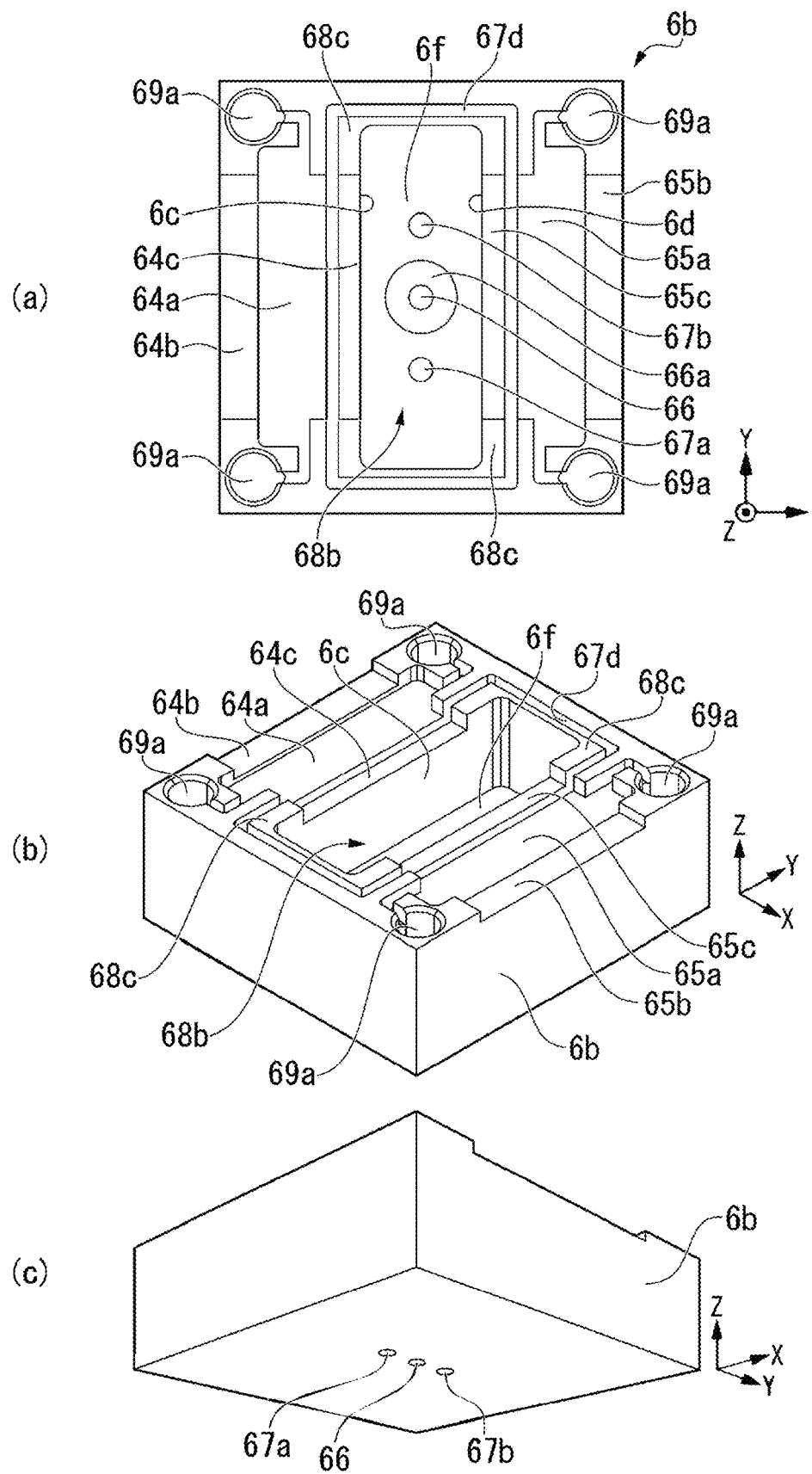
FIG. 22 A drawing for describing a structure of a second case provided in the protective element 100 of the fourth embodiment. (a) is a plan view from the first-space side, and (b) and (c) are perspective views.

The case 106 may have an external leak hole communicating the plate-shaped-portion moving space 160*b* to outside the case 106 (see the external leak hole 271 in FIG. 8 and the leaks holes 67*a*, 67*b* in FIG. 22).

Figure 18:
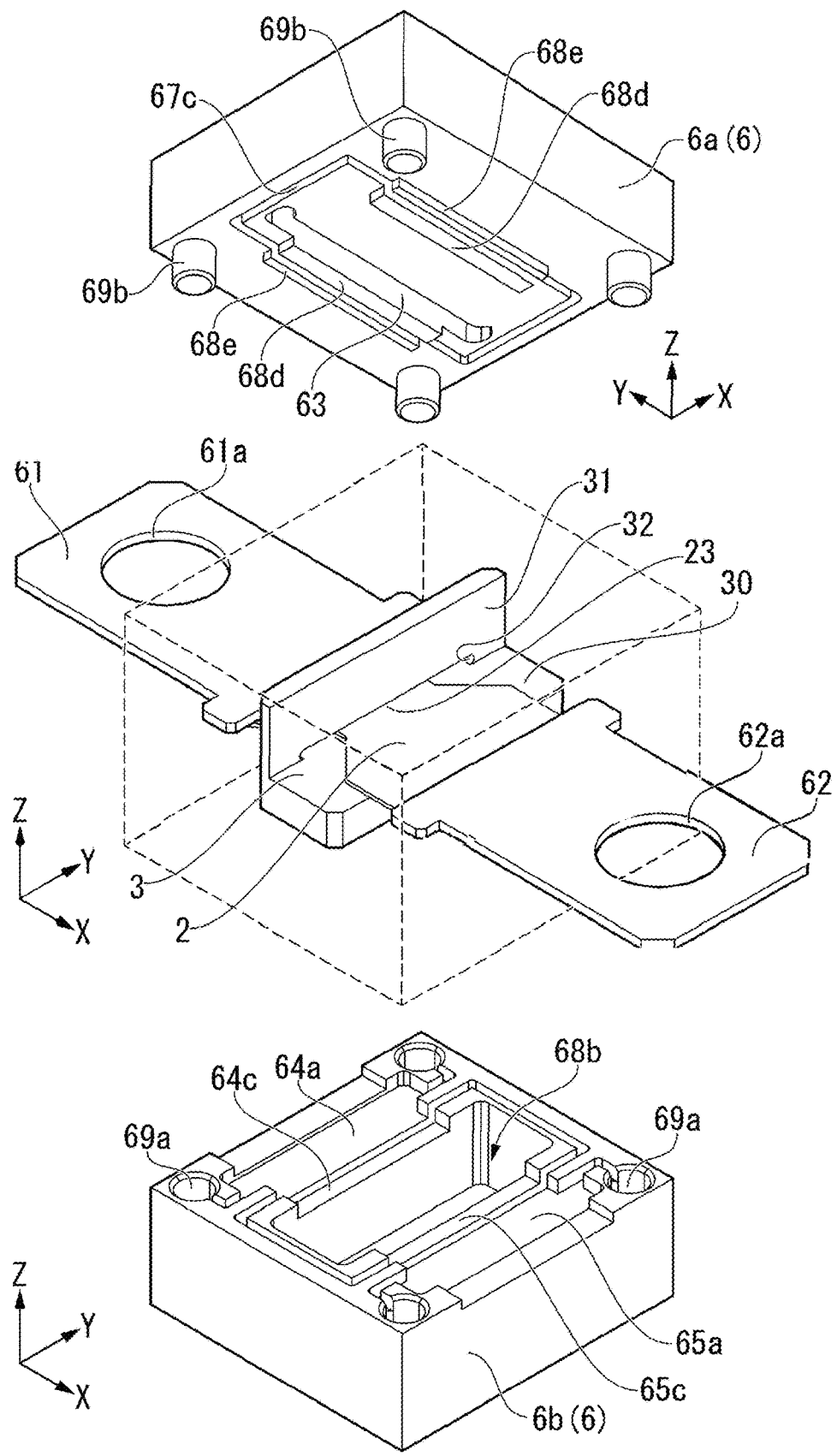
FIG. 18 An exploded perspective view of the protective element 100 of the fourth embodiment.

One among opposing joining faces of the first case 106*a* and the second case 106*b* has an adhesion area and an adhesive penetration prevention groove (see the adhesive penetration prevention groove 267 in FIG. 8 and the adhesive penetration prevention grooves 67*c*, 67*d* in FIG. 18, FIG. 22). The adhesive penetration prevention groove is provided between the adhesion area and the housing portion and prevents an adhesive from penetrating the housing portion.

As a material of the case 106, the same material as a material of a case 6 described below can be used.

As the material of the case 106, it is preferable to use one whose tracking resistance index CTI is 500 V or higher.

As the material of the case 106, it is preferable to use any resin material selected from a group consisting of a nylon resin, a polyphthalamide (PPA) resin, and a Teflon (registered trademark) resin.

(Heating Element)

The protective element 1000 of the first embodiment may be provided with a heating element that heats the fuse element.

The protective element 1000 of the first embodiment may be provided with a feeder line electrically connected to the heating element, and the feeder line may be pulled out to the outside via a feeder-line hole provided in the case.

The heating element is preferably a resistor made of an electrically conductive material that generates heat by being energized via the feeder line. As a material of the heating element, a material including a metal such as nichrome, W, Mo, or Ru can be mentioned.

Second Embodiment

Figure 7:
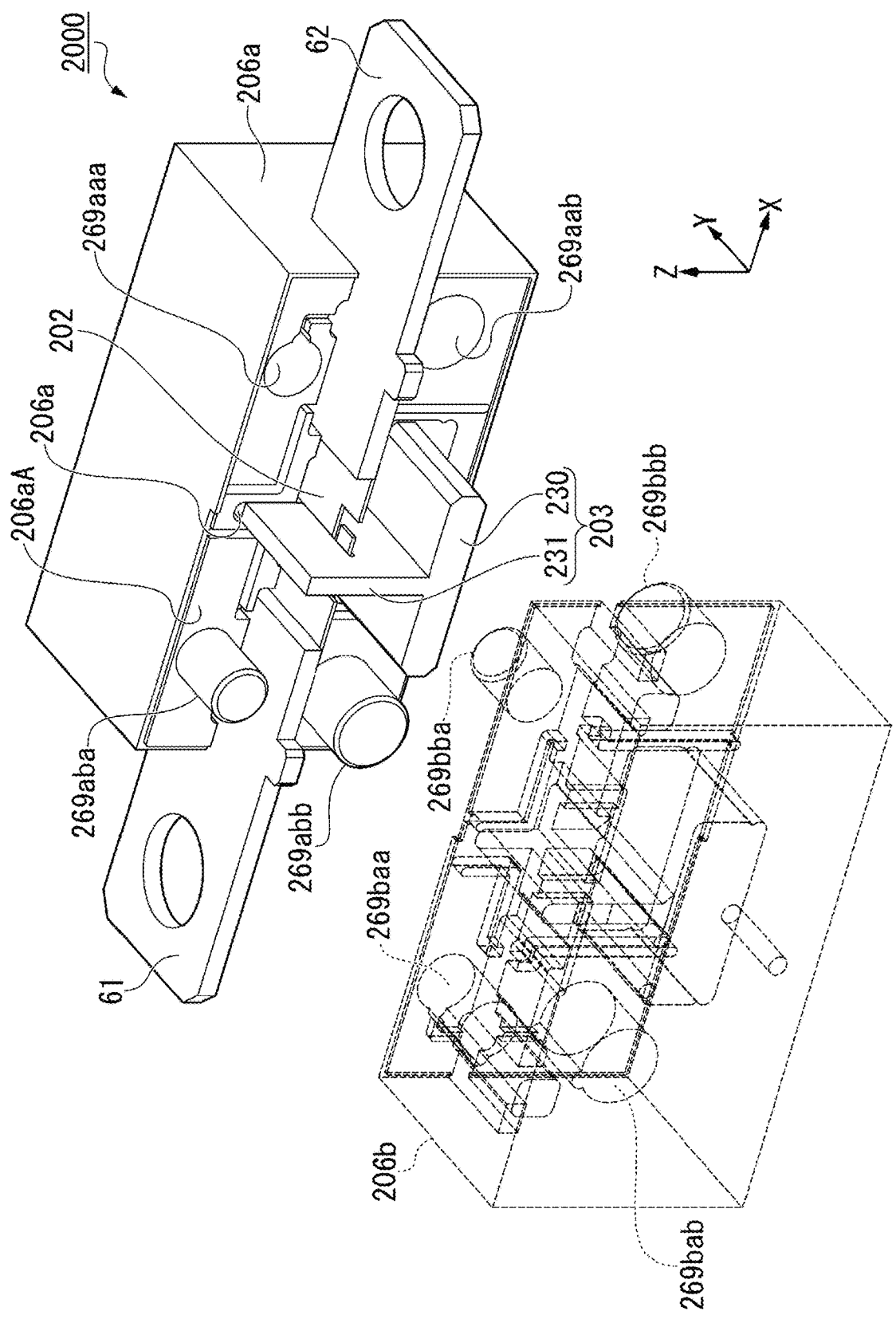
FIG. 7 An exploded perspective view illustrating an overall structure of a protective element 2000 of a second embodiment; a see-through exploded perspective view illustrating a second case so that its contents can be seen.
Figure 9:
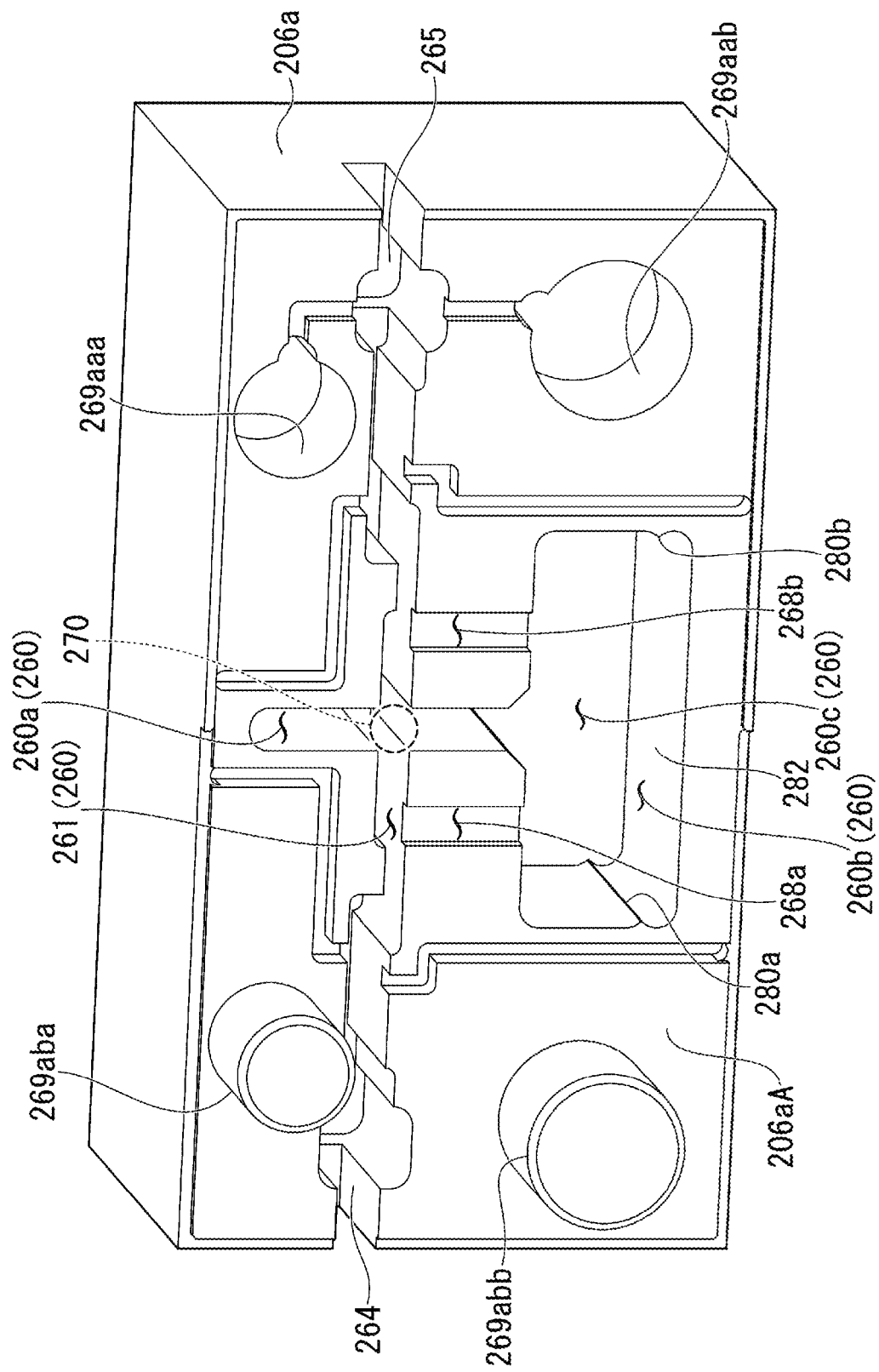
FIG. 9 A perspective view of a first case of the protective element 2000 of the second embodiment.

FIG. 7 is an exploded perspective view illustrating an overall structure of a protective element 2000 of the second embodiment. It is a see-through perspective view illustrating a second case 206*b* so that its contents can be seen. FIG. 8 is a side view illustrating the protective element 2000 of the second embodiment with the second case 206*b* removed. FIG. 9 is a perspective view of a first case 206*a*.

As illustrated in FIG. 7 to FIG. 9, the protective element 2000 of the present embodiment is provided with a fuse element 202 energized in the X direction (first direction); a slider 203 that is made of an insulating material and has a plate-shaped portion 230 extending in the X direction, a shielding portion 231 erected in the Z direction (second direction) orthogonal to the X direction from between a first edge portion 230*a* of the plate-shaped portion 230 and a second edge portion 230*b* that is an edge portion on an opposite side of the first edge portion 230*a*, and a shielding-portion through hole 232 that penetrates the shielding portion 231; and a case 206 that is made of an insulating material and has therein a housing portion 260 that houses a portion of the fuse element 202 and houses the slider 203. The housing portion 260 has a fuse-element housing space 261 that houses the fuse element 202, a shielding-portion housing space 260*a* that houses the shielding portion 231 and enables movement thereof in the Z direction, and a plate-shaped-portion moving space 260*b* that houses the plate-shaped portion 230 and enables movement thereof in the Z direction. The fuse-element housing space 261 and the shielding-portion housing space 260*a* intersect. Prior to the fuse element 202 being cut, the slider 203 and the fuse element 202 are housed in the case 206 in a state where the fuse element 202 is inserted into the shielding-portion through hole 232.

(Fuse Element)

Figure 10:
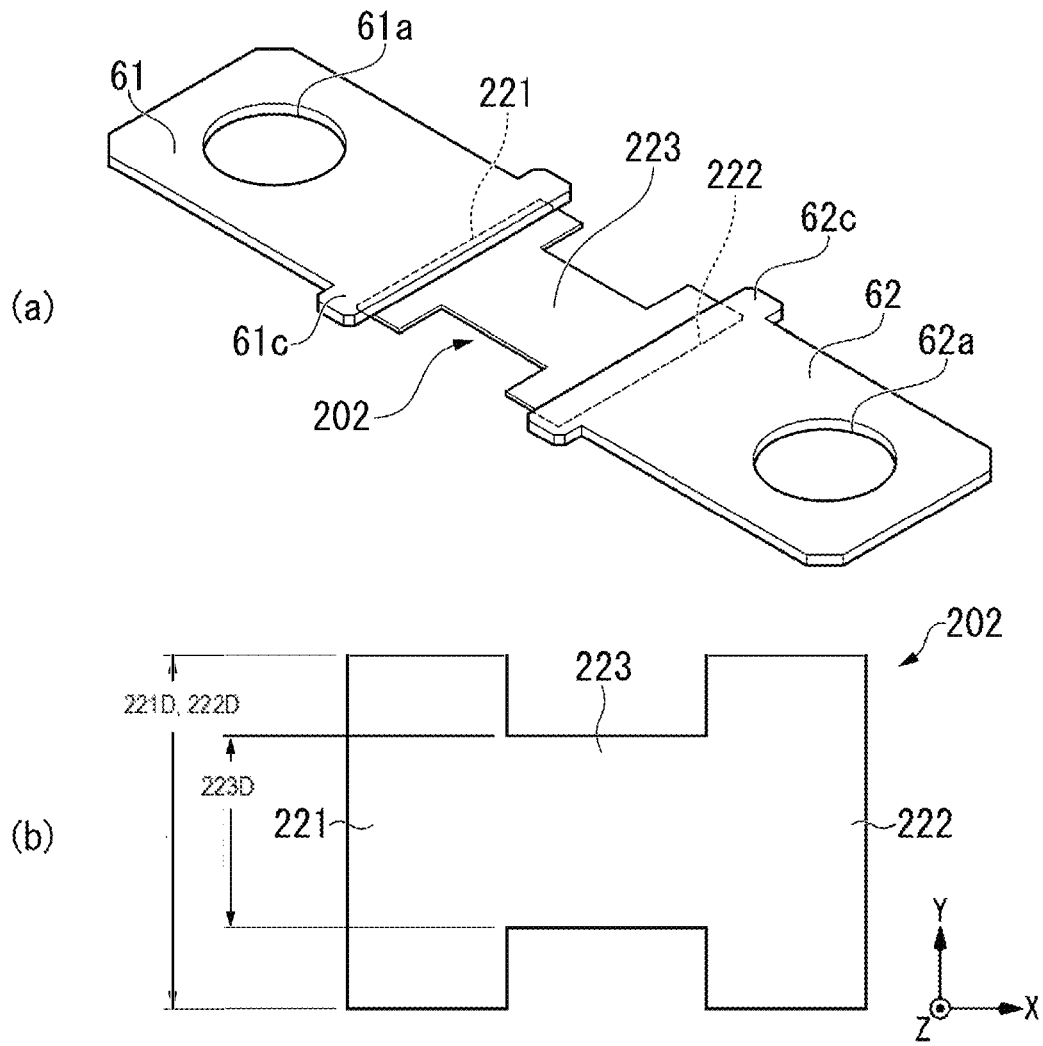
FIG. 10 An enlarged view for describing a portion of the protective element 2000 of the second embodiment. (a) is a perspective view illustrating a fuse element, the first terminal, and the second terminal. (b) is a plan view illustrating the fuse element.

FIG. 10 is an enlarged view for describing a portion of the protective element 2000 of the second embodiment. (a) in FIG. 10 is a perspective view illustrating the fuse element, the first terminal, and the second terminal. (b) in FIG. 10 is a plan view illustrating the fuse element. As illustrated in (a) and (b) in FIG. 10, the fuse element 202 has a first end portion 221, a second end portion 222, and a breaking portion 223 provided between the first end portion 221 and the second end portion 222. The fuse element 202 is energized in the X direction (first direction), which is a direction heading from the first end portion 221 to the second end portion 222.

As illustrated in (a) in FIG. 10, the first end portion 221 is electrically connected to the first terminal 61. The second end portion 222 is electrically connected to the second terminal 62. The first terminal 61 is provided with the external terminal hole 61*a*. Moreover, the second terminal 62 is provided with the external terminal hole 62*a*. Among the external terminal hole 61*a* and the external terminal hole 62*a*, one is used to connect to the power-source side, and the other is used to connected to the load side. Moreover, the external terminal hole 61*a* and the external terminal hole 62*a* may be connected to an energization path inside a load circuit. As illustrated in (a) in FIG. 10, flange portions (indicated by reference signs 61*c*, 62*c* in (a) in FIG. 10) widened to both sides toward the fuse element 202 may be provided at end portions on sides connected to the fuse element 2; this is not particularly limited. The details of the first terminal 61 and the second terminal 62 are described below.

A disposition relationship between the fuse element 202 and the shielding-portion through hole 232 is preferably a configuration in which among the first end portion 221, second end portion 222, and breaking portion 223 constituting the fuse element 202, the breaking portion 223 is disposed in the shielding-portion through hole 232 provided by the shielding portion 231 of the slider 203, as in the protective element 2000 illustrated in FIG. 8 and FIG. 9.

In this configuration, unlike the fuse disclosed in Patent Document 1, in the fuse element 202, the breaking portion 223 becomes a heat spot when an overcurrent flows through the fuse element; the breaking portion 223 is heated with priority and is reliably cut. As such, when the slider moves due to a pressure increase due to gas released in conjunction with an arc discharge at the time when the fuse element 202 is cut, because the fuse element 202 is already cut, the slider 203 does not need to physically sever the fuse element 202. This enables rapid movement. Cut faces of the broken breaking portion 223 are insulated by the shielding portion 231 of the slider 203, and an energization path via the fuse element 202 is reliably physically broken. Therefore, the arc discharge is rapidly quenched (extinguished).

A thickness of the fuse element 202 may be uniform as illustrated in FIG. 8 and FIG. 10 or may differ in portions. As a fuse element whose thickness differs in portions, for example, one whose thickness gradually increases in heading from the breaking portion 223 to the first end portion 221 and the second end portion 222 and one in which a metal plate is layered on the first end portion 221 and the second end portion 222 can be mentioned. In such a fuse element 202, the breaking portion 223 becomes a heat spot when an overcurrent flows through the fuse element; the breaking portion 223 is heated with priority and is more reliably cut.

As illustrated in (b) in FIG. 10, the breaking portion 223, the first end portion 221, and the second end portion 222 of the fuse element 202 have a substantially rectangular shape in a plan view. As illustrated in (b) in FIG. 10, a width 221D in the Y direction of the first end portion 221 and a width 222D in the Y direction of the second end portion 222 are substantially the same. A width 223D in the Y direction of the breaking portion 223 is narrower than the width 221D in the Y direction of the first end portion 221 and the width 222D in the Y direction of the second end portion 222. Thus, the width 223D of the breaking portion 223 is narrower than widths of regions other than the breaking portion 223. That is, a sectional area in the Y direction of the breaking portion 223 is smaller than sectional areas of regions other than the breaking portion 223.

As illustrated in FIG. 7, FIG. 8, and (a) in FIG. 10, the first end portion 221 of the fuse element 202 is disposed overlapping the first terminal 61 in a plan view, and the second end portion 222 is disposed overlapping the second terminal 62 in a plan view.

As illustrated in (b) in FIG. 10, the breaking portion 223 of the fuse element 202 has a narrower width in the Y direction (indicated by reference sign 223D in (b) in FIG. 10) than the first end portion 221 and the second end portion 222. Thus, the breaking portion 223 is cut more easily than a region between the breaking portion 223 and the first end portion 221 and a region between the breaking portion 223 and the second end portion 222.

In the present embodiment, as illustrated in (b) in FIG. 10, a fuse element in which the breaking portion 223 has a narrower width in the Y direction than the first end portion 221 and the second end portion 222 is described as an example of the fuse element 202. However, the fuse element is not limited to one in which the width in the Y direction of the breaking portion is narrower than the first end portion and the second end portion. In the present embodiment, the fuse element 102 illustrated in FIG. 3 may be used instead of the fuse element 202.

As illustrated in (b) in FIG. 10, a planar shape of the fuse element 202 overall is substantially rectangular. Compared to a general fuse element, its width in the Y direction is relatively wide, and its length in the X direction is relatively short. In the protective element 2000 of the present embodiment, the cut faces of the cut fuse element 202 are insulated by the shielding portion 231 of the slider 203. As a result, the arc discharge at the time when the fuse element 202 is cut is rapidly quenched (extinguished). As such, there is no need to decrease the width in the Y direction of the fuse element 202 to suppress the arc discharge; the width in the Y direction of the fuse element 202 can be made wide, and the length in the X direction can be made short. The protective element 2000 having such a fuse element 202 can suppress a resistance increase in a current path whereon the protective element 2000 is disposed and can thus also be preferably disposed on a current path of a large current.

Furthermore, it is also possible to provide, for example, a linear or band-shaped fuse element whose sectional area in the Y direction is uniform instead of the fuse element 202 illustrated in (b) in FIG. 10.

Figure 11:
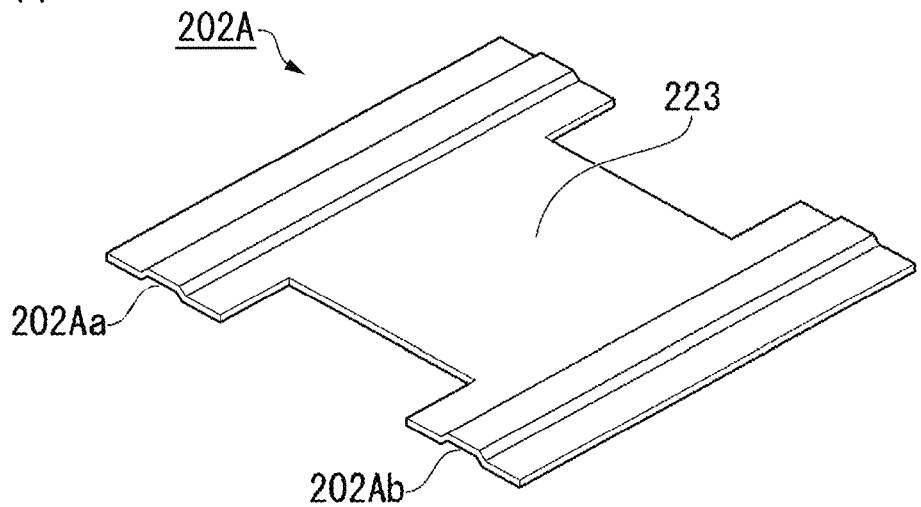
FIG. 11 A perspective view illustrating an example of another fuse element.

FIG. 11 illustrates an example of another fuse element.

The fuse element 202A illustrated in FIG. 11 is respectively provided with bent portions 202Aa, 202Ab, which mitigate stress from thermal expansion and thermal contraction in the X direction, on both sides interposing the breaking portion 223.

As a material of the fuse element 202, the same material as the fuse element 102 described above can be used.

(Slider)

FIG. 12 is a drawing for describing a structure of the slider 203 provided in the protective element 2000 of the second embodiment. (a) in FIG. 12 is a perspective view illustrating the slider 203 in a state where the fuse element 202 is inserted. (b) in FIG. 12 is a perspective view illustrating the slider 203; among a first slider member 203A and second slider member 203B constituting the slider 203, the second slider member 203B is depicted in a transparent manner to show a hidden structure of the first slider member 203A.

As illustrated in FIG. 12, the slider 203 has a sectional shape along the X direction that is substantially an inverted T shape.

As illustrated in FIG. 12, the slider 203 is provided with the plate-shaped portion 230 extending in the X direction (first direction) and the shielding portion 231 erected in the Z direction (second direction) orthogonal to the X direction (first direction) from between the first edge portion 230a of the plate-shaped portion 230 and the second edge portion 230b that is an edge portion on an opposite side of the first edge portion 230a. The shielding-portion through hole 232 that penetrates the shielding portion 231 is formed in the shielding portion 231. The fuse element 202 is disposed in the shielding-portion through hole 232. In the protective element 2000, the breaking portion 223 of the fuse element 202 is disposed in the shielding-portion through hole 232.

At the time of cutting the fuse element 202, when the plate-shaped portion 230 constituting the slider 203 receives pressure due to the gas released in conjunction with the arc discharge, the slider 203 moves in the Z direction.

In the protective element 2000, the shielding portion 231 is configured to be disposed in a central portion of the plate-shaped portion 230 in the X direction. That is, it is configured to be disposed in an intermediate position between the first edge portion 230a, which is one end of the plate-shaped portion 230 in the X direction, and the second edge portion 230b, which is an end on an opposite side. It can also be configured to be disposed in a position more toward one end of the plate-shaped portion 230 or configured to be more on one end side relative to the intermediate position between the first edge portion 230a that is one end of the plate-shaped portion 230 and the second edge portion 230b that is the end on an opposite side.

In the protective element 2000, the shielding-portion through hole 232 is disposed in a position away from a lower end 231b of the shielding portion 231, toward an upper-end 231a side. As such, the fuse element 202 is not supported on an upper face 230s of the plate-shaped portion 230 but is housed in and supported by the fuse-element housing space 261.

The slider 203 illustrated in FIG. 12 is configured by integrating the first slider member 203A and the second slider member 203B. If a procedure is adopted of setting the fuse element 202 in the shielding-portion through hole 232 prior to integration, a width (length in Y direction) of the shielding-portion through hole 232 may be shorter than the maximum lengths 221D, 222D in the Y direction of the fuse element 202 (see (b) in FIG. 10) but needs to be a dimension longer than the width 223D of the breaking portion 223 of the fuse element 202. For example, the width of the shielding-portion through hole 232 is preferably a dimension 0.5 to 2 mm longer and more preferably a dimension 0.5 to 1 mm longer than the width 223D of the breaking portion 223.

In a procedure of setting the fuse element 202 in the shielding-portion through hole 232 after integrating the first slider member 203A and the second slider member 203B, the width of the shielding-portion through hole 232 is preferably a dimension 0.5 to 2 mm longer and more preferably a dimension 0.5 to 1 mm longer than the maximum lengths 221D, 222D in the Y direction of the fuse element 202. The width of the shielding-portion through hole 232 being longer than the maximum length in the Y direction of the fuse element 202 by 0.5 mm or more enables the fuse element 202 to easily penetrate the shielding-portion through hole 232 when assembling the protective element 2000. This provides favorable productivity. The width of the shielding-portion through hole 232 being a dimension no greater than 2 mm longer than the maximum length in the Y direction of the fuse element 202 is preferable in that this does not negatively impact size reduction of the protective element 2000.

A height from a lower face to an upper face (length in Z direction) of the shielding-portion through hole 232 is preferably a dimension 0.03 to 0.2 mm longer and more preferably a dimension 0.05 to 0.1 mm longer than a maximum thickness of the fuse element 202. The height of the shielding-portion through hole 232 being a dimension longer than the maximum thickness of the fuse element 202 by 0.03 mm or more enables the fuse element 202 to easily penetrate the shielding-portion through hole 232 when assembling the protective element 2000. This provides favorable productivity.

The slider 203 is configured by integrating the first slider member 203A and the second slider member 203B. The first slider member 203A is made of a first shielding portion 231A and a first plate-shaped portion 230A. Moreover, the second slider member 203B is made of a second shielding portion 231B and a second plate-shaped portion 230B.

In the first slider member 203A, for integration with the second slider member 203B, a boss 230Aa and a fitting hole 230Ab that a boss of the second plate-shaped portion 230B fits into are provided on a face where the first plate-shaped portion 230A meets the second plate-shaped portion 230B. Likewise, in the second slider member 203B as well, for integration with the first slider member 203A, a boss and a fitting hole that the boss of the first plate-shaped portion 230A fits into are provided on a face where the second plate-shaped portion 230B meets the first plate-shaped portion 230A.

Moreover, in the first slider member 203A, for integration with the second slider member 203B, the first shielding portion 231A has a joining face 231Aa formed as a cutout in the Y direction in a face meeting the second shielding portion 231B. Likewise, in the second slider member 203B as well, for integration with the first slider member 203A, the second shielding portion 231B has a joining face formed as a cutout in the Y direction in a face meeting the first shielding portion 231A.

The respective bosses and fitting holes of the first slider member 203A and the second slider member 203B fitting together and the respective joining faces of the first slider member 203A and the second slider member 203B fitting together integrates the first slider member 203A and the second slider member 203B and assembles the slider 203.

The insertion of the fuse element 202 into the shielding-portion through hole 232 is set prior to the slider 203 being assembled. Depending on a hole size of the shielding-portion through hole 232, the fuse element 202 can be inserted into the shielding-portion through hole 232 after assembly of the slider 203. The first slider member 203A and the second slider member 203B may have their respective joining faces joined together by an adhesive.

Thicknesses in the Z direction of the plate-shaped portion 230 and the shielding portion 231 can be made identical to those of the plate-shaped portion 30 and shielding portion 31 of the fourth embodiment.

As a material of the slider 203, the same material as the slider 103 can be used.

(Case)

As illustrated in FIG. 7 to FIG. 9, the case 206 is substantially a rectangular parallelepiped and is two members integrated: the first case 206a and the second case 206b, which is disposed opposite the second case 206a. The case 206 is configured to interpose the fuse element and the slider from left and right by using the first case 206a and the second case 206b but is not limited to this configuration. For example, a configuration may be such that these are interposed from above and below as in the first embodiment described above.

As illustrated in FIG. 9, the case 206 in the protective element 2000 of the present embodiment has therein the housing portion 260 that houses the fuse element 202 and the slider 203. The housing portion 260 has the fuse-element housing space 261 housing the fuse element 202, the shielding-portion housing space 260a that houses the shielding portion 231 and enables movement thereof in the Z direction, the plate-shaped-portion moving space 260b that houses the plate-shaped portion 230 and enables movement thereof in the Z direction, and a plate-shaped-portion housing space 260c housing the plate-shaped portion 230. The plate-shaped-portion housing space 260c is a space that houses the plate-shaped portion 230 prior to the cutting of the fuse element 202, and the slider moving space 260b is a space in which the plate-shaped portion 230 moves at the time of cutting the fuse element 202.

The housing portion 260 is formed by disposing the first case 206a and the second case 206b opposite each other and integrating these.

A planar shape (shape in a Z-direction plan view) of the shielding-portion housing space 260a is a shape corresponding to a planar shape of the shielding portion 231 of the slider 203. Specifically, as illustrated in FIG. 7 and FIG. 8, the shielding-portion housing space 260a is preferably shaped so that the shielding portion 231 of the slider 203 fits into the shielding-portion housing space 260a while being near or touching an inner wall face of the shielding-portion housing space 260a. A difference between a distance between inner wall faces in the X direction of the shielding-portion housing space 260a and an X-direction thickness of the shielding portion 231 of the slider 203 can be made to be, for example, 0.03 to 0.2 mm, and 0.05 to 0.1 mm is preferable.

When the difference between the distance between inner wall faces in the X direction of the shielding-portion housing space 260a and the X-direction thickness of the shielding portion 231 of the slider 203 is 0.03 mm or greater, movement of the shielding portion 231 of the slider 203 in the shielding-portion housing space 260a is smooth, and the arc discharge is more rapidly and reliably quenched. This is because the shielding portion 231 of the slider 203 is less likely to get caught in the shielding-portion housing space 260a when this difference is 0.03 mm or greater. Therefore, when this separation distance is 0.03 mm or greater, the shielding portion 231 does not separate from the slider 203 before the slider 203 moves, and the shielding-portion housing space 260a is not destroyed before the slider moves.

Furthermore, when this separation distance is 0.2 mm or less, the shielding-portion housing space 260a functions as a guide for moving the slider 203 to a predetermined position at the time of cutting the fuse element 202. Therefore, position shifting of the slider 203 that moves at the time of cutting the fuse element 202 is prevented, and the arc discharge is more rapidly and reliably quenched.

A planar shape (shape in a Z-direction plan view) of the plate-shaped-portion moving space 260b is a shape corresponding to a shape of the plate-shaped portion 230 of the slider 203. Specifically, the planar shape of the plate-shaped-portion moving space 260b is shaped so that the plate-shaped portion 230 of the slider 203 fits into the plate-shaped-portion moving space 260b while being near or touching an inner wall face of the plate-shaped-portion moving space 260b.

Differences in each direction between inner-wall-face intervals in the X direction and the Y direction of the plate-shaped-portion moving space 260b and lengths in the X direction and the Y direction of the plate-shaped portion 230 of the slider 203 can be made to be, for example, 0.03 to 0.2 mm, and 0.05 to 0.1 mm is preferable. When the differences in each direction between the inner-wall-face intervals in the X direction and the Y direction of the plate-shaped-portion moving space 260b and the lengths in the X direction and the Y direction of the plate-shaped portion 230 of the slider 203 are 0.03 to 0.2 mm, a pressure increase in a space on a shielding-portion 231 side of the plate-shaped portion 230 in the housing portion 260 due to the arc discharge at the time of the cutting of the breaking portion 223 of the fuse element 202 causes the slider 203 to move smoothly, and the arc discharge is more rapidly and reliably quenched.

Among four corner portions of a face of the first case 206*a* opposing the second case 206*b*, a substantially cylindrical joining convex portion 269*aba* and joining convex portion 269*abb* are respectively provided in two corner portions. Moreover, a joining hole 269*aaa* and joining hole 269*aab* are respectively provided in the other two corner portions. Likewise, among four corner portions of a face of the second case 206*b* opposing the first case 206*a*, a substantially cylindrical joining convex portion 269*bba* and joining convex portion 269*bbb* are respectively provided in two corner portions. Moreover, a joining hole 269*baa* and joining hole 269*bab* are respectively provided in the other two corner portions.

In the illustrated protective element 2000, the joining convex portion 269*aba* and joining hole 269*baa*, the joining convex portion 269*abb* and joining hole 269*bab*, the joining convex portion 269*bba* and joining hole 269*aaa*, and the joining convex portion 269*bbb* and joining hole 269*aab* are respectively fitted. This precisely fixes the first case 206*a* and the second case 206*b* in a predetermined position.

In the illustrated protective element 2000, an example is described in which a substantially cylindrical joining convex portion 269*aba*, joining convex portion 269*abb*, joining convex portion 269*bba*, and joining convex portion 269*bbb* are provided. However, a shape of the joining convex portion is not limited to being substantially cylindrical. For example, this may have an oval, elliptical, or polygonal sectional shape.

Moreover, in the illustrated protective element 2000, an example is described in which a substantially cylindrical joining hole 269*aaa*, joining hole 269*aab*, joining hole 269*baa*, and joining hole 269*bab* are provided. However, a shape of the joining hole is not limited to being substantially cylindrical. For example, this may have an oval, elliptical, or polygonal sectional shape according to the shape of the joining convex portion.

Furthermore, in the illustrated protective element 2000, the first case 206*a* and the second case 206*b* are each configured to be provided with joining convex portions and joining holes. However, a configuration may be adopted in which one case is provided with only joining convex portions and the other case is provided with only joining holes.

Furthermore, in the illustrated protective element 2000, the first case 206*a* and the second case 206*b* are each a case configured to be provided with two joining convex portions and two joining holes. However, these components are not limited to being two each, and one of each component or three or more of each component may be provided. This can be determined as appropriate according to, for example, planar shapes of the first case 206*a* and second case 206*b*.

Moreover, sizes of the joining convex portion and joining hole are not limited in particular and can be determined as appropriate according to, for example, thicknesses and planar shapes of the first case 206*a* and second case 206*b*.

In the illustrated protective element 2000, an adhesive penetration prevention groove 267 is provided, in a joining face 206*a*A contacting the second case 206*b* of the first case 206*a*, so as to surround the housing portion 260.

At least one among the opposing faces of the first case 206*a* and the second case 206*b* has an adhesion area and an adhesive penetration prevention groove. The adhesive penetration prevention groove is disposed between the adhesion area and the housing portion 260 and suppresses penetration of an adhesive into the housing portion 260.

A first insertion hole 264 and a second insertion hole 265 respectively communicated to both ends in the X direction of the fuse-element housing space 261 are provided. The first insertion hole 264 and the second insertion hole 265 are formed by disposing the first case 206*a* and the second case 206*b* opposite each other and integrating these.

The first terminal 61 is housed in the first insertion hole 264. Moreover, the second terminal 62 is housed in the second insertion hole 265.

The case 206 has internal leak holes 268*a*, 268*b* communicating the fuse-element housing space 261 and the plate-shaped-portion housing space 260*c*.

Increased pressure in the fuse-element housing space 261 due to the discharge at the time of cutting the fuse element slides the slider 203 via the internal leak holes 268*a*, 268*b*.

The internal leak holes 268*a*, 268*b* have a substantially cylindrical shape. In the present embodiment, an example is described in which the internal leak holes 268*a*, 268*b* are substantially cylindrical. However, a shape of the internal leak holes 268*a*, 268*b* is not limited to being substantially cylindrical and may be a tubular shape having, for example, an oval, elliptical, or polygonal sectional shape.

Furthermore, the present embodiment describes an example in which two internal leak holes are provided. However, a number of internal leak holes is not limited in particular and may be one or three or more. However, in a configuration in which a plurality of internal leak holes is provided, the plurality of internal leak holes is preferably disposed so that the increased pressure in the fuse-element housing space 261 is evenly applied to the slider 203 in the movement direction thereof (Z direction). The dispositional configuration of the plurality of internal leak holes whereby pressure is evenly applied to the slider 203 in the movement direction thereof depends on an internal structure of the case but can be realized by, for example, disposing the plurality of internal leak holes at equal intervals or disposing the plurality of internal leak holes in rotationally symmetrical positions relative to the Z direction.

The case 206 has an external leak hole 271 communicating the slider moving space 260*b* to outside the case 206 in a wall face 281 orthogonal to the Y direction of the first case 206*a*.

The external leak hole 271 has a substantially cylindrical shape. In the present embodiment, an example is described in which the external leak hole 271 is substantially cylindrical. However, a shape of the external leak hole 271 is not limited to being substantially cylindrical and may be a tubular shape having, for example, an oval, elliptical, or polygonal sectional shape.

Furthermore, the present embodiment describes an example in which one external leak hole 271 is provided. However, a number of external leak holes is not limited in particular and may be two or more.

The external leak hole 271 is plugged by a lateral face of the plate-shaped portion 230 when the slider 203 moves downward and is thus preferably provided toward a bottom face 282 of the slider moving space 260*b* so as to not be plugged prior to the slider 203 moving all the way. The external leak hole 271 may be provided in the bottom face 282 of the slider moving space 260*b*.

As a material of the case 206, the same material as the case 106 can be used.

(Production Method of Protective Element)

Next, a production method of the protective element 2000 of the present embodiment is described using an example.

To produce the protective element 2000 of the present embodiment, the fuse element 202, first terminal 61, and second terminal 62 illustrated in FIG. 10 are prepared. Then, as illustrated in FIG. 10, the first terminal 61 is connected by being soldered onto the first end portion 221 of the fuse element 202. Moreover, the second terminal 62 is connected by being soldered onto the second end portion 222. A known solder material may be used for soldering in the present embodiment. From a standpoint of resistivity and melting point, one whose main component is Sn is preferably used.

The first end portion 221 and second end portion 222 of the fuse element 202, the first terminal 61, and the second terminal 62 may be connected by being joined by welding or may be connected by being mechanically joined using a rivet, a screw, or the like; a known joining method can be used.

Next, the slider 203 illustrated in FIG. 12 is prepared. Then, the first slider member 203A and the second slider member 203B are joined in a state where the breaking portion 223 of the fuse element 202 is disposed in the shielding-portion through hole 232 of the slider 203.

Next, the first case 206*a* and second case 206*b* illustrated in FIG. 7 are prepared. Then, as partially illustrated in (a) in FIG. 12, a member in which the fuse element 202, the first terminal 61 and second terminal 62, and the slider 203 are integrated is prepared. Next, this integrated member is disposed in the first case 206*a*. The member in which the fuse element 202, the first terminal 61 and second terminal 62, and the slider 203 are integrated may be disposed in the second case 206*b*.

Afterward, the joining convex portion 269*aba* and joining hole 269*baa*, the joining convex portion 269*abb* and joining hole 269*bab*, the joining convex portion 269*bba* and joining hole 269*aaa*, and the joining convex portion 269*bbb* and joining hole 269*aab* are fitted, thereby joining the first case 206*a* and the second case 206*b*.

An adhesive can be used as necessary to join the first case 206*a* and the second case 206*b*. As the adhesive, for example, an adhesive including a thermosetting resin can be used.

When joining the first case 206*a* and the second case 206*b*, the adhesive penetration prevention groove 267 provided in the first case 206*a* and an adhesive penetration prevention groove (not illustrated) provided in the second case 206*b* are disposed opposing each other, so as to overlap each other in a plan view, and joined. This forms the fuse-element housing space 261, the shielding-portion housing space 260*a*, the plate-shaped-portion moving space 260*b*, the plate-shaped-portion housing space 260*c*, the internal leak holes 268*a*, 268*b*, and the like in the case 206.

This places a portion of the first terminal 61 and second terminal 62 connected to the fuse element 202 in a state of being exposed outside the case 206.

The above steps provide the protective element 2000 of the present embodiment.

(Operations of Protective Element)

Next, operations of the protective element 2000 when a current exceeding a rated current flows through the fuse element 202 of the protective element 2000 of the present embodiment are described using the drawings.

Figure 13:
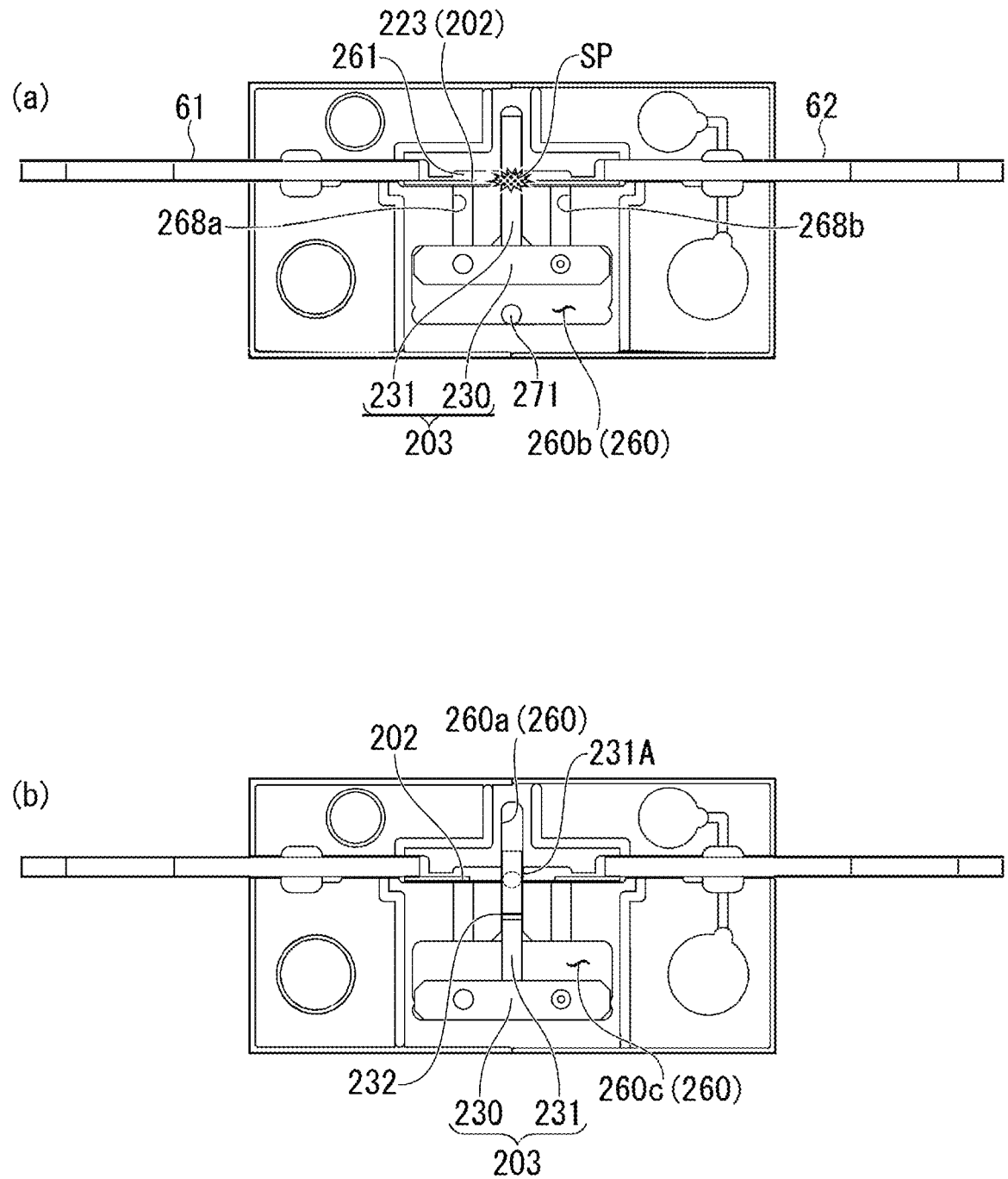
FIG. 13 A diagram for describing operations of the protective element 2000 of the second embodiment. (a) is a sectional view schematically illustrating a state where a spark is generated between cut faces of a breaking portion. (b) is a sectional view illustrating a state where an arc is discharged and a pressure increase in a fuse-element housing space moves the slider downward.

FIG. 13 is a diagram for describing the operations of the protective element 2000 of the present embodiment. (a) is a sectional view schematically illustrating a state where a spark is generated between cut faces of the breaking portion 223. (b) is a sectional view illustrating a state where an arc is discharged and a pressure increase in the fuse-element housing space 261 moves the slider 203 downward.

When a current exceeding a rated current flows through the fuse element 202 of the protective element 2000 of the present embodiment, the fuse element 202 increases in temperature due to heat generation from the overcurrent. Then, the breaking portion 223 of the fuse element 202 disposed in the shielding-portion through hole 232 of the slider 203 is softened and cut due to the temperature increase. At this time, as illustrated in (a) in FIG. 13, a spark (reference sign SP) is generated between the cut faces of the breaking portion 223, and an arc is discharged. When the arc is discharged, pressure in the fuse-element housing space 261 increases.

The pressure increase in the fuse-element housing space 261 applies, via the internal leak holes 268*a*, 268*b*, a pressure that presses an upper face of the slider 203, and the slider 203 moves downward (see (b) in FIG. 13). That is, the plate-shaped portion 230 of the slider 203 housed in the plate-shaped-portion housing space 260*c* moves into the slider moving space 260*b*. For the shielding portion 231 housed in the shielding-portion housing space 260*a*, a portion of the shielding portion moves into the plate-shaped-portion housing space 260*c*. As a result, as illustrated in (b) in FIG. 13, an intersecting portion 270 (the dotted-line circle in FIG. 9) where the fuse-element housing space 261 and the shielding-portion housing space 260*a* were intersecting is plugged by the shielding portion 231 (in (b) in FIG. 13, a part (a vicinity of the dotted-line circle) plugging the intersecting portion 270 of the shielding portion 231 is indicated by reference sign 231A). Thus, the cut faces of the cut breaking portion 223 are insulated by the shielding portion 231 of the slider 203, and an energization path via the fuse element 202 is reliably physically broken. Therefore, the arc discharge is rapidly quenched (extinguished).

Furthermore, as illustrated in FIG. 8 and FIG. 9, fixing portions 280*a*, 280*b* that touch the lateral face (first edge portion 230*a*, second edge portion 230*b*) of the plate-shaped portion 230 and suppress rebounding of the slider 203 are preferably provided in a portion of the slider moving space 260*b*. Providing the fixing portions 280*a*, 280*b* makes rebounding whereby the moved slider 203 returns to its original position less likely to occur and more reliably quenches the arc discharge.

The fixing portions 280*a*, 280*b* illustrated in FIG. 8 and FIG. 9 are structures raised in a direction perpendicular to the inner wall face. However, the fixing portions are not limited to these structures as long as they are structures that can touch and suppress rebounding of the slider 203. Moreover, the fixing portions 280*a*, 280*b* illustrated in FIG. 8 and FIG. 9 are configured so that one fixing portion is provided on each wall face. However, a configuration may be such that two or more are provided on each wall face.

In the present embodiment, even if the slider 203 starts to move due to the pressure increase in the fuse-element housing space 261, gas in the slider moving space 260*b* is exhausted to outside the slider moving space 260*b* via the external leak hole 271. This suppresses a pressure increase in the slider moving space 260*b*. Therefore, movement of the slider 203 is not impeded by a pressure increase in the slider moving space 260*b*, and the slider 203 moves rapidly. As a result, in the protective element 2000 of the present embodiment, the arc discharge is more rapidly and reliably quenched. Moreover, the slider moving space 260*b* being destroyed due to a pressure increase in the slider moving space 260*b* can be prevented. This provides excellent safety.

The external leak hole 271 is plugged by the lateral face of the plate-shaped portion 230 when the slider 203 moves downward due to the pressure increase in the fuse-element housing space 261.

The protective element 2000 of the present embodiment is provided with the fuse-element housing space 261 housing the fuse element 202. As such, compared to a structure in which no fuse-element housing space 261 is provided, a pressure change in the fuse-element housing space 261 due to the arc discharge at the time of the cutting of the breaking portion 223 of the fuse element 202 is more likely to be a sharp change. Moreover, this pressure increase immediately acts on the plate-shaped portion 230 of the slider 203 via the narrow internal leak holes 268a, 268b. As a result, movement of the slider 203 due to the pressure increase in the fuse-element housing space 261 becomes swift, and the arc discharge is more rapidly and reliably quenched.

In the protective element 2000 of the present embodiment, when the pressure in the fuse-element housing space 261 of the case 206 increases due to the arc discharge at the time of the cutting of the breaking portion 223 of the fuse element 202, this pressure increase immediately acts on the plate-shaped portion 230 of the slider 203 via the internal leak holes 268a, 268b, moving the slider 203. The movement of the slider 203 causes the shielding portion 231 to plug the intersecting portion 270 where the fuse-element housing space 261 and the shielding-portion housing space 260a were intersecting. As a result, the cut faces of the cut breaking portion 223 are shielded and insulated by the shielding portion 231 of the slider 203. As a result, the arc discharge at the time when the fuse element 202 is cut is rapidly quenched (extinguished). Therefore, the protective element 2000 of the present embodiment can also be preferably disposed in, for example, a current path of a high voltage and a large current.

Third Embodiment

Figure 14:
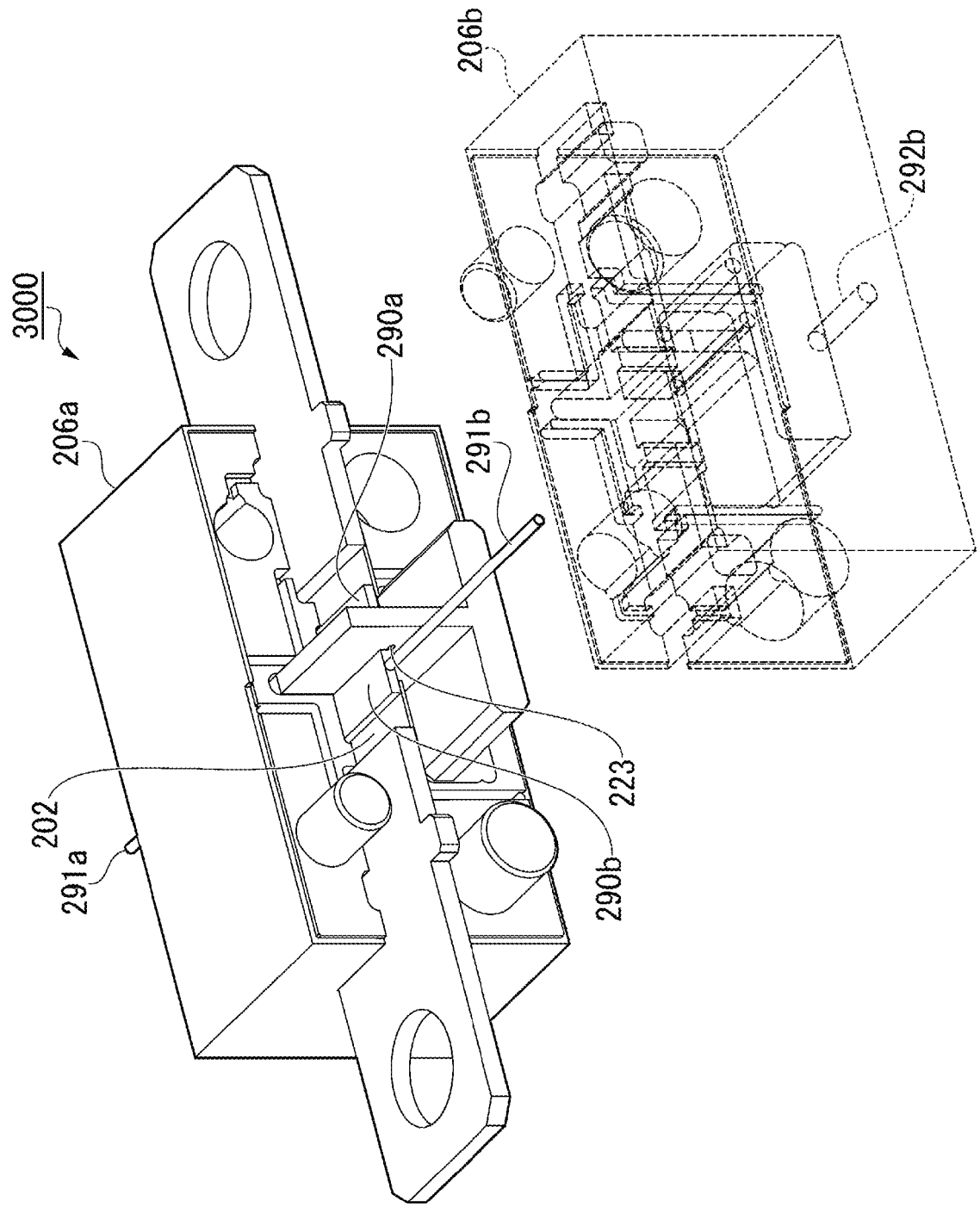
FIG. 14 An exploded perspective view illustrating an overall structure of a protective element 3000 of a third embodiment; a see-through exploded perspective view illustrating the second case so that its contents can be seen.
Figure 15:
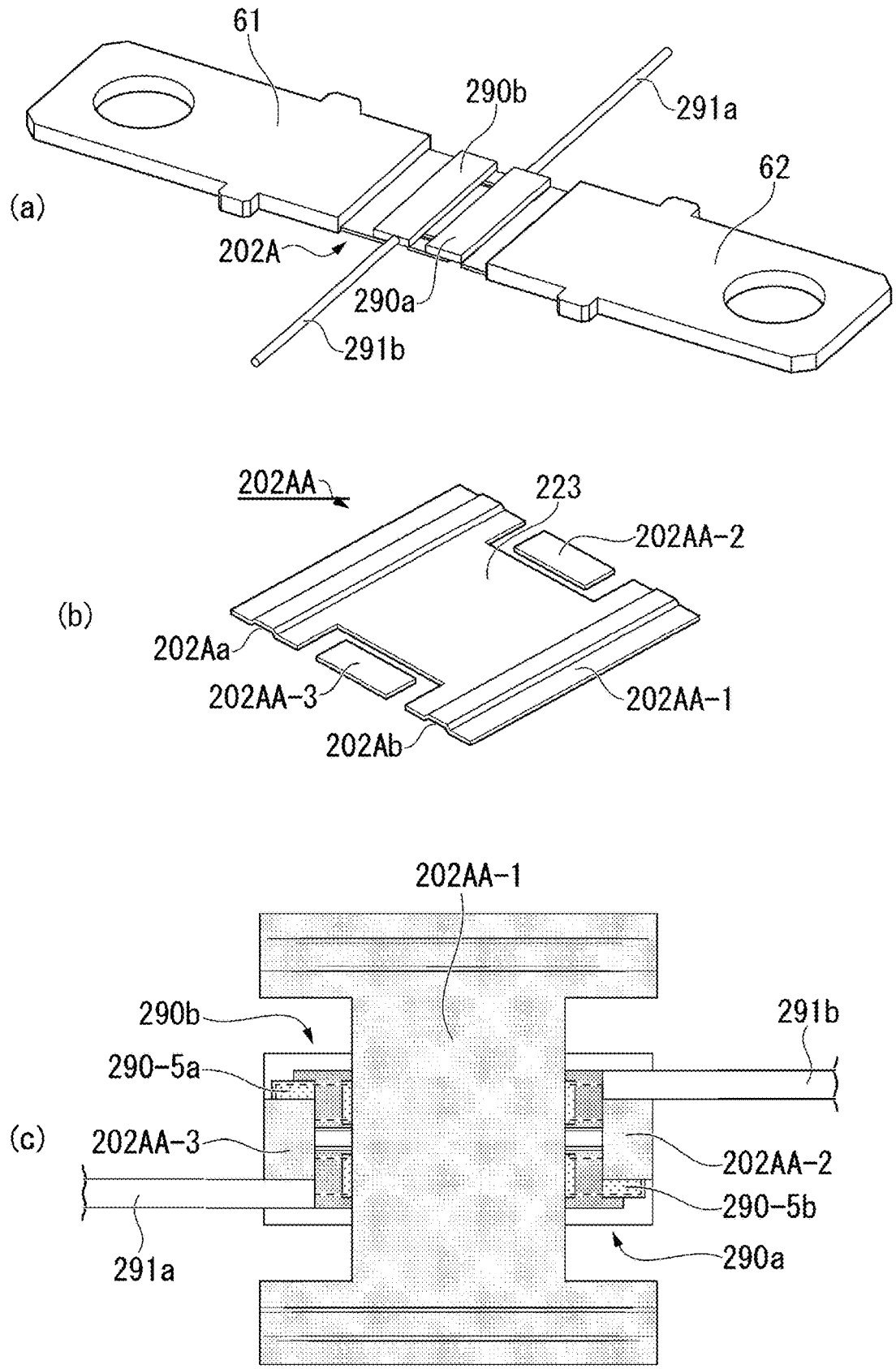
FIG. 15 An illustration of one example of a dispositional configuration of heating elements provided by the protective element 3000 of the third embodiment. (a) is a perspective view illustrating two heating elements, a feeder line to each heating element, a fuse element, the first terminal, and the second terminal. (b) is a perspective view illustrating the fuse element. (c) is a plan view from a fuse-element side for illustrating positional relationships as seen from a Z direction of the fuse-element between the two heating elements, the feeder lines to each heating element, and the fuse element.
Figure 16:
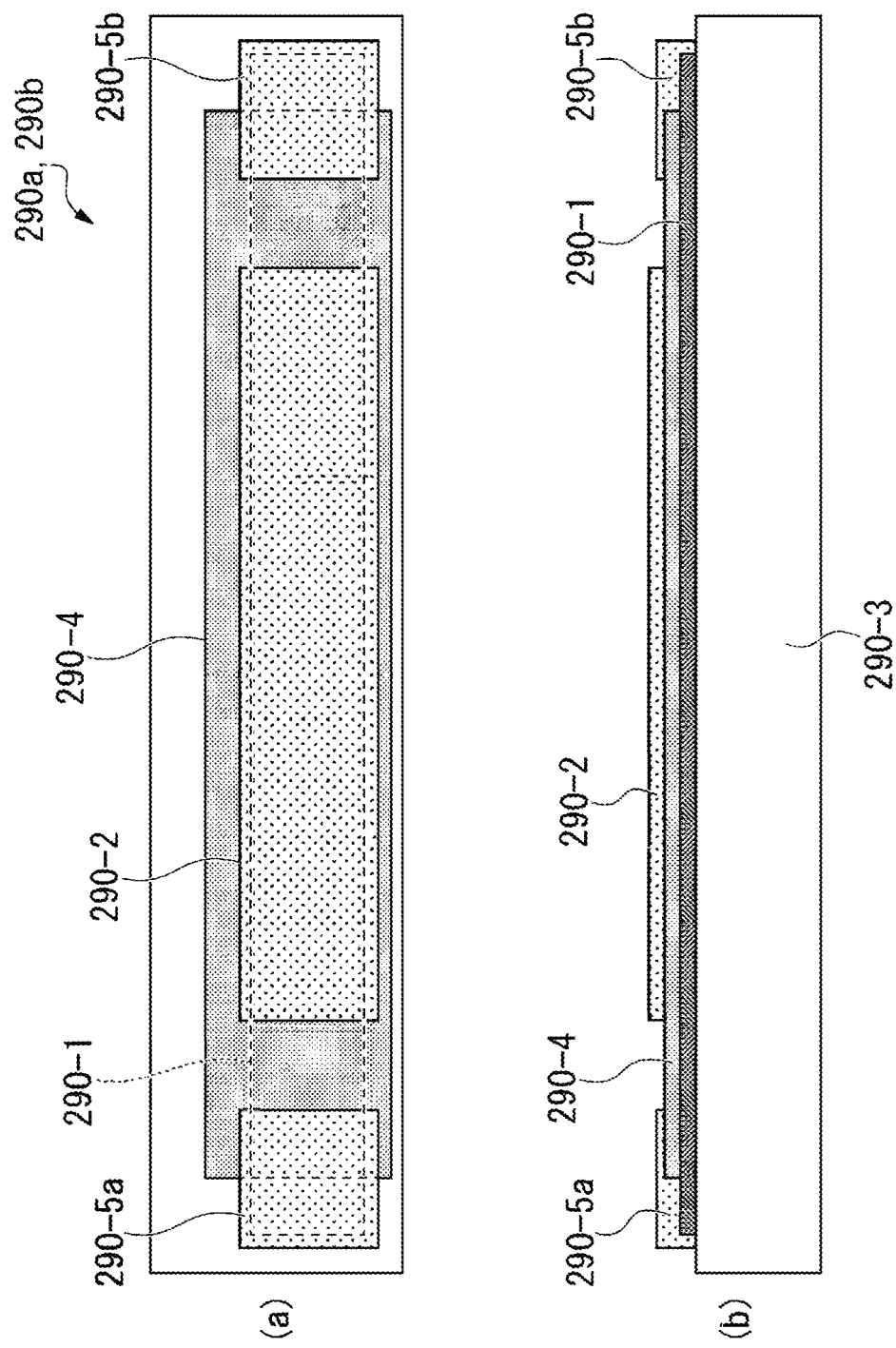
FIG. 16 An illustration of one example of a structure of the heating element provided by the protective element 3000 of the third embodiment. (a) is a plan view, and (b) is a sectional view.

FIG. 14 is an exploded perspective view illustrating an overall structure of a protective element 3000 of a third embodiment. In FIG. 14, the perspective angle differs from FIG. 7. FIG. 14 is a see-through perspective view illustrating the second case 206b so that its contents can be seen. FIG. 15 illustrates one example of a dispositional configuration of heating elements provided by the protective element 3000 of the third embodiment. (a) is a perspective view illustrating two heating elements, a feeder line to each heating element, a fuse element, the first terminal, and the second terminal. (b) is a perspective view illustrating the fuse element. (c) is a plan view from a fuse-element side for illustrating positional relationships as seen from the Z direction of the fuse-element between the two heating elements, the feeder lines to each heating element, and the fuse element. FIG. 16 illustrates one example of a structure of the heating element provided by the protective element 3000 of the third embodiment. (a) is a plan view, and (b) is a sectional view.

As illustrated in FIG. 14, the protective element 3000 of the third embodiment is provided with the same configuration as the protective element 2000 of the second embodiment other than being provided with heating elements 290a, 290b that cut the breaking portion 223, feeder lines 291a, 291b that supply a current to the heating elements 290a, 290b, and heating-element fuse elements 202AA-2, 202AA-3.

As illustrated in FIG. 16, the heating elements 290a, 290b have a resistive layer 290-1 and also have an electrode layer 290-2 on a surface on the fuse-element side. The heating elements 290a, 290b are also provided with an insulating substrate 290-3 whereon the resistive layer 290-1 is formed, an insulating layer 290-4 covering the resistive layer 290-1, and heating-element electrodes 290-5a, 290-5b formed at both ends of the insulating substrate 290-3. The resistive layer 290-1 is made of a material having electrical conductivity that generates heat when energized such as nichrome, W, Mo, or Ru or a material including such. A powder of an alloy, composition, or compound of such is mixed with a resin binder or the like and made into a paste. This paste is formed into a pattern using screen printing technology on the insulating substrate 290-3, and this is fired and the like to form the resistive layer. The insulating substrate 290-3 is a substrate having insulating properties made of, for example, alumina, a glass-ceramic, mullite, or zirconia. The insulating layer 290-4 is provided for protection and insulation of the resistive layer 290-1 and to efficiently transfer heat generated by the resistive layer 290-1 to the fuse element.

As illustrated in (b) in FIG. 15, a fuse element 202AA is made of a first portion 202AA-1, a second portion (heating-element fuse element) 202AA-2, and a third portion (heating-element fuse element) 202AA-3.

In the protective element 3000 of the third embodiment, as illustrated in FIG. 14, the heating elements 290a and 290b are disposed contacting the breaking portion 223 in the fuse-element housing space 261. The heating elements 290a and 290b are connected in parallel via the heating-element fuse elements 202AA-2 and 202AA-3, the feeder line 291a is connected to one terminal of the heating element 290a, and the feeder line 291b is connected the other terminal of the heating element 290b. That is, a first path of "feeder line 291a~heating element 290a~heating-element fuse element 202AA-2~feeder line 291b" and a second path of "feeder line 291b~heating element 290b~heating-element fuse element 202AA-3~feeder line 291a" are connected in parallel.

The heating elements 290a and 290b have the function of heating and cutting the breaking portion 223 of the fuse element 202AA and heating and softening the heating-element fuse elements 202AA-2 and 202AA-3. When an abnormality occurs in the external circuit that will be the energizing path of the protective element 3000 and the energizing path must be broken, the heating elements 290a and 290b cause energization and heat using a current control element provided in the external circuit. Moreover, when the fuse element 202AA is broken, the slider 203 moves due to pressure caused by arc discharge, power being supplied to the heating elements 290a and 290b is broken by breaking (severing) the heating-element fuse elements 202AA-2 and 202AA-3, and the heating of the heating elements 290a and 290b is stopped. The heating elements 290a and 290b are not limited to those illustrated in FIG. 16, and a known heating element can be used. The feeder line 291b extends from the fuse-element housing space 261 to the outside via a through hole 292b formed on the second case 206b. Similarly, the feeder line 291a extends from the fuse-element housing space 261 to the exterior via a through hole (not illustrated) formed on the first case 206a.

In the protective element 3000 of the third embodiment, similarly to the protective element 2000 of the second embodiment, when the pressure in the fuse-element housing space 261 rises due to arc discharge generated when the breaking portion 223 of the fuse element 202 is cut, this pressure increase immediately acts on the plate-shaped portion 230 of the slider 203 via the internal leak holes 268a and 268b to move the slider 203. Due to the movement of the slider 203, the intersecting portion 270 where the fuse-element housing space 261 and the shielding-portion housing space 260a intersect is blocked by the shielding portion 231. As a result, the cut faces of the cut breaking portion 223 are insulated by the shielding portion 231 of the slider 203. As a result, the arc discharge generated when cutting the fuse element 202 is rapidly quenched (extinguished). Therefore, in the protective element 3000 of the present embodiment, similarly to the protective element 2000 of the second embodiment, the arc discharge generated when cutting the fuse element 202 is rapidly quenched (extinguished).

Furthermore, in the protective element 3000 of the third embodiment illustrated in FIG. 14, the heating elements 290a and 290b for cutting the breaking portion 223 are disposed contacting the breaking portion 223 in the fuse-element housing space 261. Therefore, when an abnormality occurs in the external circuit that will be the energizing path of the protective element 3000 and the energizing path must be blocked, energization is performed using a current control element provided in the external circuit, the heating elements 290a and 290b heat up, and the breaking portion 223 is efficiently heated. Moreover, when the fuse element 202 is cut, the slider 203 moves, power being supplied to the heating elements 290a and 290b is blocked by cutting off the heating-element fuse elements 202AA-2 and 202AA-3, and the heating of the heating elements 290a and 290b is stopped. Therefore, the protective element 3000 of the present embodiment has excellent safety.

Fourth Embodiment

Figure 17:
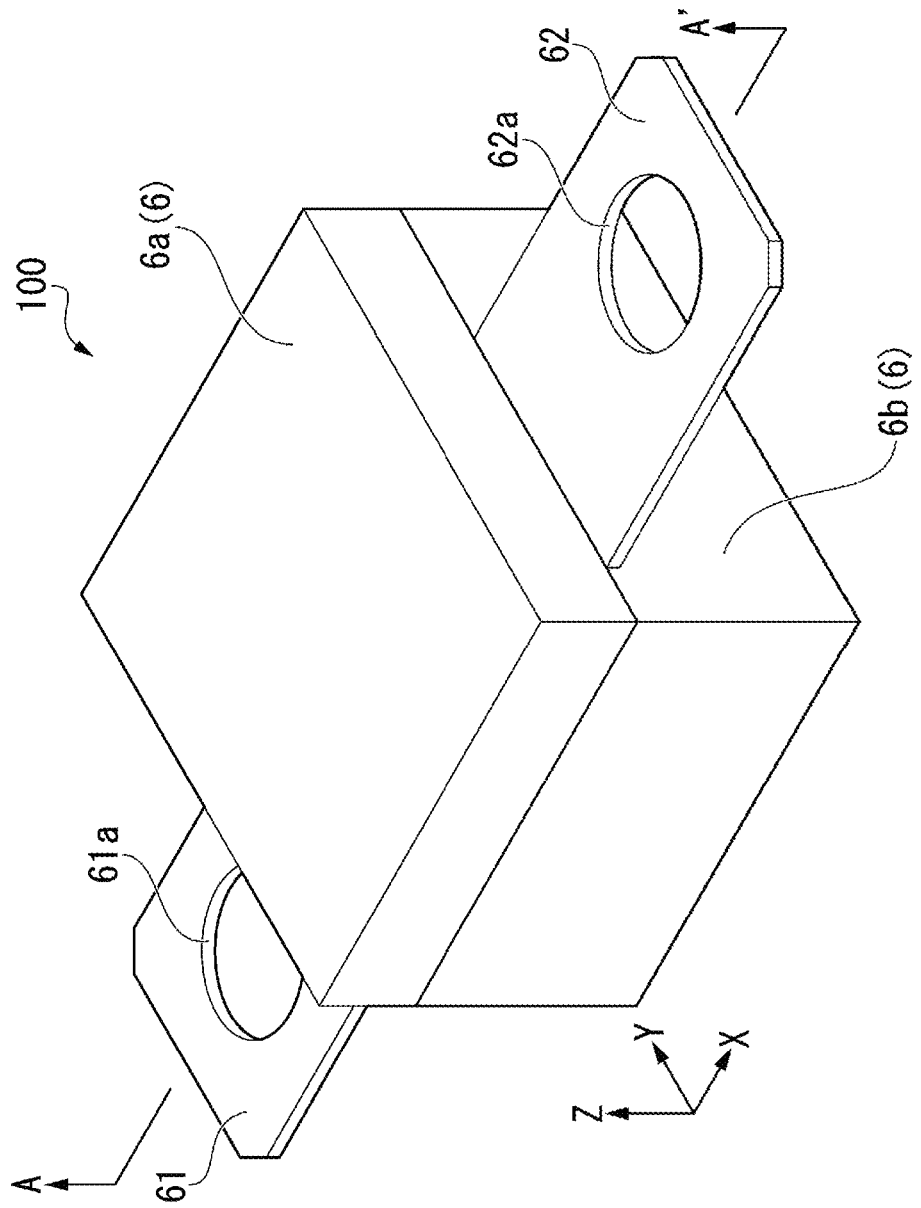
FIG. 17 A perspective view illustrating an overall structure of a protective element 100 of a fourth embodiment.
Figure 19:
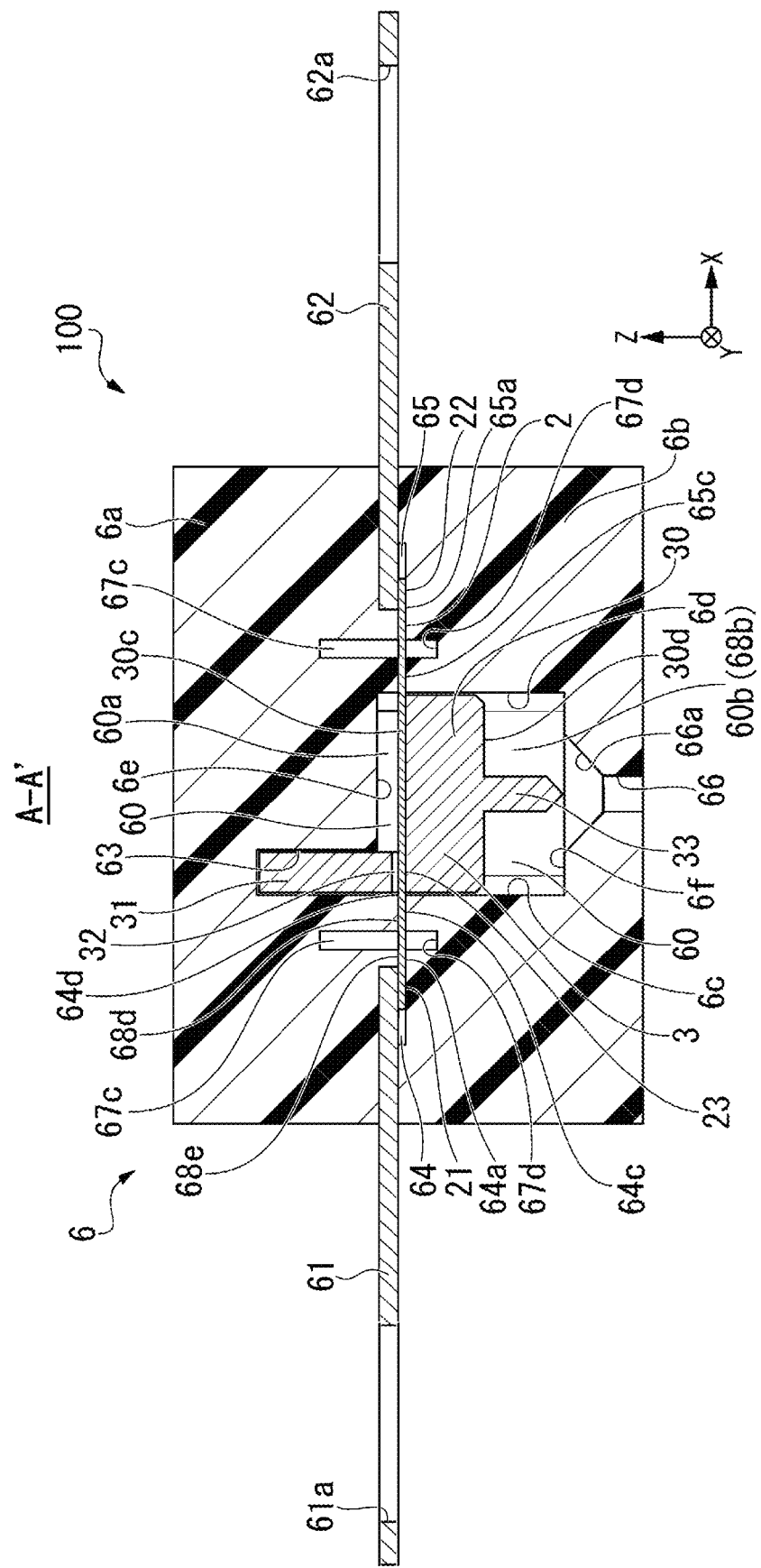
FIG. 19 A sectional view in which the protective element 100 of the fourth embodiment is cut along line A-A' illustrated in FIG. 17.

FIGS. 17 to 19 are schematic diagrams illustrating a protective element of the fourth embodiment. In the drawings used for the following description, the direction illustrated by X is the energization direction (first direction) of the fuse element. The direction illustrated by Y is a direction orthogonal to the X direction (first direction) and the direction illustrated by Z is a direction orthogonal to the X direction and the Y direction.

FIG. 17 is a perspective view illustrating an overall structure of a protective element 100 of the fourth embodiment. FIG. 18 is an exploded perspective view of the protective element 100 of the fourth embodiment. FIG. 19 is a sectional view in which the protective element 100 of the fourth embodiment is cut along line A-A' illustrated in FIG. 17.

As illustrated in FIG. 17 to FIG. 19, the protective element 100 of the present embodiment is provided with a fuse element 2, a slider 3, and a case 6 in which a housing portion 60 where the fuse element 2 and the slider 3 are housed is provided therein.

(Fuse Element)

FIG. 20 is an enlarged view for describing a portion of the protective element 100 of the fourth embodiment. (a) in FIG. 20 is a perspective view illustrating the fuse element, a first terminal, and a second terminal. (b) in FIG. 20 is a plan view illustrating the fuse element. As illustrated in (a) and (b) in FIG. 20, the fuse element 2 has a first end portion 21, a second end portion 22, and a breaking portion 23 provided between the first end portion 21 and the second end portion 22. The fuse element 2 is energized in the X direction (first direction), which is a direction heading from the first end portion 21 to the second end portion 22.

As illustrated in FIG. 18, FIG. 19, and (a) in FIG. 20, the first end portion 21 is electrically connected to the first terminal 61. The second end portion 22 is electrically connected to the second terminal 62.

As illustrated in FIG. 17 to FIG. 19, and (a) in FIG. 20, the first terminal 61 and the second terminal 62 may have substantially the same shape, and may have respectively different shapes. The thicknesses of the first terminal 61 and the second terminal 62 are not particularly limited, but as a rule of thumb, may be 0.3 to 1.0 mm. As illustrated in FIG. 20(a), the thicknesses of the first terminal 61 and the second terminal 62 may be the same or may be different.

As illustrated in FIG. 17 to FIG. 19, and (a) in FIG. 20, the first terminal 61 is provided with an external terminal hole 61a. Moreover, the second terminal 62 is provided with an external terminal hole 62a. Among the external terminal hole 61a and the external terminal hole 62a, one is used to connect to a power-source side, and the other is used to connect to a load side. As illustrated in FIGS. 17 to 19 and (a) in 20, the external terminal hole 61a and the external terminal hole 62a can be through-holes that are substantially circular in a plan view.

Terminals made up of, for example, copper, brass, nickel, and the like can be used as the first terminal 61 and the second terminal 62. It is preferable to use brass for the materials of the first terminal 61 and the second terminal 62 in terms of reinforcing rigidity, and it is preferable to use copper in terms of reducing electrical resistance. The first terminal 61 and the second terminal 62 may be made of the same material or may be made of different materials.

The shapes of the first terminal 61 and the second terminal 62 may be a shape that can engage with a terminal on the power-source side or a terminal on the load side not illustrated in the drawings, and may, for example, be a claw shape having an open portion on one portion, and as illustrated in (a) in FIG. 20, flange portions (indicated by reference signs 61c, 62c in (a) in FIG. 20) widened to both sides toward the fuse element 2 may be provided at end portions on sides connected to the fuse element 2; this is not particularly limited. When the first terminal 61 and the second terminal 62 have the flange portions 61c and 62c, it is difficult for the first terminal 61 and the second terminal 62 to fall out from the case 6, and the protective element 100 has favorable reliability and durability.

The thickness of the fuse element 2 may be uniform as illustrated in FIG. 19 and (a) in FIG. 20 or may differ in portions. As a fuse element whose thickness differs in portions, for example, one whose thickness gradually increases in heading from the breaking portion 23 to the first end portion 21 and the second end portion 22 and one in which a metal plate is layered on the first end portion 21 and the second end portion 22 can be mentioned. In such a fuse element 2, the breaking portion 23 becomes a heat spot when an overcurrent flows through the fuse element; the breaking portion 23 is heated with priority and is more reliably cut.

As illustrated in (b) in FIG. 20, the breaking portion 23, the first end portion 21, and the second end portion 22 of the fuse element 2 have a substantially rectangular shape in a plan view. As illustrated in (b) in FIG. 20, a width 21D in the Y direction of the first end portion 21 and a width 22D in the Y direction of the second end portion 22 are substantially the same. A width 23D in the Y direction of the breaking portion 23 is narrower than the width 21D in the Y direction of the first end portion 21 and the width 22D in the Y direction of the second end portion 22. Thus, the width 23D of the breaking portion 23 is narrower than widths of regions other than the breaking portion 23. That is, a sectional area in the Y direction of the breaking portion 23 is smaller than sectional areas of regions other than the breaking portion 23.

As illustrated in FIG. 19 and (a) in FIG. 20, the first end portion 21 of the fuse element 2 is disposed overlapping the first terminal 61 in a plan view, and the second end portion 22 is disposed overlapping the second terminal 62 in a plan view. As illustrated in (a) in FIG. 20, a length L21 in the X direction at the first end portion 21 illustrated in (b) in FIG. 20 is made to be a dimension corresponding to a region overlapping with the first terminal 61 in a plan view. Moreover, as illustrated in (a) in FIG. 20, a length L22 in the X direction at the second end portion 22 illustrated in (b) in FIG. 20 extends to the breaking portion 23 side from a region overlapping with the second terminal 62 in a plan view. Therefore, the length L22 in the X direction at the second end portion 22 is longer than the length L21 in the X direction at the first end portion 21.

As illustrated in (b) in FIG. 20, a first connecting portion 25 that is substantially trapezoidal in a plan view is disposed between the breaking portion 23 and the first end portion 21. Among the parallel sides of the first connecting portion 25 that is substantially trapezoidal in a plan view, the longer side is joined to the first end portion 21. Moreover, a second connecting portion 26 that is substantially trapezoidal in a plan view is disposed between the breaking portion 23 and the second end portion 22. Among the parallel sides of the second connecting portion 26 that is substantially trapezoidal in a plan view, the longer side is joined to the second end portion 22. The first connecting portion 25 and the second connecting portion 26 are symmetrical via the breaking portion 23. Thus, a width in the Y direction of the fuse element 2 gradually increases in heading from the breaking portion 23 to the first end portion 21 and the second end portion 22. As a result, when an overcurrent flows through the fuse element 2, the breaking portion 23 becomes a heat spot; the breaking portion 23 is heated with priority and is easily cut.

As illustrated in (b) in FIG. 20, the breaking portion 23 of the fuse element 2 has a narrower width in the Y direction (indicated by reference sign 23D in (b) in FIG. 20) than the first end portion 21 and the second end portion 22. Thus, the breaking portion 23 is cut more easily than a region between the breaking portion 23 and the first end portion 21 and a region between the breaking portion 23 and the second end portion 22.

In the present embodiment, as illustrated in (b) in FIG. 20, a fuse element in which the breaking portion 23 has a narrower width in the Y direction than the first end portion 21 and the second end portion 22 is described as an example of the fuse element 2. However, the fuse element is not limited to one in which the width in the Y direction of the breaking portion is narrower than the first end portion and the second end portion.

As illustrated in (b) in FIG. 20, a planar shape of the fuse element 2 overall is substantially rectangular. Compared to a general fuse element, its width in the Y direction is relatively wide, and its length in the X direction is relatively short. In the protective element 100 of the present embodiment, the cut faces of the cut fuse element 2 are insulated by the shielding portion 31 of the slider 3, as described later. As a result, the arc discharge at the time of cutting the fuse element 2 is rapidly quenched (extinguished). As such, there is no need to decrease the width in the Y direction of the fuse element 2 to suppress the arc discharge; the width in the Y direction of the fuse element 2 can be made wide, and the length in the X direction can be made short. The protective element 100 having such a fuse element 2 can suppress a resistance increase in a current path whereon the protective element 100 is disposed and can thus also be preferably disposed on a current path of a large current.

Furthermore, instead of the fuse element 2 illustrated in (b) in FIG. 20, for example, a linear or band-shaped fuse element having a uniform sectional area in the Y direction can be provided. In this situation, the cut portion of the fuse element 2 becomes near a center portion of the fuse element in the X direction. Thus, the time until the fuse element in the shielding-portion through hole is melted and is shielded by a slider tends to increase when compared to when the fuse element 2 illustrated in (b) in FIG. 20 is provided.

In the fuse element 2, one or both of the first end portion 21 and the second end portion 22 may be provided with a bent portion that mitigates stress from thermal expansion and thermal contraction in the X direction (see FIG. 11).

As the material of the fuse element 2, a material used in known fuse elements can be used such as a metal material including an alloy. Specifically, alloys such as Pb 85%/Sn and Sn/Ag 3%/Cu 0.5% are examples of the material of the fuse element 2.

The fuse element 2 is not substantially deformed by the energization during normal operation. The fuse element 2 is broken at a temperature at or above the softening temperature of the material configuring the fuse element 2. Because the temperature is at or above the softening temperature, breaking may occur at the "softening temperature".

In the present specification, "softening temperature" refers to a temperature or temperature range where a solid phase and a liquid phase are mixed or coexist. The softening temperature is a temperature or temperature zone (temperature range) where the fuse element 2 becomes soft enough to deform by an external force.

For example, when the fuse element 2 is made of a two component alloy, in the temperature range between solidus line (temperature at which melting starts) and liquidus line (temperature at which complete melting occurs), it is a state in which the solid phase and the liquid phase are mixed together, a so-called sherbet state. The temperature range in which the solid phase and the liquid phase are mixed or coexist is the temperature range in which the fuse element 2 becomes soft enough to deform by an external force. This temperature range is the "softening temperature".

When the fuse element 2 is composed of a three component alloy or a multi-component alloy, the solidus line and the liquidus line can be replaced as a solidus surface and a liquidus surface. Similarly, the temperature range in which the solid phase and the liquid phase are mixed or co-exist is the "softening temperature".

When the fuse element 2 is made of an alloy, the "softening temperature" is a temperature range because there is a temperature difference between the solidus line and the liquidus line.

When the fuse element 2 is made of a single metal, the solidus line/liquidus line do not exist and one melting point/congealing point exist. When the fuse element 2 is made of a single metal, the solid phase and the liquid phase are mixed or coexist at the melting point or congealing point, so the melting point or the congealing point is the "softening temperature" in the present specification.

Measurement of the solidus line and the liquidus line can be performed as a discontinuous point (plateau temperature in time change) due to latent heat accompanying a phase state change in the process of temperature increase. Alloy materials having a temperature range in which the solid phase and the liquid phase are mixed or coexist and single metals can both be used as the material of the fuse element 2 of the present embodiment.

As illustrated in (b) in FIG. 20, the fuse element 2 may be made of one member (part), and may also be made of a plurality of members (parts) having different materials.

When the fuse element 2 is formed by a plurality of members having different materials, the shape of each member can be determined according to the use, materials, and the like of the fuse element 2 and is not particularly limited.

An example of a fuse element 2 formed by a plurality of members having different materials includes a fuse element formed by a plurality of members made up of materials having different softening temperatures. When the fuse element 2 is formed by a plurality of members made of materials having different softening temperatures, a solid phase and a liquid phase are mixed in order from the materials having the lower softening temperature, and breaking occurs at the softening temperature or higher of the material having the lowest softening temperature.

A fuse element 2 formed by a plurality of members having different materials can take various structures.

For example, the fuse element 2 may be a layered body having a three-layer structure in which an inner layer and outer layers interposing the inner layer are layered in the thickness direction, and the inner layer and the outer layers are made of materials having different softening temperatures. In such a fuse element 2, from among the inner layer and the outer layer of the layered body, the mixed state of the solid phase and the liquid phase initially starts on the layer having the lower softening temperature, and the layer having the higher softening temperature can be broken before reaching the softening temperature.

It is preferable for the fuse element 2 to be made of a layered body in which an inner layer made of a metal having a low melting point and an outer layer made of a metal having a high melting point are layered in the thickness direction. Because such a fuse element 2 has a layered body that includes an outer layer made of a metal of a high melting point, rigidity is secured.

It is preferable to use Sn or a metal having Sn as a main component as the metal of a low melting point used as the material of the fuse element 2. Because the melting point of Sn is 232° C., a metal having Sn as the main component has a low melting point. For example, the solidus line of Sn/Ag 3%/Cu 0.5% alloy is 217° C.

It is preferable to use Ag, Cu, or a metal having Ag or Cu as a main component as the metal of a high melting point used as the material of the fuse element 2. For example, the melting point of Ag is 962° C., but a layer of a metal of a high melting point made from a metal having Ag as a main component is melted into a metal of a low melting point in accordance with the melting of the layer made from a metal of a low melting point (metal having Sn as a main component), and is cut at a temperature of 300 to 400° C. Naturally, cutting is performed even at a temperature of 400° C. or higher.

The fuse element 2 can be manufactured by a known method.

For example, when the fuse element 2 is made of a layered body in which an inner layer made of a metal of a low melting point and outer layers made of a metal of a high melting point are layered in the thickness direction, manufacturing is possible using the method shown below. First, a metal foil made of a metal of a low melting point is prepared. Next, a metal layer of a high melting point is formed on the entire surface of the metal foil using a plating method to obtain a layered plate. Thereafter, the layered plate is cut into a predetermined shape. According to the above process, a fuse element 2 made of a layered body having a three-layer structure is obtained.

(Slider)

Figure 21:
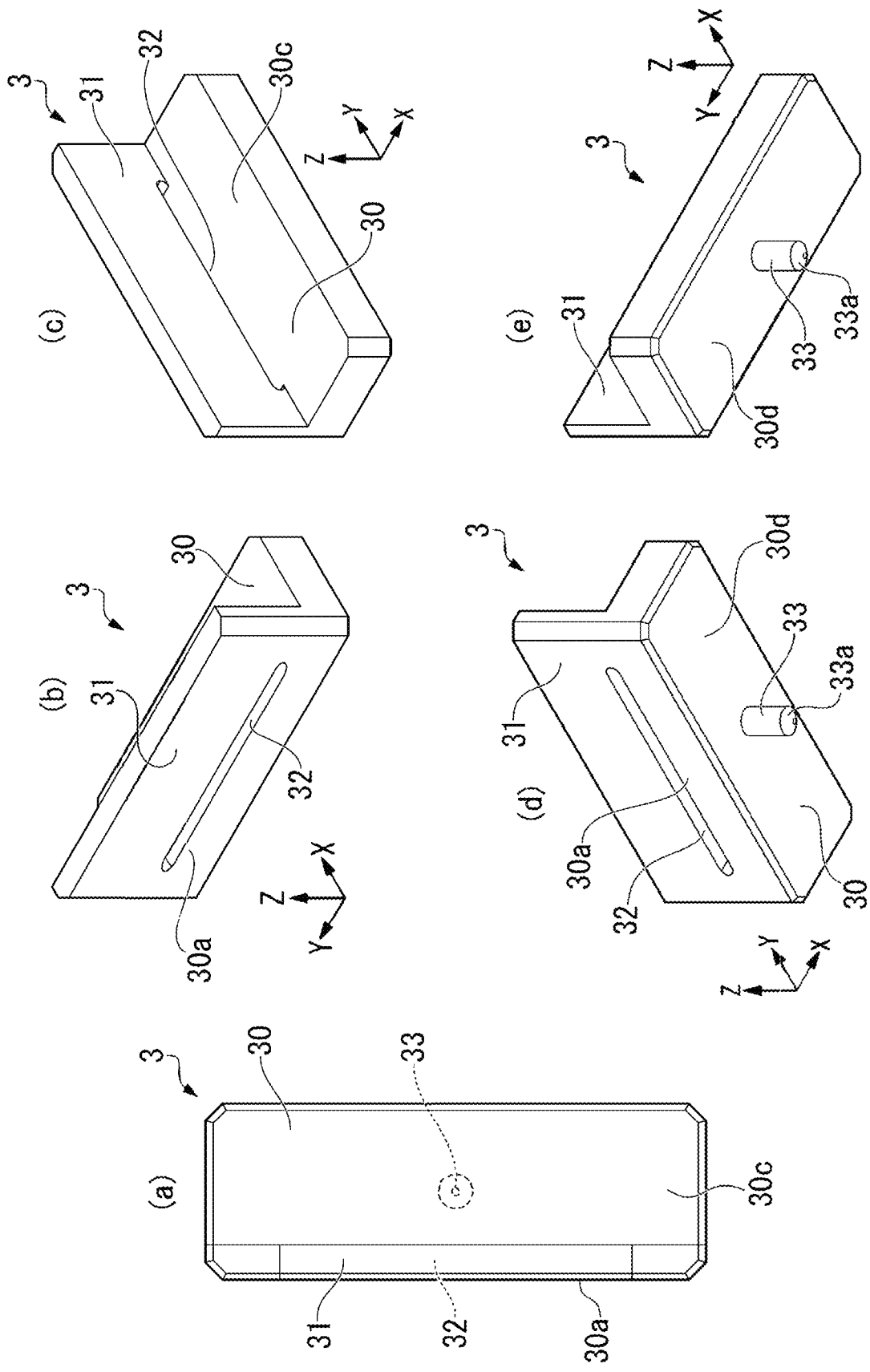
FIG. 21 A drawing for describing a structure of a slider provided in the protective element 100 of the fourth embodiment. (a) is a plan view from a first-space side, and (b) to (e) are perspective views.

FIG. 21 is a drawing for describing a structure of the slider provided in the protective element 100 of the fourth embodiment. (a) in FIG. 21 is a plan view from a first space side, and (b) to (e) in FIG. 21 are perspective views.

As illustrated in FIG. 19, the slider 3 has a sectional shape along the X direction that is substantially an L shape.

As illustrated in (a) to (e) in FIG. 21, the slider 3 has a plate-shaped portion 30 made of an insulating material, a shielding portion 31 made of an insulating material erected on a first edge portion 30a of the plate-shaped portion 30, a shielding-portion through hole 32 that penetrates the shielding portion 31, and a convex portion 33 provided on the face (hereinafter also referred to as the "second face 30d") opposite the face of the shielding portion 31 side of the plate-shaped portion 30 (hereinafter also referred to as the "first face 30c").

As illustrated in FIG. 18 and FIG. 19, the fuse element 2 is disposed on the first face 30c of the plate-shaped portion 30 penetrating the shielding-portion through hole 32. As illustrated in (a) in FIG. 21, the plate-shaped portion 30 is substantially rectangular in a plan view. As illustrated in FIG. 18 and FIG. 19, the length of the plate-shaped portion 30 in the X direction is shorter than the total length of the length of the second connecting portion 26 (see (b) in FIG. 20) of the fuse element 2 in the X direction and the length L22 of the second end portion 22 in the X direction. Therefore, as illustrated in FIG. 18, the second connecting portion 26 of the fuse element 2 and the portion of the second end portion 22 on the breaking portion 23 side are disposed on the first face 30c of the plate-shaped portion 30. Furthermore, as illustrated in FIG. 18, the width of the plate-shaped portion 30 in the Y direction is wider than the width 22D (see (b) in FIG. 20) in the Y direction at the second end portion 22 of the fuse element 2.

It is preferable for the thickness of the plate-shaped portion 30 in the Z direction to be 0.5 to 3 mm, and more preferable to be 1 to 2 mm. It is preferable for the thickness of the plate-shaped portion 30 to be 0.5 mm or greater because it results in sufficient strength against a pressure increase in the case 6 due to arc discharge generated when the fuse element 2 is cut. It is preferable for the thickness of the plate-shaped portion 30 to be 3 mm or less because this does not negatively impact size reduction of the protective element 100.

As illustrated in (a) to (e) in FIG. 21, the shielding portion 31 is erected on the first edge portion 30a of the plate-shaped portion 30. The shielding portion 31 is substantially rectangular when viewed from the first edge portion 30a side. As illustrated in (a) to (e) in FIG. 21, the width of the shielding portion 31 in the Y direction is the same as the width of the plate-shaped portion 30 in the Y direction.

As illustrated in FIG. 19, the distance (length in the Z direction) from the upper face of the shielding-portion through hole 32 to the upper face of the shielding portion 31 is preferably a distance greater than or equal to the distance between the second face 30d of the shielding portion 31 and a fourth wall face 6f in the case 6 described below, and is more preferably a distance greater than or equal to 1 mm greater than the distance between the second face 30d of the shielding portion 31 and the fourth wall face 6f. When the distance from the upper face of the shielding-portion through hole 32 to the upper face of the shielding portion 31 is equal to or greater than the distance between the second face 30d of the shielding portion 31 and the fourth wall face 6f, the slider 3 moves when the fuse element 2 is cut, and therefore, the opening 64d of the first insertion hole 64 described hereafter, in which the first end portion 21 of the fuse element 2 is housed, can be reliably plugged by the shielding portion 31.

It is preferable for the thickness of the shielding portion 31 to be 0.5 to 2 mm, and more preferable to be 1 to 1.5 mm. It is preferable for the thickness of the shielding portion 31 to be 0.5 mm or greater because it results in sufficient strength against a pressure increase in the case 6 due to arc discharge generated at the time of cutting the fuse element 2. It is preferable for the thickness of the shielding portion 31 to be 2 mm or less because the length of the fuse element 2 in the X direction can be suppressed from becoming longer and the fuse element 2 can be made to have lower resistance.

As illustrated in (a) to (d) of FIG. 21, the shielding-portion through hole 32 is a through-hole having a substantially elliptical sectional tube-shape provided penetrating through the shielding portion 31. It is preferable for the shielding-portion through hole 32 to have a substantially elliptical sectional tube-shape because the shielding-portion through hole 32 can be easily formed by mechanical processing. When the shielding-portion through hole 32 is formed by die molding, the sectional shape of the shielding-portion through hole 32 may be a substantially oval shape or a rectangular shape. As illustrated in (c) in FIG. 21, the lower face (inner wall on the plate-shaped portion 30 side) of the shielding-portion through hole 32 is formed on the face connecting from the first face 30c of the plate-shaped portion 30.

A width (length in Y direction) of the shielding-portion through hole 32 is preferably a dimension 1 to 2 mm longer and more preferably a dimension 0.5 to 1 mm longer than a maximum length in the Y direction of the fuse element 2 (in (b) in FIG. 20, the length indicated by reference signs 21D, 22D). The width of the shielding-portion through hole 32 being longer than the maximum length in the Y direction of the fuse element 2 by 1 mm or more enables the fuse element 2 to easily penetrate the shielding-portion through hole 32 when assembling the protective element 100. This provides favorable productivity. The width of the shielding-portion through hole 32 being a dimension no greater than 2 mm longer than the maximum length in the Y direction of the fuse element 2 is preferable in that this does not negatively impact size reduction of the protective element 100.

A height from a lower face to an upper face (length in Z direction) of the shielding-portion through hole 32 is preferably a dimension 0.03 to 0.2 mm longer and more preferably a dimension 0.05 to 0.1 mm longer than a maximum thickness of the fuse element 2. The height of the shielding-portion through hole 32 being a dimension longer than the maximum thickness of the fuse element 2 by 0.03 mm or more enables the fuse element 2 to easily penetrate the shielding-portion through hole 32 when assembling the protective element 100. This provides favorable productivity. When the height of the shielding-portion through hole 32 is equal to or less than a dimension 0.2 mm longer than the maximum thickness of the fuse element 2, even when the moving distance of the slider 3 is small, the opening 64d of the first insertion hole 64 in which the first end portion 21 of the fuse element 2 is housed is plugged by the shielding portion 31. Therefore, the arc discharge generated when cutting the fuse element is rapidly quenched (extinguished).

The convex portion 33 functions as a guide for moving the slider 3 to a predetermined position at the time of cutting the fuse element 2. Having the convex portion 33 makes it easier for the slider 3 to move to a predetermined position at the time of cutting the fuse element 2. As a result, the opening 64d of the first insertion hole 64 is more reliably blocked by the shielding portion 31 by the movement of the slider 3.

As illustrated in FIG. 19 and (d) and (e) in FIG. 21, the convex portion 33 is provided at a substantially central position of the second face 30d of the plate-shaped portion 30 in the X direction and Y direction. In the present embodiment, because the convex portion 33 is provided at a substantially central position of the second face 30d in the X direction and Y direction, position shifting of the slider 3 that moves at the time of cutting the fuse element 2 can be effectively prevented.

As illustrated in FIG. 19 and (d) and (e) in FIG. 21, the convex portion 33 has a substantially columnar shape extending in the Z direction from the second face 30d. As illustrated in (d) and (e) in FIG. 21, a tip 33a of the convex portion 33 is shaped in a substantially conical shape where the diameter gradually reduces toward the tip. As such, because the slider 3 moves at the time of cutting of the fuse element 2, the convex portion 33 is more easily embedded into the fourth insertion hole 66 that opens to the fourth wall face 6f described hereafter of the case 6. This is therefore preferable because position shifting of the slider 3 is less likely to occur.

It is preferable for the length of the convex portion 33 to be equal to or less than a thickness dimension of the case 6 opposing the convex portion 33. In this case, because the slider 3 moves at the time of cutting of the fuse element 2, the convex portion 33 does not protrude from the fourth insertion hole 66 that opens to the fourth wall face 6f described hereafter of the second case 6b, and the convex portion 33 is embedded in the fourth insertion hole 66. Therefore, the second face 30d of the plate-shaped portion 30 moved at the time of cutting is pressed to the fourth wall face 6f, the second face 30d and the fourth wall face 6f are easily closely contacted without a gap therebetween, and the slider 3 is easily fixed on the fourth wall face 6f. Therefore, rebounding whereby the moved slider 3 returns to its original position is less likely, and arc discharge is more reliably quenched.

Furthermore, because there is the convex portion 33, whether the slider 3 has moved to a predetermined position in conjunction with the cutting of the fuse element 2 can be determined from outside the second case 6b depending on whether the convex portion 33 is embedded in the fourth insertion hole 66.

In the present embodiment, an example is described in which the convex portion 33 is substantially columnar. However, the shape of the convex portion is not limited to being substantially columnar and may be a columnar shape having, for example, an oval, elliptical, or polygonal sectional shape.

Furthermore, the present embodiment describes an example in which only one convex portion 33 is provided. However, the number of convex portions is not limited in particular and may be two or more.

Moreover, in the present embodiment, an example is described in which the convex portion 33 is disposed at a substantially central position of the second face 30d in the X direction and Y direction. However, the position of the convex portion on the second face is not limited in particular.

The slider 3 is made of an insulating material. A ceramic material, a resin material having a high glass transition temperature, or the like can be used as the insulating material. The glass transition temperature (Tg) of the resin material refers to the temperature at which change occurs from a soft rubber state to a hard glass state. When the resin is heated to the glass transition temperature or higher, the molecules are more easily moved and the soft rubber state is achieved. Meanwhile, when the resin cools, the movement of the molecules is limited and the hard glass state is achieved.

Aluminum, mullite, zirconia, and the like are examples of a ceramic material, and it is preferable to use a material having a high thermal conductivity such as aluminum. When the slider 3 is formed by a material having high thermal conductivity such as a ceramic material, the heat generated when the fuse element 2 is cut can be efficiently radiated to the outside, and the arc discharge generated when the fuse element 2 is severed can be more effectively suppressed from continuing.

Engineering plastics such as polyphenylene sulfide (PPS) resins, nylon resins, fluorine resins, silicone resins, and the like are examples of resin materials having a high glass transition temperature. Generally, resin materials have a lower thermal conductivity than ceramic materials, but are inexpensive.

Among resin materials, nylon resins are preferable because they have high tracking resistance (resistance to tracking (carbonized conductive path) destruction). From among nylon resins, it is particularly preferable to use nylon 46, nylon 6T, and nylon 9T. The tracking resistance can be found using a test based on IEC60112. It is preferable to use a nylon resin having a tracking resistance of 250 V or greater, and more preferable to use a nylon resin having a tracking resistance of 500 V or greater.

The slider 3 may be, for example, created of a material other than resin such as a ceramic material, and a portion thereof may be covered by a nylon resin.

The slider 3 can be manufactured by a known method.

(Case)

As illustrated in FIG. 17 to FIG. 19, the case 6 is substantially rectangular parallelepiped and is two members integrated: a first case 6a and a second case 6b, which is disposed opposite the first case 6a.

FIG. 22 is a drawing for describing a structure of the second case provided in the protective element 100 of the fourth embodiment. (a) in FIG. 22 is a plan view from the first space side, and (b) and (c) in FIG. 22 are perspective views.

Figure 23:
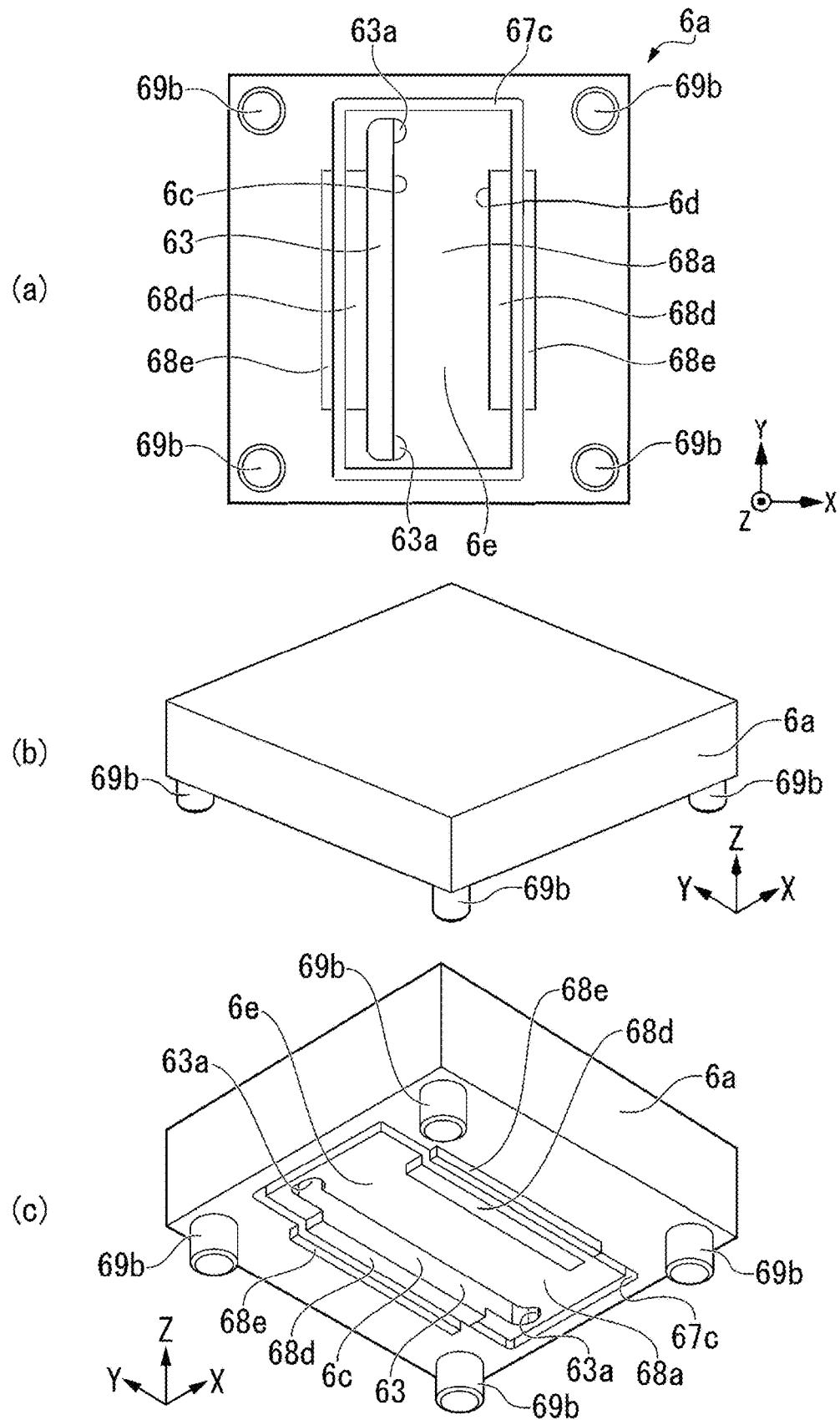
FIG. 23 A drawing for describing a structure of a first case provided in the protective element 100 of the fourth embodiment. (a) is a plan view from a second-space side, and (b) and (c) are perspective views.

FIG. 23 is a drawing for describing a structure of the first case provided in the protective element 100 of the fourth embodiment. (a) in FIG. 23 is a plan view from the second space side, and (b) and (c) in FIG. 23 are perspective views.

As illustrated in FIG. 19, the case 6 in the protective element 100 of the present embodiment has a substantially rectangular parallelepiped housing portion 60 that houses the fuse element 2 and the slider 3 provided therein. The housing portion 60 may be formed by the first case 6a and the second case 6b being adhered together.

As illustrated in FIG. 19, the interior of the housing portion 60 is divided into the substantially rectangular parallelepiped first space 60a and the substantially rectangular parallelepiped second space 60b by the plate-shaped portion 30 of the slider 3. As illustrated in FIG. 18 and FIG. 19, the fuse element 2 is placed on the plate-shaped portion 30 of the slider 3 on the first space 60a side. In the present embodiment, as illustrated in FIG. 19, the volume of the first space 60a is smaller than the volume of the second space 60b. Because the second space 60b is a space where the plate-shaped portion 30 of the slider 3 slides, it corresponds to the plate-shaped-portion moving space 160b of the first embodiment and the plate-shaped-portion moving space 260b of the second embodiment.

As illustrated in FIG. 19, the interior of the housing portion 60 is provided with a first wall face 6c disposed opposing the shielding portion 31 of the slider 3, a second wall face 6d disposed opposing the first wall face 6c in the X direction, a third wall face 6e disposed opposing the fuse element 2 in the first space 60a, and a fourth wall face 6f disposed opposing the slider 3 in the second space 60b.

As illustrated in FIG. 19, a first insertion hole 64 that opens to the first wall face 6c and a second insertion hole 65 that opens to the second wall face 6d are provided in the housing portion 60. The first insertion hole 64 and the second insertion hole 65 are formed by disposing opposite each other and joining the second case 6b and the first case 6a.

As illustrated in FIG. 19, the first end portion 21 of the fuse element 2 is housed in the first insertion hole 64. Moreover, the second end portion 22 of the fuse element 2 is housed in the second insertion hole 65.

As illustrated in FIG. 19, and (a) and (b) in FIG. 22, the second case 6b is substantially rectangular parallelepiped and has a second concave portion 68b that forms a second space 60b. As illustrated in (a) in FIG. 22, the second concave portion 68b is rectangular in a plan view, one long side is the first wall face 6c, the other long side is the second wall face 6d, and the bottom face is the fourth wall face 6f.

As illustrated in FIG. 19, the depth of the second concave portion 68b is made to be equal to or greater than the total dimensions of the thickness of the plate-shaped portion 30 of the slider 3 and the length of the convex portion 33.

A planar shape of the second concave portion 68b illustrated in (a) in FIG. 22 is a shape corresponding to the shape of the plate-shaped portion 30 of the slider 3 in (a) in FIG. 21. Specifically, as illustrated in FIG. 19, the planar shape of the second concave portion 68b is shaped so that the plate-shaped portion 30 of the slider 3 fits into the second concave portion 68b while touching an inner wall face of the second concave portion 68b.

The separation distance between the inner wall face of the second concave portion 68b and the plate-shaped portion 30 of the slider 3 can be made to be, for example, 0.03 to 0.2 mm, and 0.05 to 0.1 mm is preferable. When the separation distance between the inner wall face of the second concave portion 68b and the plate-shaped portion 30 of the slider 3 is 0.03 to 0.2 mm, a pressure increase in the first space 60a due to the arc discharge at the time of the cutting of the breaking portion 23 of the fuse element 2 causes the slider 3 to move smoothly, and the arc discharge is more rapidly and reliably quenched. This is because it is difficult for the gas in the first space 60a to be exhausted to the second space 60b and for the pressure increase speed in the first space 60a to become slow, and for the housing portion 60 to be destroyed due to the pressure increase in the first space 60a before the slider 3 moves when the separation distance is within the range described above.

As illustrated in (a) and (c) in FIG. 22, the fourth insertion hole 66 that opens to the fourth wall face 6f and two leak holes 67a and 67b are provided penetrating the second case 6b on the bottom face (fourth wall face 6f) of the second concave portion 68b. As illustrated in FIG. 19, the fourth insertion hole 66 is provided at a position opposing the convex portion 33 of the slider 3. As illustrated in FIG. 22, the fourth insertion hole 66 is disposed at a substantially central position of the fourth wall face 6f in the X direction and Y direction. The shape of the fourth insertion hole 66 is substantially cylindrical, and corresponds to the shape of the convex portion 33 of the slider 3.

As illustrated in FIG. 19 and (a) in FIG. 22, the inner diameter of the fourth insertion hole 66 gradually increases toward the opening 66a. Thus, it is preferable because the slider 3 moves at the time of cutting of the fuse element 2, and the convex portion 33 of the slider 3 is more easily embedded into the fourth insertion hole 66.

The minimum inner diameter of the fourth insertion hole 66 is made to have a dimension that can house the convex portion 33 in the slider 3. The difference between the minimum inner diameter of the fourth insertion hole 66 and the outer diameter of the convex portion 33 can be, for example, more than 0 mm to 0.1 mm, and is preferably more than 0 mm to 0.05 mm.

The leak holes 67a and 67b are arranged separated at equal intervals on both sides in the Y direction centered around the fourth insertion hole 66 so as to interpose the fourth insertion hole 66. Thus, this is preferable because the gas inside the second space 60b is more easily, uniformly, and rapidly exhausted to the outside of the housing portion 60 via the leak holes 67a and 67b.

The leak holes 67a and 67b have a substantially cylindrical shape. In the present embodiment, an example is described in which the leak holes 67a and 67b are substantially cylindrical. However, the shape of the leak holes 67a and 67b is not limited to being substantially cylindrical and may be a tubular shape having, for example, an oval, elliptical, or polygonal sectional shape.

Furthermore, the present embodiment describes an example in which two leak holes 67a and 67b are provided. However, the number of leak holes is not limited in particular and may be one or three or more.

Furthermore, the present embodiment describes an example in which the leak holes 67a and 67b are arranged separated at equal intervals on both sides in the Y direction centered around the fourth insertion hole 66 so as to interpose the fourth insertion hole 66, but the position of the leak holes are not limited in particular as long as the leak holes open to the fourth wall face 6f penetrating through the second case 6b.

It is preferable for an annular adhesive penetration prevention groove 67d that surrounds the housing portion 60 to be provided on the second joining face of the second case 6b that contacts the first case 6a. The outer side in the Y direction in a plan view of the adhesive penetration prevention groove 67d is a second adhesion part to which the first case 6a is adhered. The second adhesion part is provided along the edge of the second joining face of the second case 6b.

As illustrated in (a) and (b) in FIG. 22, in the present embodiment, the adhesive penetration prevention groove 67d is disposed in a band shape to surround the outer periphery of the second concave portion 68b provided on the second case 6b. The adhesive penetration prevention groove 67d is disposed separated from the second concave portion 68b at a predetermined interval in a plan view. The adhesive penetration prevention groove 67d is formed having a substantially constant width and depth. The width of the adhesive penetration prevention groove 67d is not limited in particular as long as it is a width that prevents the adhesive from penetrating into the housing portion 60. Furthermore, the depth of the adhesive penetration prevention groove 67d is not limited in particular as long as it can house the excess adhesive used in joining the first case 6a and the second case 6b.

Furthermore, the planar shape of the adhesive penetration prevention groove 67d is not limited to an annular shape. The adhesive penetration prevention groove 67d, for example, may be provided extending from between the housing portion 60 of the second joining face and the second adhesion part to the outer face of the second case 6b.

Two second abutting faces 68c and two band-shaped insertion hole forming faces 64c and 65c that connect the two second abutting faces 68c are provided between the adhesive penetration prevention groove 67d and the second concave portion 68b.

As illustrated in (a) and (b) in FIG. 22, the two second abutting faces 68c have a substantial U shape in a plan view and are disposed opposing each other in the Y direction in a plan view. The two second abutting faces 68c are disposed contacting the first abutting faces 68a of the first case 6a, which will be described below. Thus, the two second abutting faces 68c partition the housing portion 60.

The two insertion hole forming faces 64c and 65c are disposed opposing in the X direction in a plan view. The insertion hole forming face 64c forms an opening 64d of the first insertion hole 64 that opens to the first wall face 6c by being disposed opposing the first convex portion 68d of the first case 6a described hereafter. The insertion hole forming face 65c is disposed opposing a first convex portion 68d of the first case 6a described hereafter and thereby forms the opening of the second insertion hole 65 that opens to the second wall face 6d.

The length of the two insertion hole forming faces 64c and 65c in the Y direction is longer than the length of the fuse element 2 in the Y direction (see FIG. 2), and the fuse element 2 is disposed contacting with the insertion hole forming faces 64c and 65c.

As illustrated in (b) in FIG. 22, the insertion hole forming faces 64c and 65c are provided on a position closer to the fourth wall face 6f than the second abutting face 68c in the Z direction. Thus, a step corresponding to the height dimension of the respective first insertion hole 64 and the second insertion hole 65 is formed on the boundary portion between the insertion hole forming faces 64c and 65c and the second abutting face 68c.

As illustrated in (a) and (b) in FIG. 22, a concave portion 64a is provided on the outer side of the X direction interposing the adhesive penetration prevention groove 67d of the insertion hole forming face 64c, and a terminal placement face 64b is provided on the outer side thereof. Furthermore, a concave portion 65a is provided on the outer side of the X direction interposing the adhesive penetration prevention groove 67d of the insertion hole forming face 65c, and a terminal placement face 65b is provided on the outer side thereof.

The planar shape of the concave portion 64a is a shape corresponding to the joining portion of the first end portion 21 of the fuse element 2 and first terminal 61. The planar shape of the concave portion 65a is a shape corresponding to the shape of the joining portion of the second end portion 22 of the fuse element 2 and the second terminal 62.

As illustrated in (b) in FIG. 22, the surfaces of the concave portions 64a and 65a are on the same plane as the insertion hole forming faces 64c and 65c in the Z direction. As illustrated in FIG. 19, the surface of the concave portion 64a is disposed opposing a second convex portion 68e of the first case 6a described hereafter, thereby forming a portion of the first insertion hole 64 that opens to the first wall face 6c. The surface of the concave portion 65a is disposed opposing the second convex portion 68e of the first case 6a described hereafter and thereby forms a portion of the second insertion hole 65 that opens to the second wall face 6d.

As illustrated in (b) in FIG. 22, the terminal placement faces 64b and 65b are provided on a position farther from the fourth wall face 6f than the surface of the concave portions 64a and 65a in the Z direction. Thus, a step corresponding to the height dimension of the respective first insertion hole 64 and the second insertion hole 65 is formed on the boundary portion between the terminal placement faces 64b and 65b and the concave portions 64a and 65a. Furthermore, the terminal placement faces 64b and 65b are provided on a position closer to the fourth wall face 6f than the second abutting face 68c in the Z direction by the amount of the dimension corresponding to the thickness of the first terminal 61 and the second terminal 62.

As illustrated in FIG. 19, the fuse element 2 is disposed on the insertion hole forming faces 64c and 65c. The joining portion of the first end portion 21 of the fuse element 2 and the first terminal 61 is disposed on the surface of the concave portion 64a. The joining portion of the second end portion 22 of the fuse element 2 and the second terminal 62 is disposed on the surface of the concave portion 65a.

Moreover, the first terminal 61 is disposed on the terminal placement face 64b. The second terminal 62 is disposed on the terminal placement face 65b.

Respective substantially cylindrical joining holes 69a are provided on the four corner portions on the faces opposing the first case 6a of the second case 6b.

The first case 6a is substantially a rectangular parallelepiped and, as illustrated in FIG. 19, and (a) and (c) in FIG. 23, forms the first space 60a having a rectangular plan view surrounded by two second abutting surfaces 68c, the two first convex portions 68d of the first case 6a, the first abutting face 68a, and the plate-shaped portion 30 by abutting the second abutting face 68c of the second case 6b. The planar shape of the first space 60a has the same planar shape as the second space 60b.

The two first convex portions 68d in the first case 6a have the same shape as the insertion hole forming faces 64c and 65c respectively in a plan view, and overlap with the insertion hole forming faces 64c and 65c in a plan view.

As illustrated in (a) in FIG. 23, the opposing faces of the two first convex portions 68d are respectively the first wall face 6c and the second wall face 6d. The height dimension of the first convex portion 68d is made so that the volume of the first space 60a is smaller than the volume of the second space 60b.

In the first case 6a, the first abutting face 68a forms the third wall face 6e. As illustrated in FIG. 19 and (a) and (c) in FIG. 23, a concave portion 63 that opens to the third wall face 6e is provided on the third wall face 6e (first abutting face 68a). As illustrated in FIG. 19, the shielding portion 31 of the slider 3 is housed in the concave portion 63. The concave portion 63 corresponds to the shielding-portion housing space 160a of the first embodiment and the shielding-portion housing space 260a of the second embodiment because it is a space in which the shielding portion 31 of the slider 3 is housed and in which the shielding portion can slide in the Z direction.

As illustrated in (a) and (c) in FIG. 23, the concave portion 63 is provided in a band shape in the Y direction in a plan view along the inner face (first wall face 6c) of the first convex portion 68d. The inner face of the concave portion 63 is provided continuing from the inner face of the first convex portion 68d.

The planar shape of the concave portion 63 is a shape corresponding to the planar shape of the shielding portion 31 of the slider 3. Specifically, as illustrated in FIG. 19, it is preferable for the concave portion 63 to be a shape in which the shielding portion 31 of the slider 3 fits into the concave portion 63 while being near or contacting the inner wall face of the concave portion 63. A difference between the distance between inner wall faces in the X direction of the concave portion 63 and an X-direction thickness of the shielding portion 31 of the slider 3 can be made to be, for example, 0.03 to 0.2 mm, and 0.05 to 0.1 mm is preferable.

When the difference between the distance between inner wall faces in the X direction of the concave portion 63 and the X-direction thickness of the shielding portion 31 of the slider 3 is 0.03 mm or greater, the movement of the slider 3 due to the pressure increase in the first space 60a is smooth, and the arc discharge is more rapidly and reliably quenched. This is because the shielding portion 31 of the slider 3 is less likely to get caught in the concave portion 63 when this difference is 0.03 mm or greater. Therefore, when this separation distance is 0.03 mm or greater, the pressure within the first space 60a does not increase and the shielding portion 31 does not separate from the slider 3 before the slider 3 moves, and the housing portion 60 is not destroyed before the slider moves.

Furthermore, when this separation distance is 0.2 mm or less, the concave portion 63 functions as a guide for moving the slider 3 to a predetermined position at the time of cutting the fuse element 2. Therefore, position shifting of the slider 3 that moves at the time of cutting the fuse element 2 is prevented, the opening 64d of the first insertion hole 64 is more reliably blocked by the shielding portion 31, and the arc discharge is more rapidly and reliably quenched.

As illustrated in FIG. 19, the depth (length in the Z direction) dimension of the concave portion 63 is made to be a length in which the shielding portion 31 of the slider 3 can be housed. The bottom face of the concave portion 63 may contact or be separated from the upper face of the shielding portion 31.

As illustrated in (a) and (c) in FIG. 23, spaces 63a are respectively provided on the central side in the Y direction of both end portions in the Y direction of the concave portion 63. The spaces 63a have a substantially semicircular shape in a plan view and are provided continuing in the Z direction from the openings of the concave portion 63 to the bottom face along the inner wall face of the concave portion 63. For example, the plane area of the spaces 63a can be made to be 0.5 to 4 mm$^2$, and 0.7 to 2 mm$^2$ is preferable.

The spaces 63a supply gas within the first space 60a into the concave portion 63 when the pressure inside the first space 60a increases due to arc discharge generated at the time of cutting of the breaking portion 23 of the fuse element 2.

When gas is supplied to the concave portion 63 via the space 63a, the slider 3 moves smoothly. Thus, the opening 64d of the first insertion hole 64 is rapidly blocked by the shielding portion 31, and arc discharge is more rapidly and reliably quenched. Furthermore, the spaces 63a exhaust the gas within the concave portion 63 to the outside of the concave portion 63 when the shielding portion 31 is housed in the concave portion 63. Thus, the spaces 63a facilitate the work of housing the shielding portion 31 in the concave portion 63, and improve productivity of the protective element 100.

In the present embodiment, because the spaces 63a are respectively provided on both end portions in the Y direction of the concave portion 63, uneven supply of gas into the concave portion 63 via the space 63a and uneven discharge of gas from the inside of the concave portion 63 to the outside of the concave portion 63 are difficult to occur. Thus, the effect of having the spaces 63a is more notably achieved.

The present embodiment describes an example in which two spaces 63a are provided. However, the number of spaces is not limited in particular and may be one or three or more.

Further, the space may only be formed along the inner wall face of the concave portion 63, and the planar shape of the space is not particularly limited.

It is preferable for an annular-shaped adhesive penetration prevention groove 67c that surrounds the housing portion 60 to be provided on a first joining face of the first case 6a that contacts the second case 6b. The outer side in the Y direction in a plan view of the adhesive penetration prevention groove 67c is a first adhesion part to which the second case 6b is adhered. The first adhesion part is provided along the edge in the Y direction of the first joining face of the first case 6a.

In the present embodiment, the adhesive penetration prevention groove 67c is provided in a band shape on a position opposing the adhesive penetration prevention groove 67d provided on the second case 6b in the first case 6a.

The adhesive penetration prevention groove 67c has the same shape as the adhesive penetration prevention groove 67d provided on the second case 6b in a plan view, and is formed at a substantially constant depth. The depth of the adhesive penetration prevention groove 67d may be the same as the adhesive penetration prevention groove 67c provided on the second case 6b, and may be different as illustrated in FIG. 19.

The adhesive penetration prevention grooves 67c and 67d provided on the first case 6a and the second case 6b prevent excess adhesive from adhering to the fuse element 2 and penetrating into the housing portion 60 when the first case 6a and the second case 6b are joined using an adhesive. By providing the adhesive penetration prevention grooves 67c and 67d, the adhesive is prevented from adhering to the fuse element 2 and reducing the conductivity of the fuse element 2. Further, by providing the adhesive penetration prevention grooves 67c and 67d, adhesive that has penetrated into the housing portion 60 is prevented from negatively impacting the movement of the slider 3.

It is preferable for the adhesive penetration prevention grooves 67c and 67d to be provided when the first case 6a and the second case 6b are joined using an adhesive, but these do not need to be provided.

Furthermore, it is also possible to provide only one of either of the adhesive penetration prevention grooves 67c and 67d.

As illustrated in (a) and (c) in FIG. 23, the respective second convex portions 68e are provided on the outer side of the X direction interposing the adhesive penetration prevention groove 67d of the first convex portion 68d. The surface of the second convex portion 68e is on the same plane as the first convex portion 68d in the Z direction. Furthermore, the length of the second convex portion 68e in the Y direction is the same as that of the first convex portion 68d.

Respective substantially cylindrical joining convex portions 69b are provided on the four corner portions on the faces opposing the second case 6b of the first case 6a. Each of the joining convex portions 69b is fitted into the joining holes 69a respectively provided on the second case 6b. In the present embodiment, the joining convex portions 69b and the joining holes 69a are respectively provided on the four corner portions, so that the first case 6a and the second case 6b are accurately fixed at a predetermined position.

In the present embodiment, an example is described in which a substantially cylindrical joining hole 69a is provided. However, the shape of the joining hole is not limited to being substantially cylindrical. Moreover, in the present embodiment, an example is described in which a substantially cylindrical joining convex portion 69b is provided. However, the shape of the joining convex portion is not limited to being substantially cylindrical. For example, the joining holes 69a and the joining convex portions 69b may have, for example, an oval, elliptical, or polygonal sectional shape.

Moreover, the numbers of the joining holes 69a and the joining convex portions 69b are not limited being four, the numbers may be one to three or five or more, and can be determined as appropriate according to, for example, the planar shapes of the first case 6a and the second case 6b. Moreover, the sizes of the joining holes 69a and the joining convex portions 69b are not limited in particular and can be determined as appropriate according to, for example, thicknesses and planar shapes of the first case 6a and the second case 6b.

The first case 6a and second case 6b are made of an insulating material. As the material of the first case 6a and the second case 6b, the same material as the slider 3 can be used. The materials of the first case 6a and the second case 6b may be the same as the material of the slider 3 or may be different. The materials of the first case 6a and the second case 6b may be the same or may be different.

When the first case 6a and the second case 6b are formed by a material having high thermal conductivity such as a ceramic material, the heat generated when the fuse element 2 is cut can be efficiently radiated to the outside. Therefore, continuation of the arc discharge generated when cutting the fuse element 2 is effectively suppressed.

It is preferable to use a nylon resin as the materials of the first case 6a and the second case 6b because tracking resistance is high when a resin material having a high glass transition temperature is used. From among nylon resins, it is particularly preferable to use nylon 46, nylon 6T, and nylon 9T.

The first case 6a and second case 6b can be manufactured by a known method.

(Production Method of Protective Element)

Next, a production method of the protective element 100 of the present embodiment is described using an example.

(a) and (b) in FIG. 24 are process diagrams for describing a production method of the protective element 100 of the fourth embodiment.

To produce the protective element 100 of the present embodiment, the fuse element 2 illustrated in (b) in FIG. 20 and the slider 3 illustrated in (a) to (e) in FIG. 21 are prepared. The fuse element 2 is made to penetrate the shielding-portion through hole 32 of the slider 3, the fuse element 2 is placed on the plate-shaped portion 30 of the slider 3 as illustrated (a) in FIG. 24, and the breaking portion 23 of the fuse element 2 is disposed in the shielding-portion through hole 32 of the slider 3.

Next, the first terminal 61 and the second terminal 62 are prepared. Then, as illustrated in (a) in FIG. 20, the first terminal 61 is connected by being soldered onto the first end portion 21 of the fuse element 2. Moreover, the second terminal 62 is connected by being soldered onto the second end portion 22. A known solder material may be used for soldering in the present embodiment. From a standpoint of resistivity and melting point, one whose main component is Sn is preferably used.

The first end portion 21 and second end portion 22 of the fuse element 2, the first terminal 61, and the second terminal 62 may be connected by being joined by welding or may be connected by being mechanically joined using a rivet, a screw, or the like; a known joining method can be used.

Next, the first case 6a illustrated in (a) to (c) in FIG. 23 and second case 6b illustrated in (a) to (c) in FIG. 22 are prepared. Then, as illustrated in (b) in FIG. 24, a member in which the fuse element 2, the first terminal 61 and second terminal 62, and the slider 3 are integrated is disposed on the second case 6b. As illustrated in FIG. 20, this member is disposed so that the convex portion 33 of the slider 3 is oriented toward the fourth wall face 6f side and so that the fourth insertion hole 66 provided in the second concave portion 68b of the second case 6b and the convex portion 33 overlap in a plan view, and disposes the shielding portion 31 of the slider 3 along the first wall face 6c of the second case 6b. Thus, the slider 3 is supported by the breaking portion 23 of the fuse element 2 on the second concave portion 68b while separated from fourth wall face 6f.

Afterward, the joining holes 69a provided on the second case 6b and the joining convex portions 69b provided on the first case 6a are fitted together and the first case 6a and the second case 6b are joined together (see FIG. 2).

An adhesive can be used as necessary to join the first case 6a and the second case 6b. As the adhesive, for example, an adhesive including a thermosetting resin can be used.

When joining the first case 6a and the second case 6b, the shielding portion 31 is housed in the concave portion 63, the adhesive penetration prevention groove 67c provided in the second case 6b and the adhesive penetration prevention groove 67d provided in the first case 6a are disposed opposing each other, and the two insertion hole forming faces 64c and 65c provided on the second case 6b and the two first convex portions 68d of the first case 6a are disposed and joined so as to overlap each other in a plan view (see FIG. 2). Thus, in the case 6, the housing portion 60 is formed, being made up of the first space 60a and the second space 60b divided by the plate-shaped portion 30 of the slider 3.

Furthermore, when joining the first case 6a and the second case 6b, the fuse element 2 is respectively disposed between the two insertion hole forming faces 64c and 65c that are disposed opposing each other and the first convex portion 68d. Therefore, by joining the first case 6a and the second case 6b, the first end portion 21 of the fuse element 2 is housed in the first insertion hole 64 that opens to the first wall face 6c in the housing portion 60, the second end portion 22 of the fuse element 2 is housed in the second insertion hole 65 that opens to the second wall face 6d (see FIG. 19), and a portion of the first terminal 61 and the second terminal 62 connected to the fuse element 2 is exposed to the outside of the case 6 (see FIG. 17).

The above steps provide the protective element 100 of the present embodiment.

(Operations of Protective Element)

Next, operations of the protective element 100 when a current exceeding a rated current flows through the fuse element 2 of the protective element 100 of the present embodiment are described using the drawings.

Figure 25:
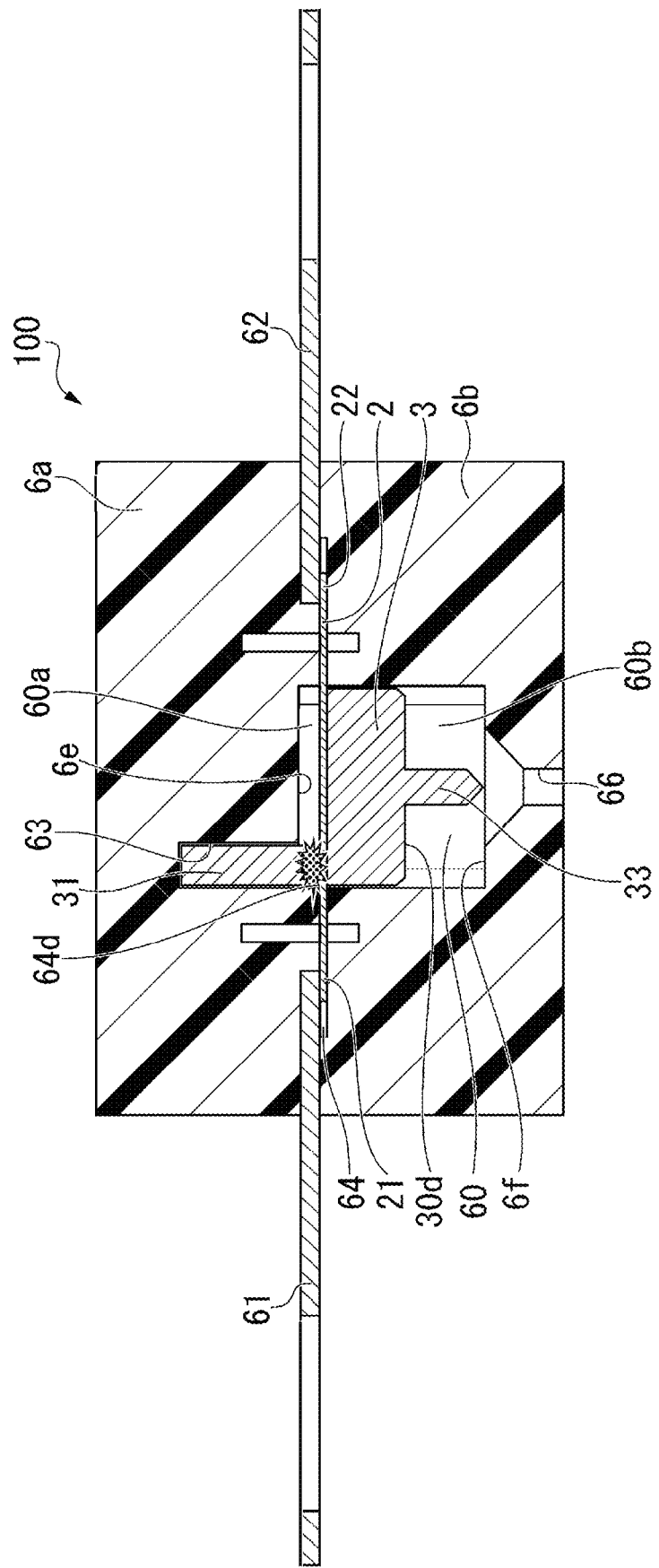
FIG. 25 A diagram for describing operations of the protective element 100 of the fourth embodiment; a sectional view cut along line A-A' illustrated in FIG. 17.
Figure 26:
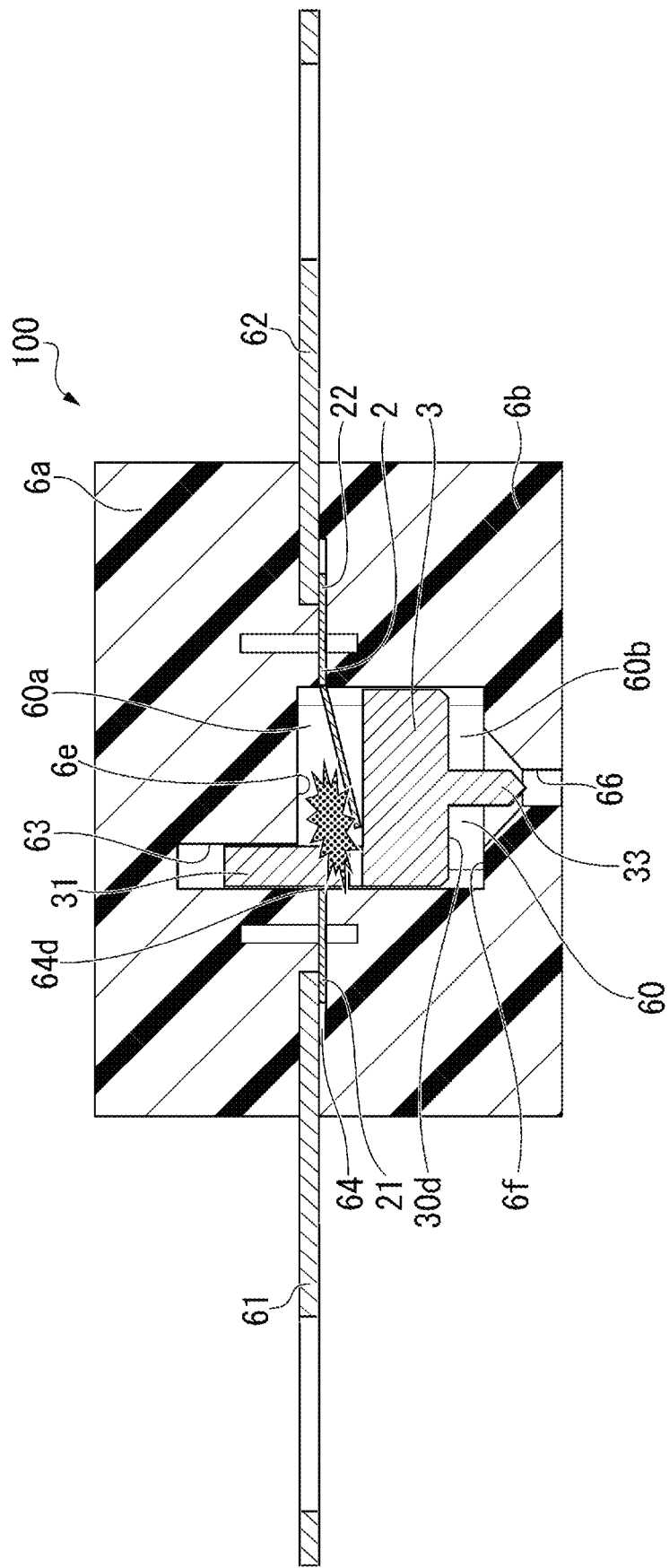
FIG. 26 A diagram for describing the operations of the protective element 100 of the fourth embodiment; a sectional view cut along line A-A' illustrated in FIG. 17.
Figure 27:
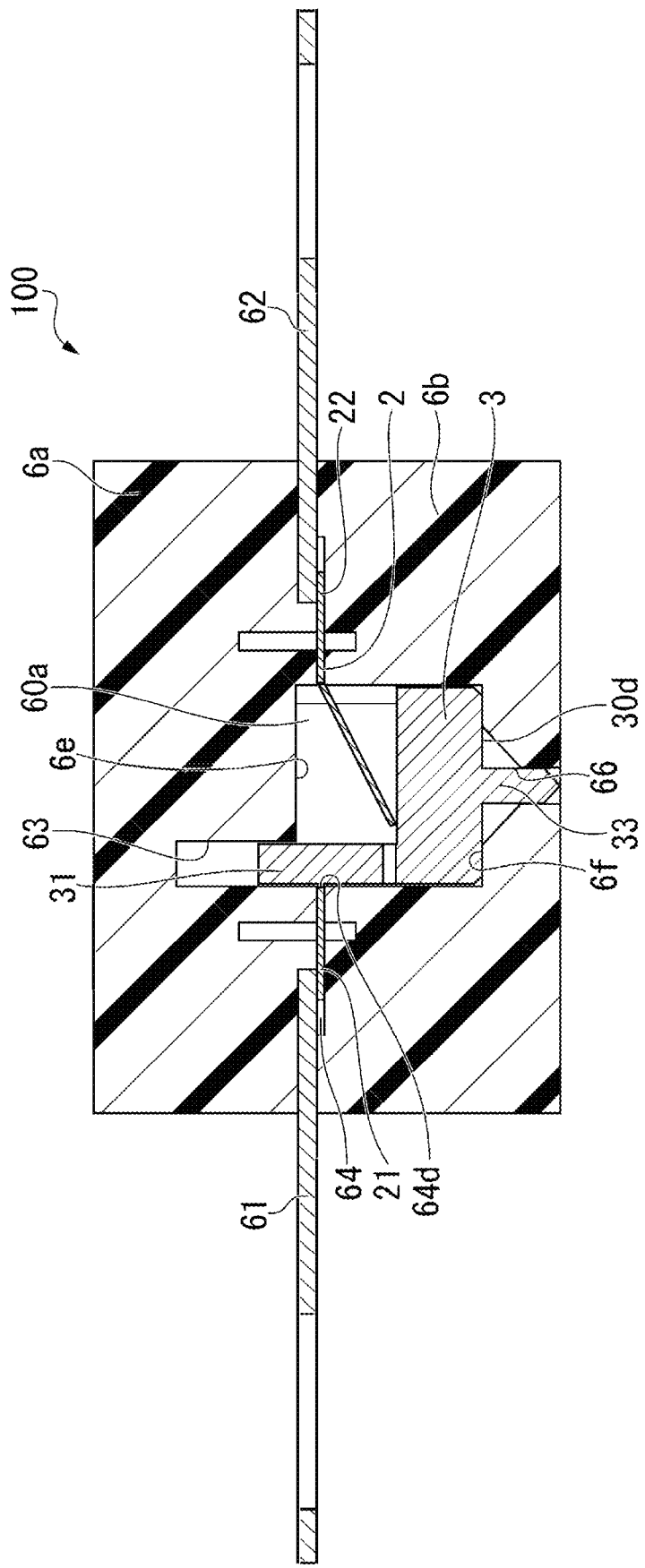
FIG. 27 A diagram for describing the operations of the protective element 100 of the fourth embodiment; a sectional view cut along line A-A' illustrated in FIG. 17.

FIG. 25 to FIG. 27 are diagrams for describing the operations of the protective element 100 of the fourth embodiment; a sectional view cut along line A-A' illustrated in FIG. 17.

When a current exceeding a rated current flows through the fuse element 2 of the protective element 100 of the present embodiment, the fuse element 2 increases in temperature due to heat generation from the overcurrent. Then, the breaking portion 23 of the fuse element 2 disposed in the shielding-portion through hole 32 of the slider 3 is softened and cut due to the temperature increase. At this time, as illustrated in FIG. 25, a spark is generated between the cut faces of the breaking portion 23, and an arc is discharged as illustrated in FIG. 26. When the arc is discharged, pressure in the first space 60a increases.

In the protective element 100 of the present embodiment, the slider 3 moves (in FIG. 26, moves downward) so that the ratio of the first space 60a in the housing portion 60 increases due to the pressure increase in the first space 60a. As a result, as illustrated in FIG. 26, the opening 64d in the first insertion hole 64 in which the first end portion 21 of the fuse element 2 is housed is blocked by the shielding portion 31 of the slider 3. Thus, the cut faces of the cut breaking portion 23 are insulated by the shielding portion 31 of the slider 3 as illustrated in FIG. 27, and an energization path via the fuse element 2 is reliably physically broken. Therefore, the arc discharge is rapidly quenched (extinguished).

The movement of the slider 3 caused by a pressure increase in the first space 60a, as illustrated in FIG. 27, causes the convex portion 33 of the slider 3 to be housed in the fourth insertion hole 66. Thus, the position shifting of the slider 3 while moving is prevented, the slider 3 moves to a predetermined position, and the slider 3 is fixed on the fourth wall face 6f. Thus, it is more difficult for rebounding, wherein the moved slider 3 returns to the original position, to occur, and arc discharge is more reliably quenched. Furthermore, because the convex portion 33 of the slider 3 is housed in the fourth insertion hole 66, it can be confirmed from outside the case 6 that the slider 3 has moved to a predetermined position.

In the present embodiment, even when the slider 3 moves so that the ratio of the first space 60a in the housing portion 60 increases due to the pressure increase in the first space 60a, pressure is suppressed from increasing in the second space 60b. This is for the gas in the second space 60b to be exhausted to the outside of the housing portion 60 via the fourth insertion hole 66 and the leak holes 67a and 67b (see (a) and (c) in FIG. 22). Therefore, movement of the slider 3 is not impeded by a pressure increase in the second space 60b, and the slider 3 moves rapidly. As a result, in the protective element 100 of the present embodiment, the arc discharge is more rapidly and reliably quenched. Moreover, the housing portion 60 being destroyed due to a pressure increase in the second space 60b can be prevented. This provides excellent safety.

The leak holes 67a and 67b are blocked by the second face 30d of the slider 3 being pressed against the fourth wall face 6f due to the pressure increase in the first space 60a.

In the protective element 100 in the present embodiment, as illustrated in FIG. 19, the volume of the first space 60a is smaller than the volume of the second space 60b. Thus, compared to when the volume of the first space 60a is larger than the volume of the second space 60b, the pressure inside the first space 60a tends to change drastically due to arc discharge generated at the time of cutting of the breaking portion 23 of the fuse element 2. As a result, movement of the slider 3 due to the pressure increase in the first space 60a becomes swift, and the arc discharge is more rapidly and reliably quenched.

In the protective element 100 of the present embodiment, when the pressure in the first space 60a in the housing portion 60 of the case 6 increases due to the arc discharge at the time of the cutting of the breaking portion 23 of the fuse element 2, the slider 3 moves so that the ratio of the first space 60a increases. Thus, the opening 64d of the first insertion hole 64 in which the first end portion 21 of the fuse element 2 is housed is blocked by the shielding portion 31 of the slider 3. Therefore, in the protective element 100 of the present embodiment, the cut faces of the cut fuse element 2 are insulated by the shielding portion 31 of the slider 3. As a result, the arc discharge at the time of cutting the fuse element 2 is rapidly quenched (extinguished). Therefore, the protective element 100 of the present embodiment can also be preferably disposed in, for example, a current path of a high voltage and a large current.

Fifth Embodiment

Figure 28:
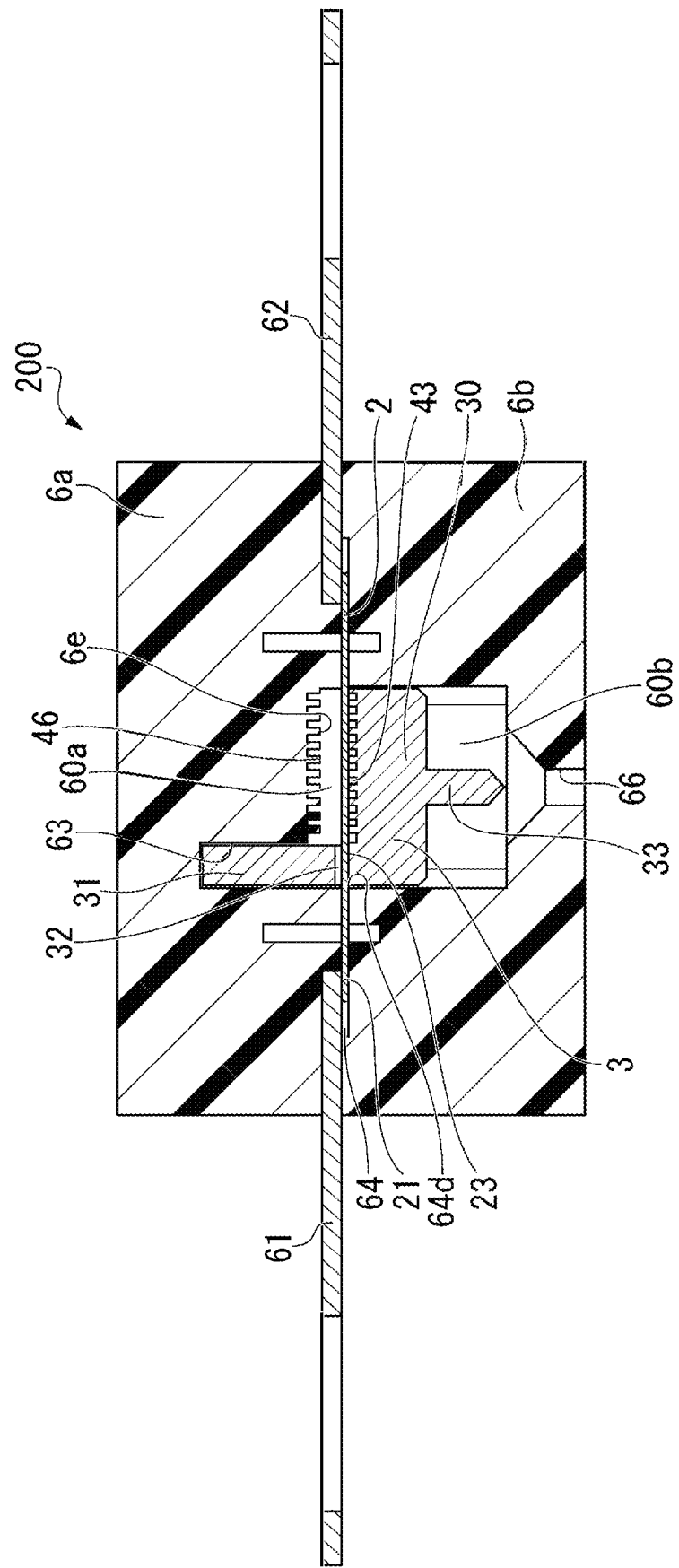
FIG. 28 A sectional view for describing a protective element 200 of a fifth embodiment; a sectional view corresponding to a position where the protective element 100 of the fourth embodiment is cut along line A-A' illustrated in FIG. 17.
Figure 29:
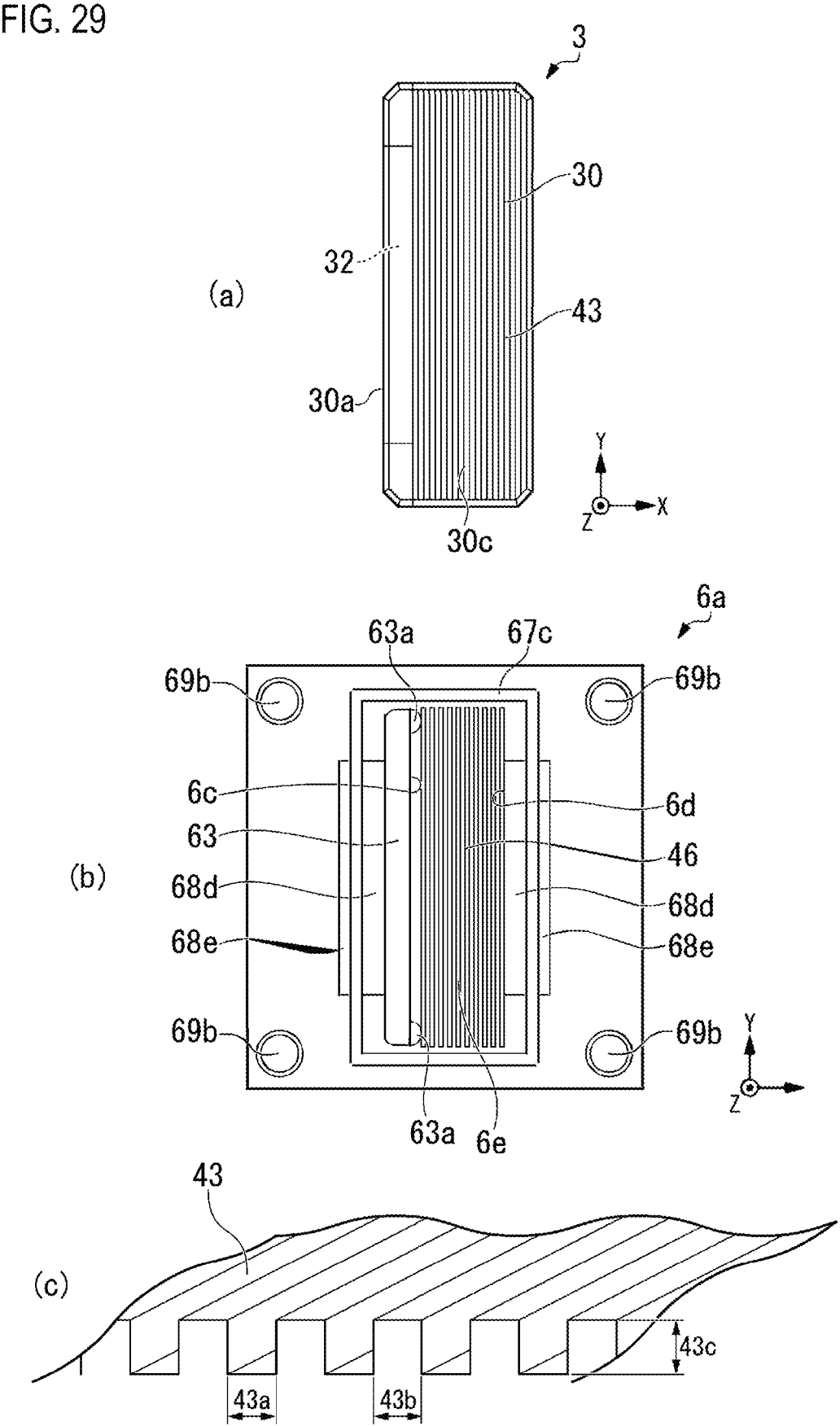
FIG. 29 An enlarged view for describing a portion of the protective element 200 of the fifth embodiment. (a) is a plan view illustrating the slider. (b) is a plan view illustrating the first case. (c) is a perspective view illustrating a slider adhesion prevention groove.

FIG. 28 is a sectional view for describing a protective element 200 of a fifth embodiment; a sectional view corresponding to a position where the protective element 100 of the fourth embodiment is cut along line A-A' illustrated in FIG. 17. FIG. 29 is an enlarged view for describing a portion of the protective element 200 of the fifth embodiment. (a) in FIG. 29 is a plan view illustrating the slider. (b) in FIG. 29 is a plan view illustrating the first case. (c) in FIG. 29 is a perspective view illustrating a slider adhesion prevention groove.

In the protective element 200 of the fifth embodiment, members that are the same as the protective element 100 of the fourth embodiment described above are given the same reference numerals, and descriptions thereof are omitted.

The difference between the protective element 200 of the fifth embodiment and the protective element 100 of the fourth embodiment is only that grooves are respectively disposed on the plate-shaped portion 30 on the first space 60a side and on the third wall face 6e disposed opposing the fuse element 2 in the first space 60a.

As illustrated in FIG. 28 and (a) in FIG. 29, a plurality of slider adhesion prevention grooves 43 extending in a direction (Y direction) intersecting the X direction (first direction) is disposed in parallel on the entire face on the plate-shaped portion 30 on the first space 60a side. The plurality of slider adhesion prevention grooves 43 illustrated in (a) in FIG. 29 are rectangular in a sectional view, all of the same shape, and are arranged at equal intervals at a predetermined pitch.

The present embodiment describes an example in which slider adhesion prevention grooves 43 are disposed that extend in a direction intersecting the X direction. However, the extending direction of the slider adhesion prevention grooves is not limited in particular and may also extend in the X direction.

As illustrated in (c) in FIG. 29, a width 43a of the slider adhesion prevention grooves 43 can be, for example, 100 μm to 200 μm. An interval 43b (pitch) between the adjacent slider adhesion prevention grooves 43 can be, for example, 100 μm to 200 μm. A depth 43c of the slider adhesion prevention grooves 43 can be, for example, 100 μm to 200 μm.

When the width 43a of the slider adhesion prevention grooves 43, the interval 43b between adjacent slider adhesion prevention grooves 43, and the depth 43c are within the above ranges, the effect of preventing the melted material of the fuse element 2 scattered in the first space 60a at the time of cutting of the fuse element 2 from forming a new energization path becomes remarkable. Furthermore, when the width 43a of the slider adhesion prevention grooves 43, the interval 43b between adjacent slider adhesion prevention grooves 43, and the depth 43c are within the ranges described above, the presence of the slider adhesion prevention grooves 43 will not negatively impact the productivity and size reduction of the protective element 200, or negatively impact the strength of the plate-shaped portion 30.

The number of slider adhesion prevention grooves 43 can be appropriately determined according to the area of the plate-shaped portion 30, the width 43a of the slider adhesion preventing grooves 43, and the interval 43b between adjacent slider adhesion prevention grooves 43, but is not particularly limited.

The slider adhesion prevention groove 43 can be formed using a known method.

As illustrated in FIG. 28 and (b) in FIG. 29, a plurality of wall-face adhesion prevention grooves 46 extending in a direction intersecting the X direction (first direction) is disposed in parallel on the entire face of the third wall face 6e disposed opposing the fuse element 2 in the first space 60a. The plurality of wall-face adhesion prevention grooves 46 illustrated in (b) in FIG. 29 are rectangular in a sectional view, all of the same shape, and are arranged at equal intervals at a predetermined pitch.

In the protective element 200 of the present embodiment illustrated in FIG. 28, the shape of the wall-face adhesion prevention grooves 46 is made to be the same as the shape of the slider adhesion prevention grooves 43 illustrated in (c) in FIG. 29.

The present embodiment describes an example in which the shape of the wall-face adhesion prevention grooves 46 is the same as the shape of the slider adhesion prevention grooves 43. However, the shape of the wall-face adhesion prevention grooves 46 may be different than that of the slider adhesion prevention grooves 43.

Furthermore, an example in which wall-face adhesion prevention grooves 46 are disposed that extend in a direction intersecting the X direction. However, the extending direction of the wall-face adhesion prevention grooves is not limited in particular and may also extend in the X direction. The extending direction of the wall-face adhesion prevention grooves 46 may be the same as that of the slider adhesion prevention grooves 43 such as in the protective element 200 in the present embodiment illustrated in FIG. 28, or may also be different from the slider adhesion prevention grooves 43.

The width of the wall-face adhesion prevention grooves 46, the interval between adjacent wall-face adhesion prevention grooves 46, and the depth can respectively be in the same dimensional range as the width 43a of the slider adhesion prevention grooves 43 described above, the interval 43b between adjacent slider adhesion prevention grooves 43, and the depth 43c.

The wall-face adhesion prevention groove 46 can be formed using a known method.

In the protective element 200 in the present embodiment, an example is described having both wall-face adhesion prevention grooves 46 and slider adhesion prevention grooves 43. However, it is also possible to provide only one of either the wall-face adhesion prevention grooves 46 and the slider adhesion prevention grooves 43.

In the protective element 200 of the present embodiment, similarly to the protective element 100 in the fourth embodiment, when the pressure in the first space 60a in the housing portion 60 of the case 6 increases due to the arc discharge at the time of the cutting of the breaking portion 23 of the fuse element 2, the slider 3 moves so that the ratio of the first space 60a increases. Thus, the opening 64d of the first insertion hole 64 in which the first end portion 21 of the fuse element 2 is housed is blocked by the shielding portion 31 of the slider 3. Therefore, in the protective element 200 of the present embodiment, similarly to the protective element 100 of the fourth embodiment, the arc discharge generated when cutting the fuse element 2 is rapidly quenched (extinguished).

Additionally, in the protective element 200 of the present embodiment illustrated in FIG. 28, the wall-face adhesion prevention grooves 46 are provided on the third wall face 6e and the slider adhesion prevention grooves 43 are provided on the plate-shaped portion 30. The wall-face adhesion prevention grooves 46 and the slider adhesion prevention grooves 43 prevent the melted material of the fuse element 2 scattered in the first space 60a at the time of cutting of the fuse element 2 from forming an energization path. Thus, in the protective element 200 in the present embodiment, the arc discharge generated when cutting the fuse element 2 is reliably and rapidly quenched (extinguished).

Sixth Embodiment

Figure 30:
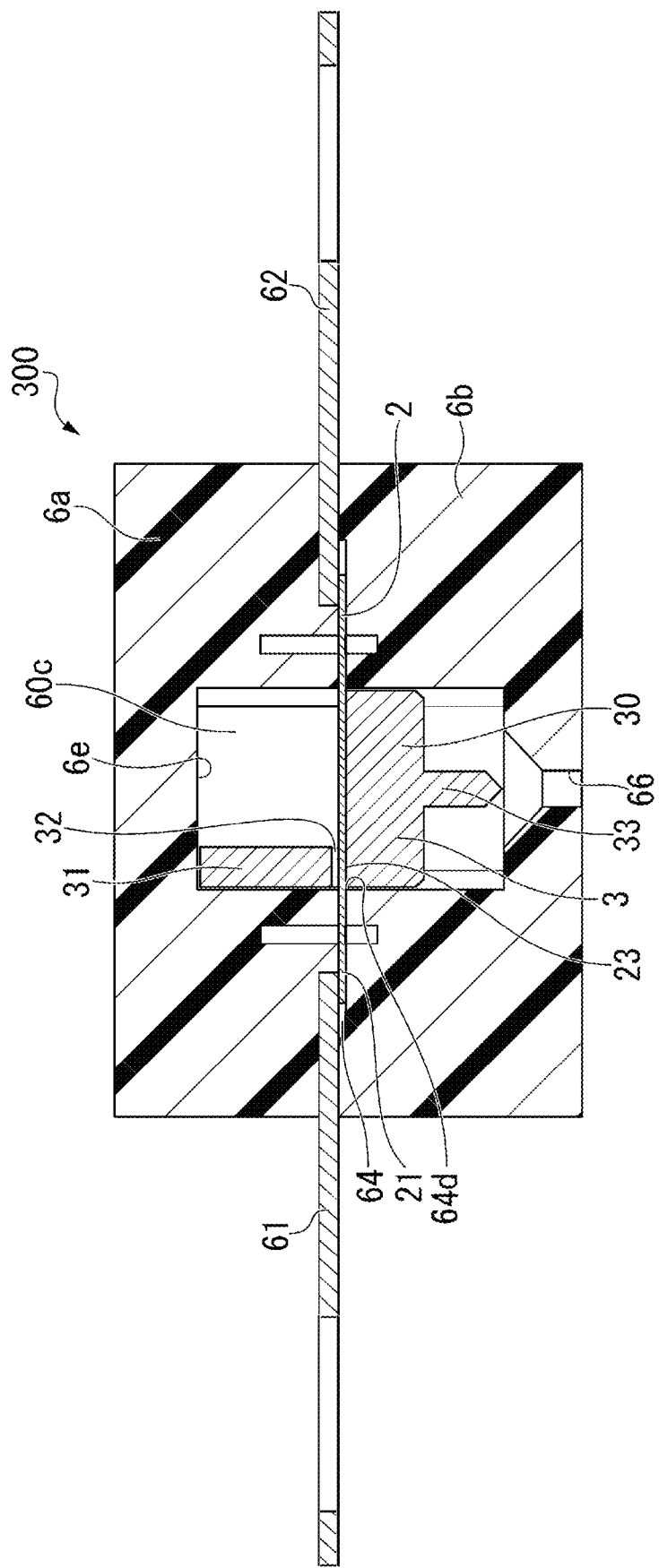
FIG. 30 A sectional view for describing a protective element 300 of a sixth embodiment; a sectional view corresponding to a position where the protective element 100 of the fourth embodiment is cut along line A-A' illustrated in FIG. 17.

FIG. 30 is a sectional view for describing the protective element 300 of the sixth embodiment.

In the protective element 300 of the sixth embodiment, members that are the same as the protective element 100 of the fourth embodiment described above are given the same reference numerals, and descriptions thereof are omitted.

The difference between the protective element 300 of the sixth embodiment and the protective element 100 of the fourth embodiment is only that there is no concave portion 63 that open to the third wall face 6e, and that the height (length in the Z direction) dimension in the first space 60c is substantially uniform.

As illustrated in FIG. 30, similarly to the protective element 100 of the fourth embodiment, the first space 60c in the protective element 300 in the present embodiment has the same planar shape as the second space 60b.

Meanwhile, the height (length in the Z direction) dimension of the first space 60c in the protective element 300, unlike the protective element 100 of the fourth embodiment, is substantially uniform and is longer than the distance (length in the Z direction) from the upper face of the first face 30c to the upper face of the shielding portion 31 in the plate-shaped portion 30 of the slider 3.

The protective element 300 of the sixth embodiment can be manufactured by the same method as the protective element 100 of the fourth embodiment described above, with the exception of a concave portion that corresponds to the shape of the first space 60c not being formed on the face on the side disposed opposing the second case 6b of the first case 6a, using a known method.

In the protective element 300 of the present embodiment, similarly to the protective element 100 in the fourth embodiment, when the pressure in the first space 60c in the housing portion 60 of the case 6 increases due to the arc discharge at the time of the cutting of the breaking portion 23 of the fuse element 2, the slider 3 moves so that the ratio of the first space 60c increases. Thus, the opening 64d of the first insertion hole 64 in which the first end portion 21 of the fuse element 2 is housed is blocked by the shielding portion 31 of the slider 3. Therefore, in the protective element 300 of the present embodiment, similarly to the protective element 100 of the fourth embodiment, the arc discharge generated when cutting the fuse element 2 is rapidly quenched (extinguished).

Moreover, in the protective element 300 of the sixth embodiment illustrated in FIG. 30, there is no concave portion 63 that open to the third wall face 6e in the first space 60c, and the height (length in the Z direction) dimension in the first space 60c is substantially uniform. Thus, there is no need to form a concave portion 63 that opens to the third wall face 6e on the face on the side disposed opposing the second case 6b of the first case 6a, and there is no need to house the shielding portion 31 in the concave portion 63 during assembly. Moreover, the first space 60c in the protective element 300 of the present embodiment is simple and has a shape that is easy to form. Therefore, the protective element 300 in the present embodiment can easily and efficiently manufacture a first case 6a having a concave portion that forms the first space 60c, has a simple assembly, and excellent productivity.

Seventh Embodiment

Figure 31:
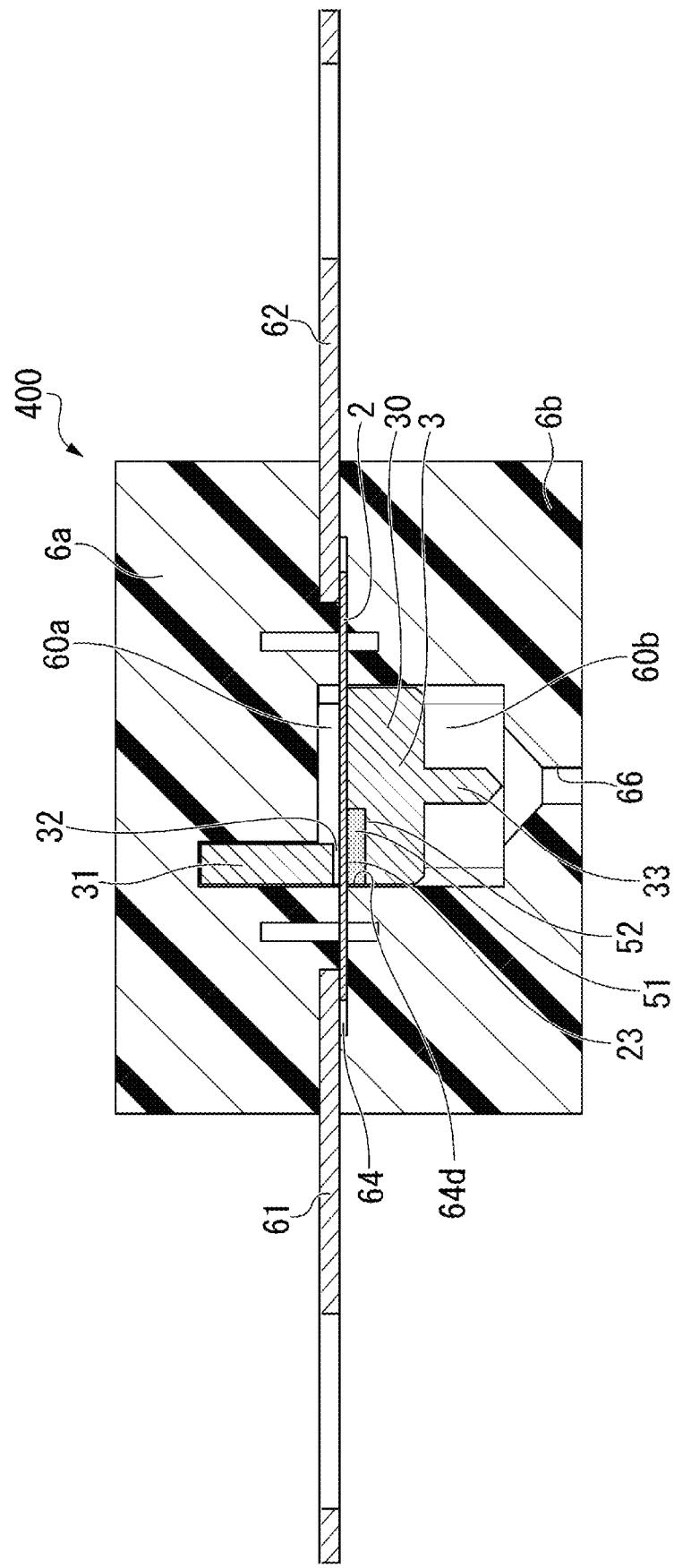
FIG. 31 A sectional view for describing a protective element 400 of a seventh embodiment; a sectional view corresponding to a position where the protective element 100 of the fourth embodiment is cut along line A-A' illustrated in FIG. 17.
Figure 32:
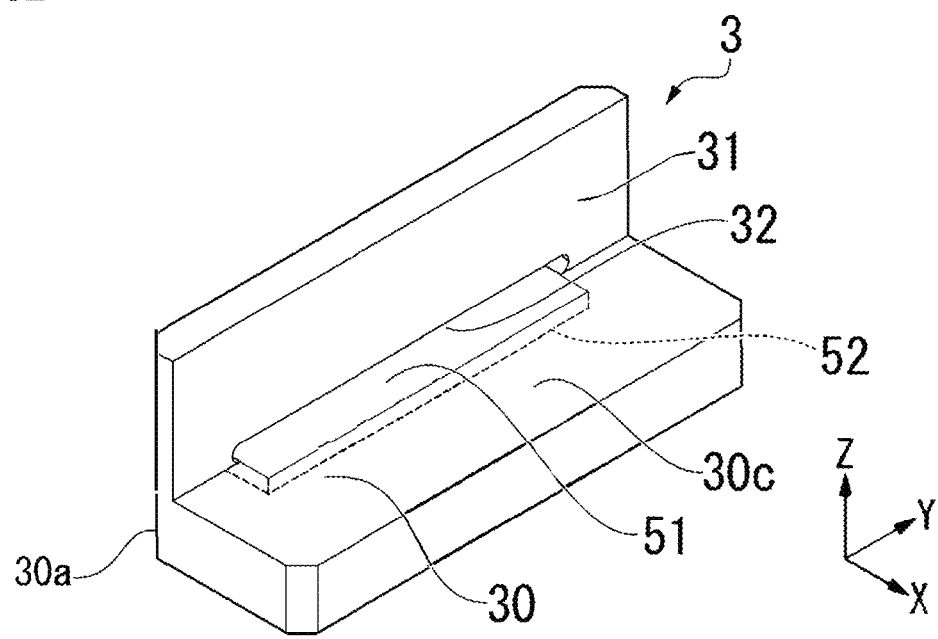
FIG. 32 A perspective view illustrating the slider and a heating member provided by the protective element 400 of the seventh embodiment.

FIG. 31 is a sectional view for describing a protective element 400 of a seventh embodiment; a sectional view corresponding to a position where the protective element 100 of the fourth embodiment is cut along line A-A' illustrated in FIG. 17. FIG. 32 is a perspective view illustrating the slider and a heating member (heating element) provided by the protective element 400 of the seventh embodiment.

The difference between the protective element 400 of the seventh embodiment and the protective element 100 of the fourth embodiment is only that a heating member 51 is provided that melts and cuts the breaking portion 23.

In the protective element 400 of the seventh embodiment, as illustrated in FIG. 31, the heating member 51 is disposed contacting the breaking portion 23 on the second space 60b side of the fuse element 2. The heating member 51 has the function of heating and softening the breaking portion 23 of the fuse element 2. When an abnormality occurs in the external circuit that will be the energization path of the protective element 400 and the energization path must be broken, the heating member 51 causes energization and heat using a current control element provided in the external circuit. Moreover, when the fuse element 2 is melted and cut, the supply of electricity to the heating member 51 is broken, and the heating of the heating member 51 is stopped. A known heating member can be used as the heating member 51.

In the protective element 400 of the seventh embodiment, as illustrated in FIG. 31 and FIG. 32, a heating-member concave portion 52 in which the heating member 51 is housed is provided on the plate-shaped portion 30 of the slider 3.

As illustrated in FIG. 32, the heating-member concave portion 52 is provided on the face opposing the shielding-portion through hole 32 along the first edge portion 30a of the plate-shaped portion 30.

The heating member 51 has a substantially rectangular parallelepiped shape, and the widths of the heating member 51 in the X direction (first direction) and the Y direction are appropriately determined according to widths of the breaking portion 23 in the X direction and the Y direction so that the breaking portion 23 of the fuse element 2 can be efficiently heated. Furthermore, the width of the heating-member concave portion 52 in the X direction and the Y direction is determined according to the width of the heating member 51 in the X direction and the Y direction.

In the protective element 400 of the seventh embodiment, the depth (length in the Z direction) of the heating-member concave portion 52 is set to a depth where the top of the plate-shaped portion 30 of the slider 3 and the top of the heating member 51 are on the same plane when the heating member 51 is placed in the heating-member concave portion 52.

The protective element 400 of the seventh embodiment can be manufactured by the same method as the protective element 100 of the fourth embodiment described above, with the exception of the fuse element 2 being penetrated by the shielding-portion through holes 32 of the slider 3 after the heating member 51 is disposed in the heating-member concave portion 52 by a known method.

In the protective element 400 of the present embodiment, similarly to the protective element 100 in the fourth embodiment, when the pressure in the first space 60*a* in the housing portion 60 of the case 6 increases due to the arc discharge at the time of the cutting of the breaking portion 23 of the fuse element 2, the slider 3 moves so that the ratio of the first space 60*a* increases. Thus, the opening 64*d* of the first insertion hole 64 in which the first end portion 21 of the fuse element 2 is housed is blocked by the shielding portion 31 of the slider 3. Therefore, in the protective element 400 of the present embodiment, similarly to the protective element 100 of the fourth embodiment, the arc discharge generated when cutting the fuse element 2 is rapidly quenched (extinguished).

Furthermore, in the protective element 400 of the seventh embodiment illustrated in FIG. 31, the heating member 51 for melting and cutting the breaking portion 23 is disposed contacting the breaking portion 23 on the second space 60*b* side of the fuse element 2. Therefore, when an abnormality occurs in the external circuit that will be the energization path of the protective element 400 and the energization path must be broken, energization is performed using a current control element provided in the external circuit, the heating member 51 heats up, and the breaking portion 23 is efficiently heated. Moreover, when the fuse element 2 is cut, the supply of electricity to the heating member 51 is broken, and the heating of the heating member 51 is stopped. Therefore, the protective element 400 of the present embodiment has excellent safety.

[Other Examples]

The protective element of the present invention is not limited to the protective elements in the first to seventh embodiments described above.

For example, in the fourth to seventh embodiments described above, examples were described in which the convex portion 33 is provided on the face opposing the shielding portion 31 in the plate-shaped portion 30 of the slider 3, and a fourth insertion hole 66 is provided that opens to the fourth wall face 6*f* disposed opposing the slider 3 in the second space 60*b*. However, the convex portion 33 of the slider 3 and the fourth insertion hole 66 that opens to the fourth wall face 6*f* may be provided or may not be provided as required.

Furthermore, the fourth to seventh embodiments describe an example in which leak holes 67*a* and 67*b* are provided that open to the fourth wall face 6*f* and penetrate the case 6. However, the leak holes 67*a* and 67*b* may be provided or may not be provided as required.

REFERENCE SIGNS LIST

2 Fuse element; 3 Slider; 6 Case; 6*a* First case; 6*b* Second case; 6*c* First wall face; 6*d* Second wall face; 6*e* Third wall face; 6*f* Fourth wall face; 21 First end portion; 22 Second end portion; 23 Breaking portion; 25 First connecting portion; 26 Second connecting portion; 30 Plate-shaped portion; 30*a* First edge portion; 30*c* First face; 30*d* Second face; 31 Shielding portion; 32 Shielding-portion through hole; 33 Convex portion; 43 Slider adhesion prevention groove; 46 Wall-face adhesion prevention groove; 51 Heating member; 52 Heating-member concave portion; 60 Housing portion; 60*a*, 60*c* First space; 60*b* Second space; 61 First terminal; 61*a*, 62*a* External terminal hole; 61*c*, 62*c* Flange portion; 62 Second terminal; 63 Concave portion; 63*a* Space; 64 First insertion hole; 64*a*, 65*a* Concave portion; 64*b*, 65*b* Terminal placement face; 64*c*, 65*c* Insertion hole forming face; 65 Second insertion hole; 64*d* Opening; 66 Fourth insertion hole; 66*a* Opening; 67*a*, 67*b* Leak hole; 67*c*, 67*d* Adhesive penetration prevention groove; 68*a* First abutting face; 68*b* Second concave portion; 68*c* Second abutting face; 68*d* First convex portion; 68*e* Second convex portion; 69*a* Joining hole; 69*b* Joining convex portion; 100, 200, 300, 400 Protective element; 102, 202, 202A, 202AA Fuse element; 202AA-2, 202AA-3 Heating-element fuse element; 103, 203 Slider; 106, 206 Case; 106*a*, 206*a* First Case; 106*b*, 206*b* Second case; 123, 223 Breaking portion; 130, 230 Plate-shaped portion; 131, 231 Shielding portion; 132, 232 Shielding portion through hole; 160, 260 Housing portion; 160*a*, 260*a* Shielding-portion housing space; 160*b*, 260*b* Plate-shaped-portion moving space; 260*c* Plate-shaped portion housing space; 261 Fuse-element housing space; 268*a*, 268*b* Internal leak hole; 271 External leak hole; 290*a*, 290*b* Heating element; 1000, 2000, 3000 Protective element

The invention claimed is:

1. A protective element, comprising:
   a fuse element cuttable by energization in a first direction;
   a slider made of an insulating material, comprising:
   a plate-shaped portion extending in the first direction;
   a shielding portion erected in a second direction intersecting the first direction on the plate-shaped portion, having a shielding-portion through hole penetrating the shielding portion; and
   a case made of an insulating material, comprising a housing portion which houses a portion of the fuse element and houses the slider; wherein
   the housing portion has:
   a shielding-portion housing space which houses the shielding portion such that the shielding portion is movable in the second direction; and
   a plate-shaped-portion moving space which houses the plate-shaped portion such that the plate-shaped portion is movable in the second direction, and
   prior to the fuse element being cut, the slider and the fuse element are housed such that the fuse element is inserted into the shielding-portion through hole.

2. The protective element of claim 1, wherein
   the fuse element comprises a first end portion, a second end portion, and a breaking portion provided between the first end portion and the second end portion,
   the first direction heads from the first end portion to the second end portion, and
   prior to the fuse element being cut, the breaking portion of the fuse element is disposed in the shielding-portion through hole of the slider.

3. The protective element of claim 1, wherein the slider is configured to move in the housing portion by receiving increased pressure due to a discharge generated in conjunction with the fuse element being cut and to provide breakage between cut faces of the fuse element.

4. The protective element of claim 1, further comprising a heating element configured to heat the fuse element.

5. The protective element of claim 4, wherein
   the heating element is a resistor, and
   the protective element further comprises:
   a feeder line electrically connected to both ends of the heating element, the heating element being electrically independent of the fuse element, and the feeder line being pulled out to outside the case via a feeder-line hole provided in the case.

6. The protective element of claim 1, wherein the case further has an external leak hole communicating the plate-shaped-portion moving space to outside the case.

7. The protective element of claim 1, wherein the case is a plurality of case members integrated.

8. The protective element of claim 7, wherein
each case member has a joining face, and the plurality of case members are integrated by joining the joining faces with an adhesive,
at least one of opposing joining faces of the plurality of case members comprises an adhesion area and an adhesive penetration prevention groove provided thereon, and
the adhesive penetration prevention groove is disposed between the adhesion area and the housing portion and is configured to prevent the adhesive from penetrating an inner space of the housing-portion.

9. The protective element of claim 1, wherein the slider is a plurality of slider members integrated.

10. The protective element of claim 1, wherein a material of at least one of the case and the slider has a tracking resistance index CTI of 500 V or higher.

11. The protective element of claim 1, wherein a material of at least one of the case and the slider is a resin material selected from the group consisting of a nylon resin, a polyphthalamide resin, and a Teflon (registered trademark) resin.

12. The protective element of claim 1, wherein the fuse element comprises a layered body in which an inner layer comprising a low-melting-point metal and an outer layer comprising a high-melting-point metal having a melting point higher than a melting point of the low-melting-point metal are layered in a thickness direction thereof.

13. The protective element of claim 12, wherein
the low-melting-point metal is Sn or a metal comprising Sn as a main component thereof, and
the high-melting-point metal is Ag, Cu, or a metal comprising Ag or Cu as a main component thereof.

14. The protective element of claim 1, wherein the fuse element comprises a bent portion which mitigates stress from thermal expansion and thermal contraction in the first direction.

15. The protective element of claim 2, further comprising:
a first terminal connected to the first end portion of the fuse element; and
a second terminal connected to the second end portion, wherein
each of the first terminal and the second terminal is fixed to the case.

16. A protective element, comprising:
a fuse element cuttable by energization in a first direction;
a slider made of an insulating material, comprising:
a plate-shaped portion extending in the first direction and comprising a first edge portion and a second edge portion on an opposite side of the first edge portion in the first direction;
a shielding portion erected in a second direction intersecting the first direction from a position between the first edge portion and the second edge portion, having a shielding-portion through hole penetrating the shielding portion; and
a case made of an insulating material, comprising a housing portion which houses a portion of the fuse element and houses the slider; wherein
the housing portion has:
a fuse-element housing space which houses the fuse element;
a shielding-portion housing space which houses the shielding portion such that the shielding portion is movable in the second direction; and
a plate-shaped-portion moving space that houses the plate-shaped portion such that the plate-shaped portion is movable in the second direction,
the fuse-element housing space and the shielding-portion housing space intersect, and
prior to the fuse element being cut, the slider and the fuse element are housed such that the fuse element is inserted into the shielding-portion through hole.

17. The protective element of claim 16, wherein
the fuse element comprises a first end portion, a second end portion, and a breaking portion provided between the first end portion and the second end portion,
the first direction heads from the first end portion to the second end portion, and
prior to the fuse element being cut, the breaking portion of the fuse element is disposed in the shielding-portion through hole.

18. The protective element of claim 17, wherein a sectional area of a face orthogonal to the first direction of the breaking portion is smaller than a sectional area of a face orthogonal to the first direction of a region of the fuse element other than the breaking portion.

19. The protective element of claim 16, wherein the slider is configured to move in the housing portion by receiving increased pressure due to a discharge generated in conjunction with the fuse element being cut such that the shielding portion shields the fuse-element housing space.

20. The protective element of claim 16, wherein the case has an internal leak hole communicating the fuse-element housing space and the plate-shaped-portion moving space.

21. The protective element of claim 20, wherein increased pressure in the fuse-element housing space due to a discharge generated when the fuse element is cut, slides the slider via the internal leak hole such that the shielding portion shields an intersecting portion of the fuse-element housing space and the shielding-portion housing space.

22. The protective element of claim 16, wherein the case further has an external leak hole communicating the plate-shaped-portion moving space to outside the case.

23. The protective element of claim 16, further comprising a heating element configured to heat the fuse element.

24. The protective element of claim 23, wherein
the heating element comprises a first heating element and a second heating element located at positions interposing the shielding-portion housing space of the fuse-element housing space, and
the protective element further comprises:
a heating-element fuse element connecting the first and second heating elements in parallel;
a feeder line electrically connected to both ends of the first and second heating elements, the first and second heating elements being electrically independent of the fuse element, and the feeder line being pulled out to outside the case via a feeder-line hole provided on the case.

25. The protective element of claim 16, wherein a height in the second direction of the fuse-element housing space is no greater than five times a thickness in the second direction of the fuse element.

26. The protective element of clam 16, further comprising a heating element provided on the fuse element and configured to heat the fuse element, wherein a height in the second direction of the fuse-element housing space is no greater than five times a total of a thickness in the second direction of the fuse element and a thickness in the second direction of the heating element.

27. The protective element of claim 16, wherein a distance between the shielding portion and an inner wall of the shielding-portion housing space is 0.03 to 0.2 mm in the first direction, and a distance between a lateral face of the plate-shaped portion and a face opposing the lateral face of the plate-shaped portion of the plate-shaped-portion moving space is 0.03 to 0.2 mm in the first direction.

28. The protective element of claim 16, further comprising a fixing portion in a portion of the plate-shaped-portion moving space, the fixing portion contacting a lateral face of the plate-shaped portion such that rebounding of the slider is suppressed.

29. The protective element of claim 16, wherein the case is a plurality of case members integrated.

30. The protective element of claim 29, wherein the plurality of case members is integrated by being joined in a third direction intersecting the first direction and the second direction by a boss and a fixing hole being fitted together and by an adhesive.

31. The protective element of claim 16, wherein the slider is a plurality of slider members integrated.

32. The protective element of claim 31, wherein the plurality of slider members is integrated by being joined in the third direction intersecting the first direction and the second direction.

33. The protective element of claim 31, wherein each slider member comprises a joining face on the shielding portion, and the joining face comprises a convex portion plugging a gap in the first direction or comprises an inclined face plugging the gap in the first direction.

34. The protective element of claim 16, wherein a wall face of the fuse-element housing space comprises a plurality of wall-face adhesion prevention grooves extending in a direction intersecting the first direction in parallel.

35. A protective element, comprising:
a fuse element comprising a first end portion, a second end portion, and a breaking portion provided between the first end portion and the second end portion, and being cuttable by energization in a first direction heading from the first end portion to the second end portion;
a slider comprising:
  a plate-shaped portion made of an insulating material;
  a shielding portion made of an insulating material, erected on a first edge portion of the plate-shaped portion, and having a shielding-portion through hole penetrating the shielding portion; and
a case made of an insulating material, having therein a housing portion which houses the fuse element and the slider, and having a first insertion hole that opens to a first wall face in the housing portion, wherein
the plate-shaped portion divides an interior of the housing portion into a first space and a second space,
the shielding portion is disposed along the first wall face, the breaking portion is disposed in the shielding-portion through hole, the first end portion is housed in the first insertion hole, and
the slider is configured to move by receiving increased pressure in the first space due to an arc discharge at a time of the breaking portion being cut such that a ratio of a volume of the first space to a volume of the housing portion increases, and that an opening of the first insertion hole is plugged by the shielding portion.

36. The protective element of claim 35, wherein the fuse element is placed on the plate-shaped portion on a first-space side.

37. The protective element of claim 35, wherein a sectional area in a direction orthogonal to the first direction of the breaking portion is smaller than a sectional area of a face orthogonal to the first direction of a region of the fuse element other than the breaking portion.

38. The protective element of claim 35, wherein the case is a plurality members integrated.

39. The protective element of claim 35, wherein the case further has a second insertion hole that opens to a second wall face in the housing portion, the second wall face being disposed opposing the first wall face in the first direction, and the second end portion is housed in the second insertion hole.

40. The protective element of claim 35, further comprising a heating element configured to heat and cut the breaking portion.

41. The protective element of claim 35, wherein prior to the fuse element being cut, a volume of the first space is less than a volume of the second space.

42. The protective element of claim 35, further comprising a concave portion that opens to a third wall face in the housing portion, the third wall face being disposed opposing the fuse element in the first space, wherein the shielding portion is housed in the concave portion.

43. The protective element of claim 35, further comprising: a first terminal electrically connected to the first end portion; and a second terminal is electrically connected to the second end portion.

44. The protective element of claim 35, wherein the plate-shaped portion comprises a convex portion provided on a face on an opposite side of the shielding portion,
the case has a fourth insertion hole that opens to a fourth wall face in the housing portion, the fourth wall face being disposed opposing the slider in the second space, and
the convex portion is housed in the fourth insertion hole in a state where the slider has moved such that a ratio of a volume of the first space to a volume of the housing portion increases.

45. The protective element of claim 35, wherein the case further has a leak hole which opens to a fourth wall face disposed opposing the slider in the second space and which penetrates the case.

46. The protective element of claim 45, wherein the leak hole is plugged by the slider in a state where the slider has moved such that a ratio of a volume of the first space to a volume of the housing portion increases.

47. The protective element of claim 35, wherein a third wall face in the housing portion comprises a plurality of wall-face adhesion prevention grooves extending in a direction intersecting the first direction in parallel, the third wall face being disposed opposing the fuse element in the first space.

48. The protective element of claim 35, wherein the plate-shaped portion comprises a plurality of slider adhesion prevention grooves extending in a direction intersecting the first direction in parallel on a first-space side of the plate-shaped portion.

49. The protective element of claim 35, wherein the fuse element comprises a layered body in which an inner layer comprising a low-melting-point metal and an outer layer comprising a high-melting-point metal having a melting point higher than a melting point of the low-melting-point metal are layered in a thickness direction thereof.

50. The protective element of claim 49, wherein
- the low-melting-point metal is Sn or a metal comprising Sn as a main component thereof, and
- the high-meting point metal is Ag, Cu, or a metal comprising Ag or Cu as a main component thereof.

51. The protective element of claim 35, wherein
- the case is formed by a first case and a second case disposed opposing the first case being adhered together,
- the first case comprises a first joining face which adheres to the second case via a first adhesion part provided in a portion of a first joining face,
- the second case comprises a second joining face which adheres to the first case via a second adhesion part provided in a portion of a second joining face, and
- at least one of:

an area of the first joining face between the housing portion and the first adhesion part; and an area of the second joining face between the housing portion and the second adhesion part, comprises an adhesive penetration prevention groove.

\* \* \* \* \*